(12) United States Patent
Bahirat

(10) Patent No.: US 12,493,408 B2
(45) Date of Patent: Dec. 9, 2025

(54) DYNAMICALLY ASSIGNING NAMESPACE TYPE TO MEMORY DEVICES

(71) Applicant: NVIDIA Corporation, Santa Clara, CA (US)

(72) Inventor: Shirish Bahirat, Longmont, CO (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 17/900,739

(22) Filed: Aug. 31, 2022

(65) Prior Publication Data

US 2024/0069722 A1 Feb. 29, 2024

(51) Int. Cl.
*G06F 3/06* (2006.01)
(52) U.S. Cl.
CPC .......... *G06F 3/0604* (2013.01); *G06F 3/0655* (2013.01); *G06F 3/0679* (2013.01)
(58) Field of Classification Search
CPC ..... G06F 3/0604; G06F 3/0655; G06F 3/0679
See application file for complete search history.

(56) References Cited

U.S. PATENT DOCUMENTS

| | | | |
|---|---|---|---|
| 7,673,080 B1 | 3/2010 | Yu et al. | |
| 10,936,500 B1 | 3/2021 | Inna et al. | |
| 2004/0260861 A1 | 12/2004 | Serizawa et al. | |
| 2006/0174056 A1 | 8/2006 | Lambert et al. | |
| 2008/0263259 A1 | 10/2008 | Sadovsky et al. | |
| 2009/0172333 A1 | 7/2009 | Marcu et al. | |
| 2010/0115183 A1 | 5/2010 | Araki et al. | |
| 2015/0254088 A1 | 9/2015 | Chou et al. | |
| 2016/0188232 A1* | 6/2016 | Ramachandran | G06F 11/1484 711/162 |
| 2017/0220463 A1 | 8/2017 | Malina et al. | |
| 2018/0052601 A1 | 2/2018 | Lee | |
| 2019/0129862 A1 | 5/2019 | Yoshida et al. | |
| 2020/0167274 A1* | 5/2020 | Bahirat | G06F 3/0679 |
| 2021/0081325 A1* | 3/2021 | Bradshaw | G06F 3/0649 |
| 2021/0081326 A1 | 3/2021 | Curewitz et al. | |
| 2021/0382643 A1* | 12/2021 | Muthiah | G06F 3/0616 |
| 2022/0156631 A1 | 5/2022 | Kanso et al. | |
| 2022/0391115 A1* | 12/2022 | Muthiah | G06F 12/0607 |
| 2022/0391318 A1* | 12/2022 | Singh | G06F 12/0238 |
| 2022/0404975 A1 | 12/2022 | Amidi et al. | |
| 2023/0032639 A1* | 2/2023 | Anderson | G06F 3/065 |
| 2023/0051806 A1 | 2/2023 | Karkra et al. | |
| 2023/0059072 A1* | 2/2023 | Prasad | G06N 7/01 |
| 2023/0384966 A1* | 11/2023 | Sela | G06F 3/0685 |
| 2023/0393906 A1 | 12/2023 | Yang et al. | |

OTHER PUBLICATIONS

IEEE, "IEEE Standard 754-2008 (Revision of IEEE Standard 754-1985): IEEE Standard for Floating-Point Arithmetic," Aug. 29, 2008, 70 pages.
IEEE, "IEEE Standard for 802.3," IEEE Standard for Ethernetn, IEEE Computer Society, Dec. 28, 2012, 634 pages.
(Continued)

*Primary Examiner* — Tracy A Warren
(74) *Attorney, Agent, or Firm* — Davis Wright Tremaine LLP

(57) ABSTRACT

Apparatuses, systems, and techniques for managing memory devices. In at least one embodiment, a processor is provided to assign personalities to one or more memory devices.

20 Claims, 51 Drawing Sheets

(56) References Cited

OTHER PUBLICATIONS

Wikipedia, "IEEE 802.11," Wikipedia the Free Encyclopedia, https://en.wikipedia.org/wiki/IEEE_802.11, most recent edit Sep. 20, 2020 [retrieved Sep. 22, 2020], 15 pages.
Wikipedia, "IEEE 802.5," Wikepedia the Free Encyclopedia, https://en.wikipedia.org/wiki/Token_Ring, Jan. 14, 2020, 12 pages.
U.S. Appl. No. 17/729,942, filed Apr. 26, 2022.
U.S. Appl. No. 17/988,438, filed Nov. 16, 2022.

* cited by examiner

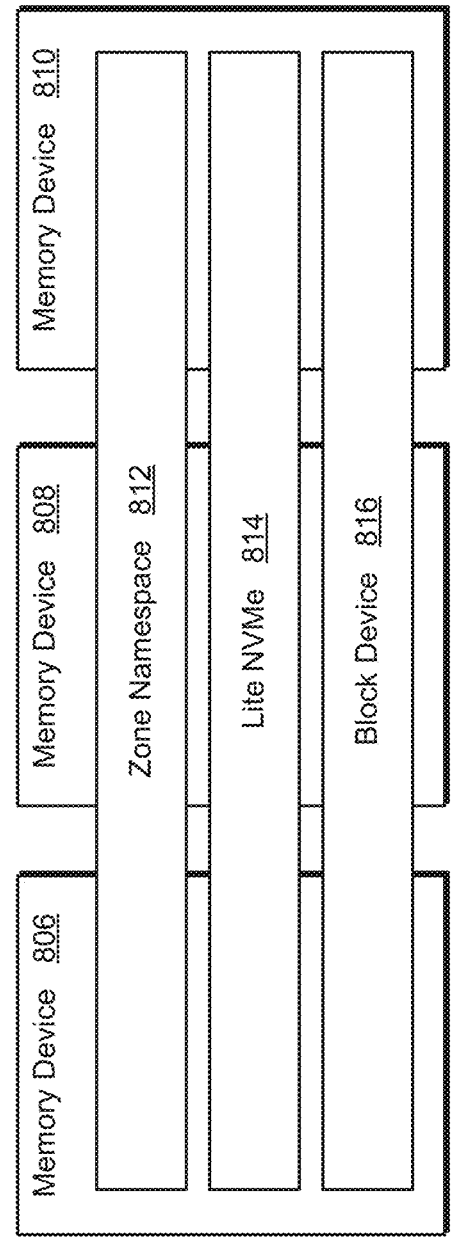

DYNAMICALLY ASSIGNING NAMESPACE TYPE TO MEMORY DEVICES

FIELD

At least one embodiment pertains to techniques and methods used to access memory in a computer system. For example, at least one embodiment pertains to assigning personalities to memory devices (e.g., solid state drives ("SSDs")).

BACKGROUND

Solid-state memory has recently been increasing in storage density and declining in cost, making it a cost-effective replacement for many electro-mechanical disk-based storage solutions. Therefore, efficiently integrating solid-state devices into computer systems may offer one or more advantages over using other types of storage alone.

BRIEF DESCRIPTION OF THE DRAWINGS

FIG. 8A illustrates an example of a single device personality assigned to a single memory device, in accordance with at least one embodiment;

FIG. 8B illustrates an example of multiple device personalities assigned to a single memory device, in accordance with at least one embodiment;

FIG. 8C illustrates an example of multiple device personalities assigned to multiple memory devices, in accordance with at least one embodiment;

DETAILED DESCRIPTION

Figure 1:
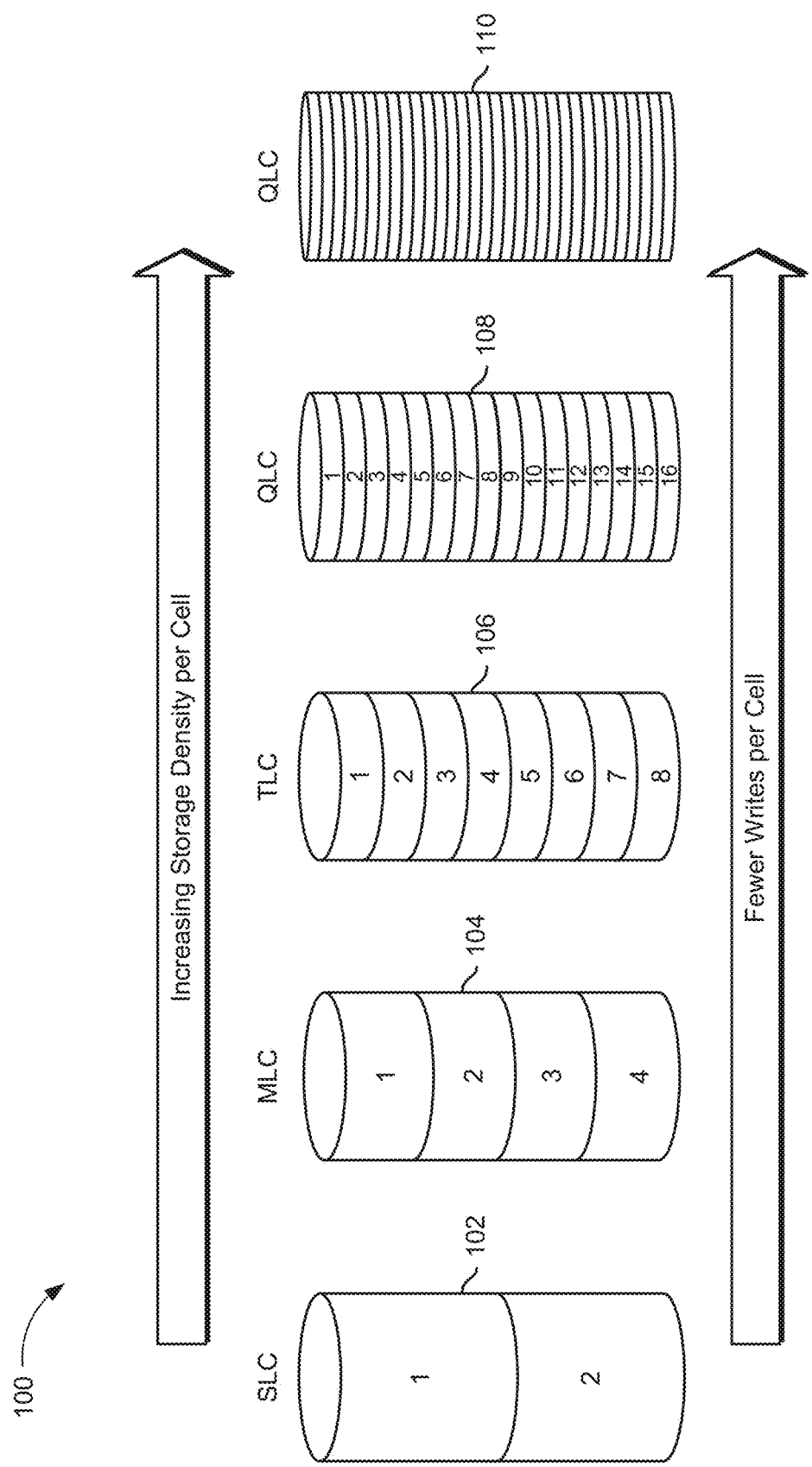
FIG. 1 illustrates different types of NAND flash memory cells, in accordance with at least one embodiment.

In the following description, numerous specific details are set forth to provide a more thorough understanding of at least one embodiment. However, it will be apparent to one skilled in the art that the inventive concepts may be practiced without one or more of these specific details.

This document describes systems and methods for integrating solid-state memory devices into a computer system. Solid-state memory devices may be included in a solid state drive ("SSD"). In some examples, an SSD may function as a replacement for an electromechanical disk drive and may implement the same interface as or a similar interface to the electromechanical disk drive the SSD is designed to replace. An SSD can be constructed with a variety of solid-state memory devices. By way of non-limiting examples, an SSD may include dynamic random access memory ("DRAM"), synchronous dynamic random-access memory ("SDRAM"), electrically erasable programmable read-only memory ("EEPROM"), NAND flash memory, and/or NOR flash memory.

To improve performance of a computing system, a data processing unit ("DPU") may be used to perform at least some input/output ("I/O") tasks, including accessing local and remote memory devices, such as SSDs. A non-volatile memory express ("NVMe") specification defines different namespace types (referred to as personalities) that are optimized for different use cases. A personality is a data storage model, namespace type, and command interface supported by a non-volatile memory device optimized for a specific type of access pattern and/or use case. Thus, the DPU may include and/or have access to multiple local and/or remote non-volatile memory devices that each implement one or more different personalities. A region of memory implementing a particular personality will be referred to as a personality region. A personality region may be implemented by one or more regions of one or more non-volatile memory devices. Unfortunately, logic implementing the personality(ies), such as logic avoiding or reducing write amplification, conventionally resides inside the non-volatile memory devices and/or is not standardized.

At least one embodiment provides methods of dynamically assigning a personality to one or more memory devices (e.g., one or more SSDs). The methods may be performed by a DPU, which may execute a software stack to implement and allocate the new personality. In at least one embodiment, a method receives an input (e.g., a storage access request) from a workload (e.g., an application), performs workload analysis on the workload, and determines a new (e.g., optimal) personality corresponding to the workload based on the workload analysis. The workload may be associated with a workload definition that may include an access size, an access boundary alignment, a data temperature (such as data ephemerality), etc. The workload analysis may evaluate the workload definition and determine the new personality (corresponding to the workload) based at least in part on that evaluation. The new personality along with a quantity of memory may be identified in the input (e.g., the storage access request) and/or determined by the workload analysis. In at least one embodiment, if a sufficient quantity of memory (in local and/or remote memory devices) having a personality that matches the new personality is available, the method assigns the new personality to the matching memory. On the other hand, if a sufficient quantity of matching memory is not available, the DPU assigns the new personality to available memory, which may include a single memory device, a portion of a memory device, multiple memory devices, or portions of multiple memory devices. Thus, according to at least one embodiment, data for the workload can be written to existing memory with a matching personality, or, if such existing matching memory is determined by the DPU to be unavailable, to available memory that may, at least partially, not match the new personality and/or may be present on multiple memory devices. The DPU may implement the new personality on one or more particular devices, for example, depending at least in part on the type of memory (e.g., the type of SSD, the type of NAND flash memory, and/or the like). The new personality may be assigned to available (e.g., non-matching) memory under any circumstances, such as drive failure, dynamic performance improvement, and/or recovery. By way of a non-limiting example, the new personality may be assigned to available (e.g., non-matching) memory whenever a new workload sends its first storage access request to the DPU.

Interactions with memory (e.g., an SSD) may generally be dependent on the personality of the interface. In at least one embodiment, a personality may be a key-value ("KV") personality type in which data is stored and retrieved using pairs of keys and associated values. Thus, a KV personality type interface may be able to store and retrieve data indexed by keys. By way of another non-limiting example, a personality might support a block mode access with single-vector addresses. Yet another personality might make an SSD appear as a conventional hard disk. For example, such a personality may implement a hard disk interface that may support interactions that use cylinder, head, and sector addresses.

FIG. 1 illustrates different types of NAND flash memory cells, in accordance with at least one embodiment. Flash memory cell design involves a variety of design tradeoffs that have spawned a variety of cell designs (e.g., from competing manufacturers). For example, an individual cell of solid state memory may include a single level cell ("SLC") 102, a multi-level cell ("MLC") 104, a triple-layer cell ("TLC") 106, a quad-level cell ("QLC") 108, or penta-level cell ("PLC") 110. The SLC 102 represents a simple binary value, a one or a zero. As a result, the SLC 102 may be fast and reliable, but may tend to be more expensive per unit of data storage because the SLC 102 has lower data density that other types of flash memory cells. The MLC 104 stores two bits, the TLC 106 stores three bits, the QLC 108 stores four bits, and the PLC 110 stores five bits. As the number of bits per cell increases, durability tends to decrease, and speed also tends to decrease, although cost and data density improve. In addition to the above flash memory cell variations, the flash memory cells may be arranged on some memory chips in a 3-dimensional layout to increase density. At least some of the flash memory cell variations may be better suited for use with different wear-leveling techniques and/or different data caching techniques.

Some SSDs implement an interface, like Serial Attachment ("SATA") 3.0, which is the same interface used on many electromechanical disk drives. Other SSDs implement a faster interface specific to solid state memory storage devices (e.g., specified by the NVMe specification). SSDs are used in many environments, such as in data centers, computer networks, and as part of a system providing online computing resources. For example, SSDs may be used to implement memory device 2920 in the system illustrated in FIG. 29, or data storage 3024 in the system illustrated in FIG. 30. In some applications, conventional SSDs are reaching capacity and performance scaling limits. In part, this is because some SSD adaptations are based on legacy hard disk drive software stacks so that newer NAND flash memory could be used with minimal changes to existing file systems. Various techniques described herein address this and other limitations providing a custom software stack to interface to the SSD. Although effective, developing a new software stack may require a significant amount of time and resources.

In various embodiments, changes to NAND flash memory technology require changes in software deployment strategy. Hard disk software stacks have been relatively stable, but TLC, QLC, PLC, and other solid state memory, such as DC Persistent Memory ("DCPM") media, may require different solutions to deal with performance characteristics of the underlying memory cell. For example, memory cell structure and design may impact the software stack in one or more of the following six ways.

First, the number of bits stored per NAND scale reduces NAND endurance (program/erase cycle) capability. In various examples, adjustments to workload shaping and sequentialization of the data are used to minimize write amplification.

Second, in various cell designs, NAND read, program, and erase times are increased to improve storage density. Adapting to this often forces changes to scheduling and load balancing algorithms to maintain systemwide performance.

Third, 3D NAND may cause changes to erase block management, where a single sub block within a super block can be erased and written at one time. This may add constraints on how many blocks can be written at one time.

Fourth, as a number of NAND dies within NAND packages increases, memory bandwidth per gigabyte generally lowers. This trend encourages changes in the software stack to accommodate changes in die parallelism.

Fifth, in some flash memory designs, node size scaling for NAND cells has extended beyond what is generally used for DRAM, and the number of planes within a die has generally increased. In order to align writes to a NAND boundary, some systems use larger write sizes to align writes to the NAND boundary.

Sixth, various proprietary NAND implementations, such as V-NAND™ (Samsung), and XL-Flash™ (Kioxia), recommend unique memory-system architectures.

Different memory use cases often use specific architectures to improve overall system performance. For example, compute SSDs generally service more demanding workloads and applications when compared to storage SSDs. Various service providers that provide computing and data storage services may select a wide variety of cost/performance tradeoffs based on the needs of their respective customers.

Since solid state memory cells can have such disparate performance characteristics, performance variation across different SSDs can be substantial and write amplification can cause excessive use of resources and power in some examples. For example, for a write amplification of 4, 4×NAND usage is wasted along with additional over provisioning (e.g., total NAND flash memory capacity is greater than total namespace capacity(ies)). In addition, many computing service providers ("CSPs") qualify each vendor's implementation of the NVMe specification separately, and adjust a flash translation layer ("NAND FTL") optimizations to their own preferences. Thus, standardization may be difficult to achieve.

The NVMe specification allows for the use of case specific namespaces in addition to generic block device namespaces. Non-limiting examples of such added namespaces may include one or more of the following:
1. Zone Namespace, which may be optimized for QLC low endurance NAND flash memory;
2. Key Value Namespace, which may be optimized for a data store having a KV personality type;
3. Lite NVMe, which may be optimized for a compute based open channel architecture; and
4. Computational Namespace, which may be used—in storage-based computation.

The NVMe specification may define other features including NVMe sets, streams and directives, and endurance groups.

Many SSD manufacturers add features to maintain compatibility, which may go unused. Many of these features require significant software development resources, reducing resources available for supporting next generation NAND technologies that can provide meaningful cost and capacity benefits.

Various embodiments described herein may address the above issues in novel and unique ways. For example, one example provides a new modular software stack deployed in a DPU to address not only scaling problems, but also to provide flexibility to adapt easily to the characteristics of emerging memory technologies.

Various embodiments described herein address these issues by providing a data storage software stack that is independent of the underlying memory cell technology (e.g., NAND flash memory). In some examples, this is accomplished by decoupling a transport layer from a flash management layer (e.g., specified by the NVMe specification). In one example, this approach allows the transport layer and the flash translation layer (e.g., specified by the NVMe specification) to execute within the DPU while a common flash Application Programming Interface ("API") runs within SSD flash devices. Such solutions allow CSPs to encapsulate an NVMe stack outside a network interface that includes the DPU (e.g., a network interface card ("NIC")). At least one embodiment described herein defines the storage stack architecture in such a way that at a portion of the storage stack architecture can be offloaded to the DPU efficiently and/or easily adapted to future generation memory (e.g., NAND flash memory) technologies.

Figure 2:
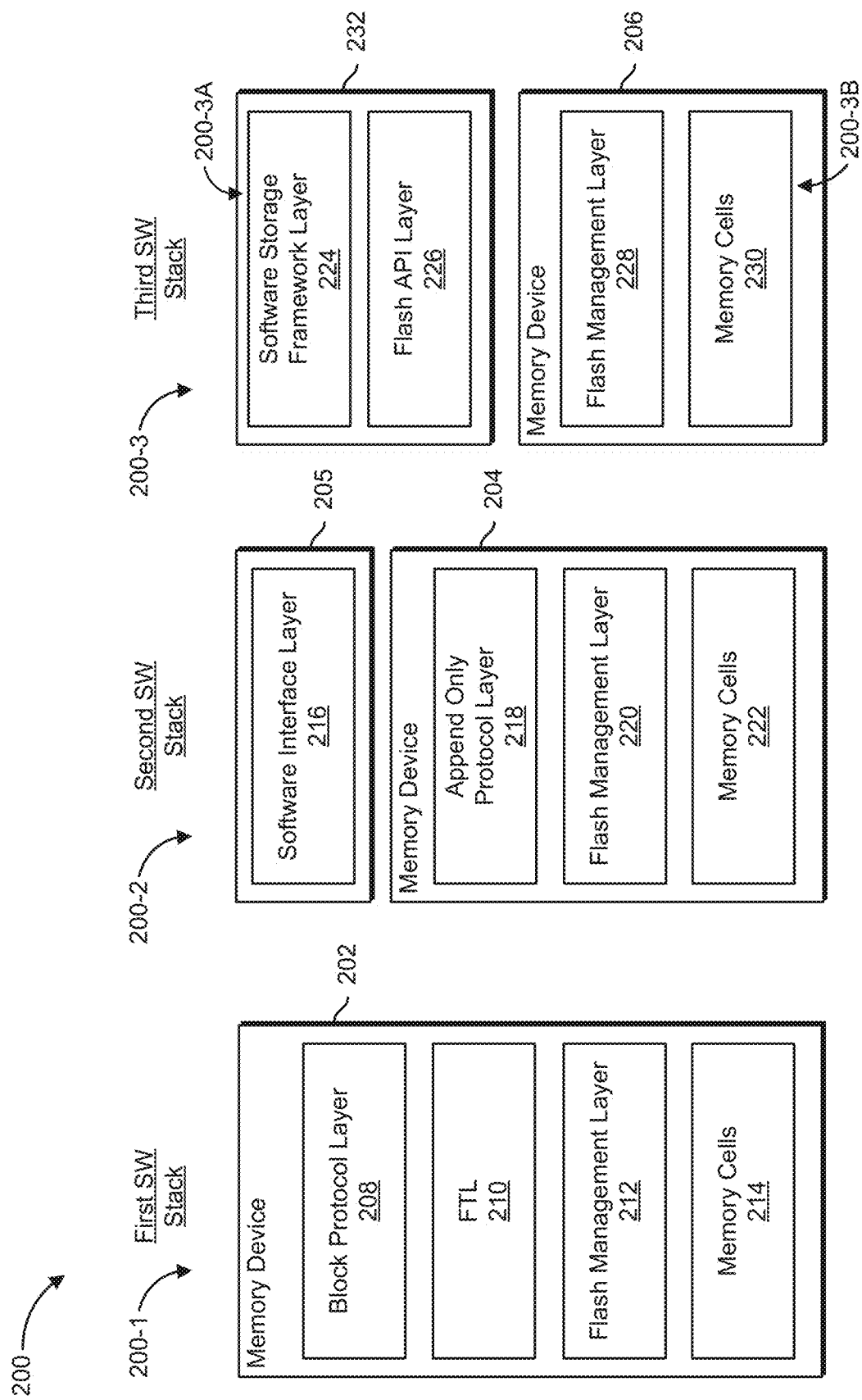
FIG. 2 illustrates software stacks for managing NAND memory, such as the NAND cells illustrated in FIG. 1, in accordance with at least one embodiment.

FIG. 2 illustrates software stacks 200 for managing memory, such as the NAND cells illustrated in FIG. 1, in accordance with at least one embodiment. In a first SW stack 200-1, a memory device 202, such as an SSD, may operate as a block device. In this first SW stack 200-1, a block protocol layer 208 (e.g., specified by the NVMe specification), flash translation layer 210, and flash (e.g., NAND flash memory) management layer 212 are encapsulated within the memory device 202. In general, memory cells 214 (e.g., NAND cells) may be managed in a way that is limited by the interface of the block device (e.g., the memory device 202) provided.

In another example, a second SW stack 200-2 moves the features of write shaping (from the block protocol layer 208) and flash translation (from the flash translation layer 210) into a separate software interface layer 216 outside of a memory device 204 (e.g., an SSD). The software interface layer 216 may be implemented by a DPU 205 (e.g., of a network interface). The software interface layer 216 may include the functionality of the flash translation layer 210 or a portion thereof. An append only protocol layer 218, and a flash (e.g., NAND flash memory) management layer 220 remain in the memory device 204. While write shaping was removed from the block protocol layer 208, some functionality remains (e.g., specified by the NVMe specification) on the memory device 204 and resides in the append only protocol layer 218. In general, memory cells 222 (e.g., NAND cells) are managed in a way that is more flexible and can adapt to the cell design to some extent. As a result, the second SW stack 200-2 may require more processing power from the host than the first SW stack 200-1, and scalability may be limited in some implementations. For example, a Zoned Namespace may require new file systems, and/or field-programmable gate array(s) ("FPGA(s)") and/or hardware ("HW") acceleration for write shaping.

A third SW stack 200-3 may address one or more of these issues by offloading the block protocol layer 208 and the flash translation layer 210 from a memory device 206 to a DPU 232 (e.g., of a network interface) as a software storage framework layer 224 and a flash API layer 226. In this embodiment, the memory device 206 continues to host flash (e.g., NAND flash memory) management 228 and memory cells 230 (e.g., NAND cells).

The third SW stack 200-3 allows the memory device 206 to implement a common interface to manage software defined flash and expose the memory cell (e.g., NAND cells) read, write, and erase APIs. In various examples, these can be standard across all SSD vendors and for all types of NAND flash memory or media types.

The third SW stack 200-3 may be characterized as including sub-SW stacks 200-3A and 200-3B, which are executed by the memory device 206 and the DPU 232, respectively. In some examples, the software storage framework layer 224 and the flash API layer 226 may form the sub-SW stack 200-3A that may be implemented within the DPU 232 (e.g., implemented by one or more Arm cores). The sub-SW stack 200-3A may encompass NVMe namespace management, flash translation, and a workload interface. The sub-SW stack 200-3A may be configured (e.g., optimized) to interface file systems (e.g., the host file system and the SSD file system) and system calls.

In some examples, a CSP or enterprise original equipment manufacturer ("OEM") may develop the sub-SW stack 200-3A, which may be implemented as a custom solution in a modular fashion since the sub-SW stack 200-3A executes outside the memory device 206 (on the DPU 232 for example) and manages flash but not the sub-SW stack 200-3B. In some implementations, this sub-SW stack 200-3A can be open source or enhanced based on an existing NVMe open-source implementation such as SPDK, lite NVMe, open channel, and/or the like.

The third SW stack 200-3 illustrated in FIG. 2 addresses scalability challenges. The third SW stack 200-3 may be adapted to each memory type (e.g., NAND flash memory type), workload type, number of tenants, and so on.

Since the sub-SW stack 200-3A may be modular, it can be swapped in and out easily and moved to a hypervisor without requiring substantial changes. This allows a CSP to include a unique value proposition or solution implemented with storage stack changes within the modular part of the code.

Since workloads and applications can be migrated from one server to another or one CPU to another, the third SW stack 200-3 enables live migration of storage which may be more difficult with alternative designs. Storage personalities and/or characteristics may be migrated from one DPU to another either by keeping the underlying storage media the same or by physically migrating the entire storage stack to a different physical storage media.

The third SW stack 200-3 may also enable a single SSD to be used with or assigned different personalities dynamically. With other SW stacks, this is not feasible because SSDs are normally manufactured with personalities and are shipped from the factory with these predetermined personalities. For example, Zone Namespace SSD may not be usable in key-value or open channel mode and vice versa. The third SW stack 200-3 provides flexibility that eliminates this limitation. This flexibility can be important in dynamic environments, such as those within cloud computing environments. In at least one embodiment, one or more of the SW stacks 200-1, 200-2, and 200-3 may be implemented using software stack 4000 illustrated in FIG. 40. In at least one embodiment, the software stack 200-1, the software stack 200-2, and/or the software stack 200-3 may be implemented by a processor(s) executing instructions stored on a non-transitory computer-readable medium.

Figure 3:
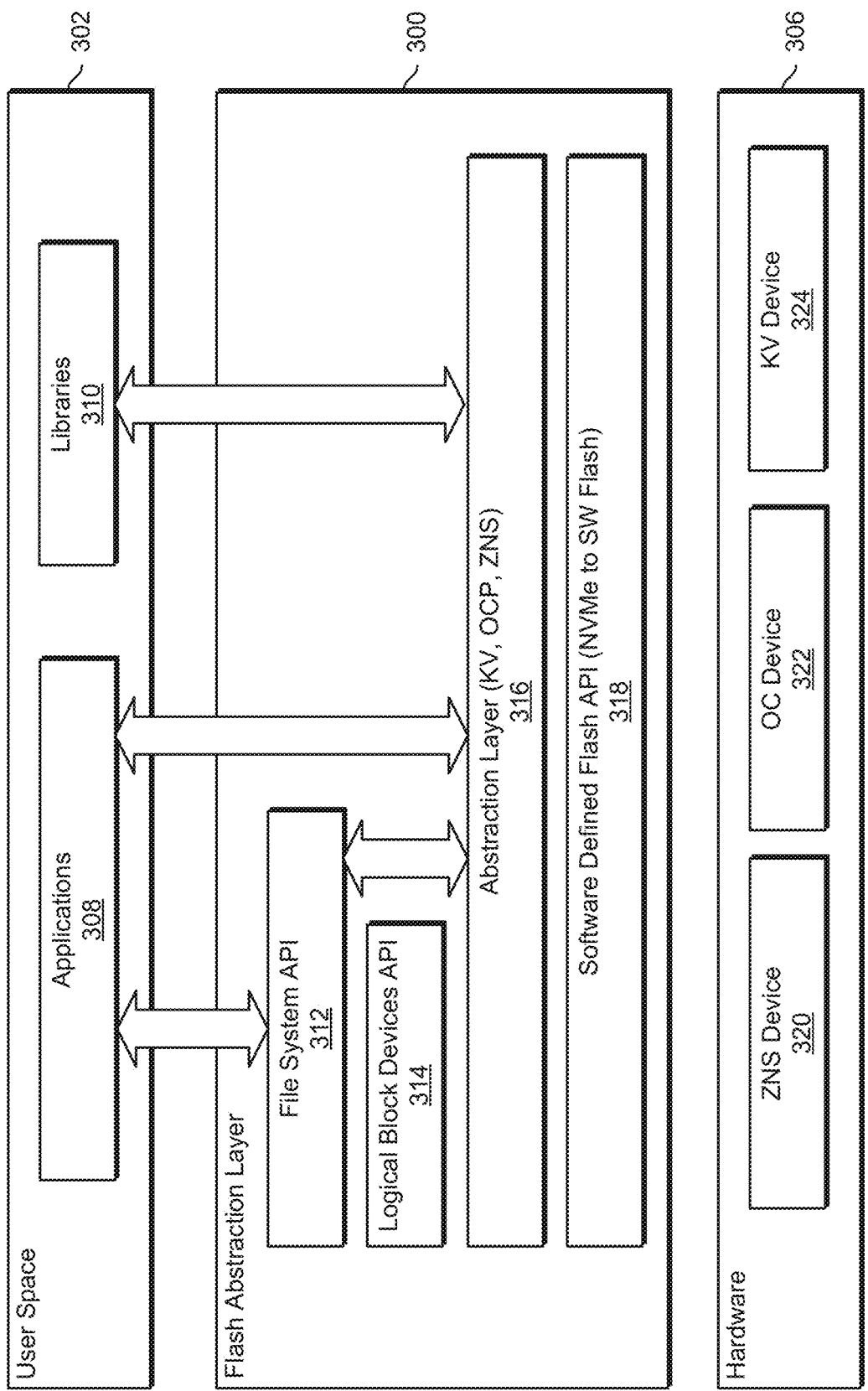
FIG. 3 illustrates a software stack similar to that of the third SW stack in FIG. 2 with data processing unit ("DPU") driven offload, in accordance with at least one embodiment.
Figure 4:
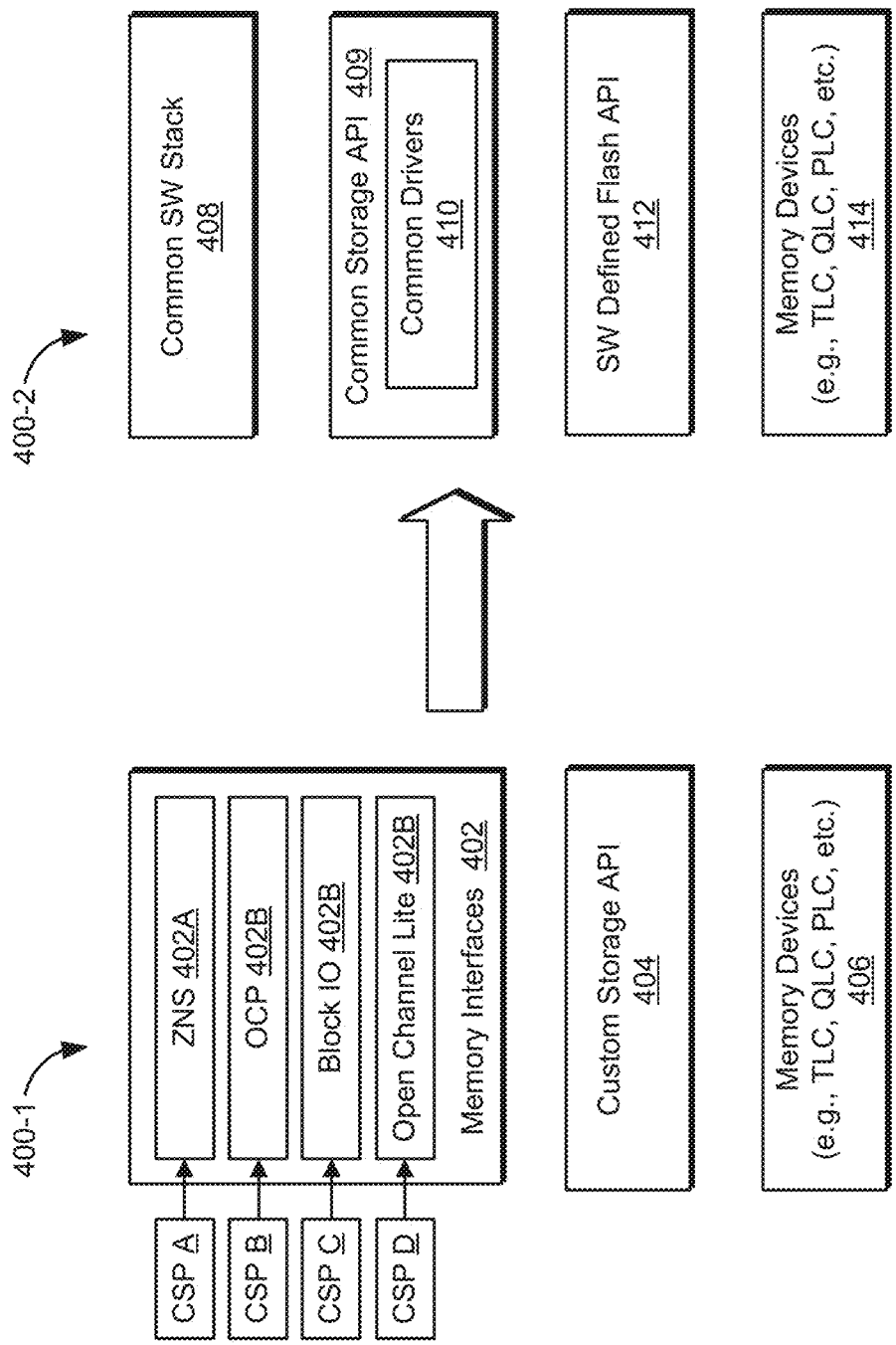
FIG. 4 illustrates a software stack that provides decoupling of a software-defined flash API, in accordance with at least one embodiment.

FIG. 3 illustrates a software stack similar to that of the third SW stack 200-3 in FIG. 2 with DPU-driven offload, in accordance with at least one embodiment. FIG. 3 shows a flash abstraction layer 300 (e.g., a kernel), a user space 302 (e.g., executed by a host processor), and hardware 306 (e.g., one or more SSD). The flash abstraction layer 300 may be executed by a DPU and/or a hypervisor. For example, the flash abstraction layer 300 may be moved from the DPU to hypervisor space and vice versa. In at least one embodiment, the flash abstraction layer 300 includes a file system API 312, an API 314 for logic block devices, an abstraction layer 316, and a software-defined flash API 318. The abstraction layer 316 may be an implementation of the software storage framework layer 224 (see FIG. 2) and the software-defined flash API 318 may be an implementation of the flash API layer 226 (see FIG. 2). The abstraction layer 316 enables decoupling or abstraction of storage stack resources (e.g., the file system API 312 and/or the API 314 for logic block devices) from the underlying hardware platform (e.g., the hardware 306) for greater flexibility as shown in FIG. 4. The software stack illustrated in FIG. 3 decouples an interface provided by the software-defined flash API 318 from software within the memory device(s) (e.g., flash), enabling appropriate adaptations for each memory type and allowing seamless swapping of drive personalities in a DPU framework. For example, various types of memory devices (e.g., SSDs) with different cell designs can be used without major changes to the software interface stack.

In one example, a set of applications 308 and a set of libraries 310 are hosted by a computer system in the user space 302. A user space typically includes memory space accessible to users, and may be associated with execution privileges that limit access to certain administrative operations. The application(s) 308 and the library(ies) 310 interface with the flash abstraction layer 300, for example implemented as a kernel, such as a Linux™ kernel, a Compute Unified Device Architecture ("CUDA") kernel, and/or the like. A kernel is generally a memory area containing API functions that run with elevated execution privileges. The flash abstraction layer 300 may include the file system API 312 and the API 314 for logical block devices. These APIs 312 and 314 interface through the abstraction layer 316 and the software-defined flash API 318 to the physical memory hardware 306. The physical memory hardware 306 may include memory of various types such as a zone namespaces ("ZNS") device 320, an open compute project ("OCP") device 322, and a key-value ("KV") device 324.

In at least one embodiment, the abstraction layer 316 can be offloaded to a co-processor or a DPU. In at least one embodiment, the abstraction layer 316 can provide a plurality of memory interfaces such as KV, ZNS, and OCP interfaces. In some embodiments, the abstraction layer 316 can provide an interface to the same type of memory device (e.g., an SSD), or a different type of memory device via a flash translation layer. The flash translation layer may be a component of the abstraction layer 316 and/or the flash abstraction layer 300. By way of a non-limiting example, the abstraction layer 316 may provide an interface of a ZNS device to one of the application(s) 308 in the user space 302, but the flash abstraction layer 300 may provide physical memory using the OCP device 322. Thus, the application may behave as if the application is communicating with a ZNS device when in fact the application is communicating with the interface of the OCP device 322 via the flash abstraction layer 300. In this manner, the flash abstraction layer 300 (e.g., the abstraction layer 316 and/or the flash API 318) may translate communications between interfaces of different memory types.

In at least one embodiment, the applications 308, libraries 310, file system API 312, logical block devices API 314, abstraction layer 316, and/or software defined flash API 318 may be implemented by a processor(s) executing instructions stored on a non-transitory computer-readable medium.

FIG. 4 illustrates a software stack that provides decoupling of a software-defined flash API, in accordance with at least one embodiment. In a software stack 400-1, a number of CSPs A-D implement different memory (e.g., SSD) interfaces 402 (e.g., within a cloud computing system). In the example shown, the memory interfaces 402 include ZNS, OCP, Block IO, and Open Channel Lite APIs 402A-402D implemented by the CSPs A-D, respectively. The APIs 402A-402D may access separate drivers for each device type in a custom storage API 404. For example, custom storage API 404 may include, for example, a ZNS device driver, an OCP device driver, a Block IO device driver, an Open Channel Lite device driver, and/or a KV device driver. Each device driver communicates with one or more of memory devices 406 of the corresponding type.

A software stack 400-2 includes a common software stack 408, a common storage API 409, and a software-defined flash API 412. The common software stack 408 may be an implementation of the application(s) 308 (see FIG. 3) and/or the library(ies) 310 (see FIG. 3) of the user space 302 (see FIG. 3). The common storage API 409 may be an implementation of the software storage framework layer 224 (see FIG. 2), the abstraction layer 316 (see FIG. 3), the file system API 312, and/or the API 314 for logical block devices. The software-defined flash API 412 may be an implementation of the flash API layer 226 (see FIG. 2) and/or the software-defined flash API 318 (see FIG. 3). Memory device(s) 406 may be an implementation of the memory device 202 (see FIG. 2), the memory device 204 (see FIG. 2), the memory device 206 (see FIG. 2), and/or hardware 306 (see FIG. 3).

In at least one embodiment, the software stack 400-1 and/or the software stack 400-2 may be implemented by a processor(s) executing instructions stored on a non-transitory computer-readable medium.

In various examples, the software-defined flash API 412 allows common components (e.g., the common software stack 408) that are adapted for use with specific types of memory devices to use one or more of the physical memory device(s) 414 of the same or different types. The software-defined flash API 412 may, in some examples, translate an interface from one type of memory device to another. For example, the common software stack 408 that includes one or more applications in user space may access storage services via a set of common drivers 410 within the common storage API 409. The set of common drivers 410 may include file system and logical block device APIs (e.g., the APIs 312 and 314 illustrated in FIG. 3), as well as a set of APIs for accessing memory device of various types. The APIs for various memory device types, also referred to as an abstraction layer (e.g., the abstraction layer 316 illustrated in FIG. 3), may be implemented as a single library supporting multiple memory device types, or as multiple libraries. The abstraction layer translates the type-specific interface to the software-defined flash API 412, which converts a common set of commands into commands specific to the physical memory device. Therefore, the type of memory device interface provided to an application by the abstraction layer may be different than the actual type of the memory device present in one or more of the physical memory device(s) 414 accessed by the application.

Figure 9:
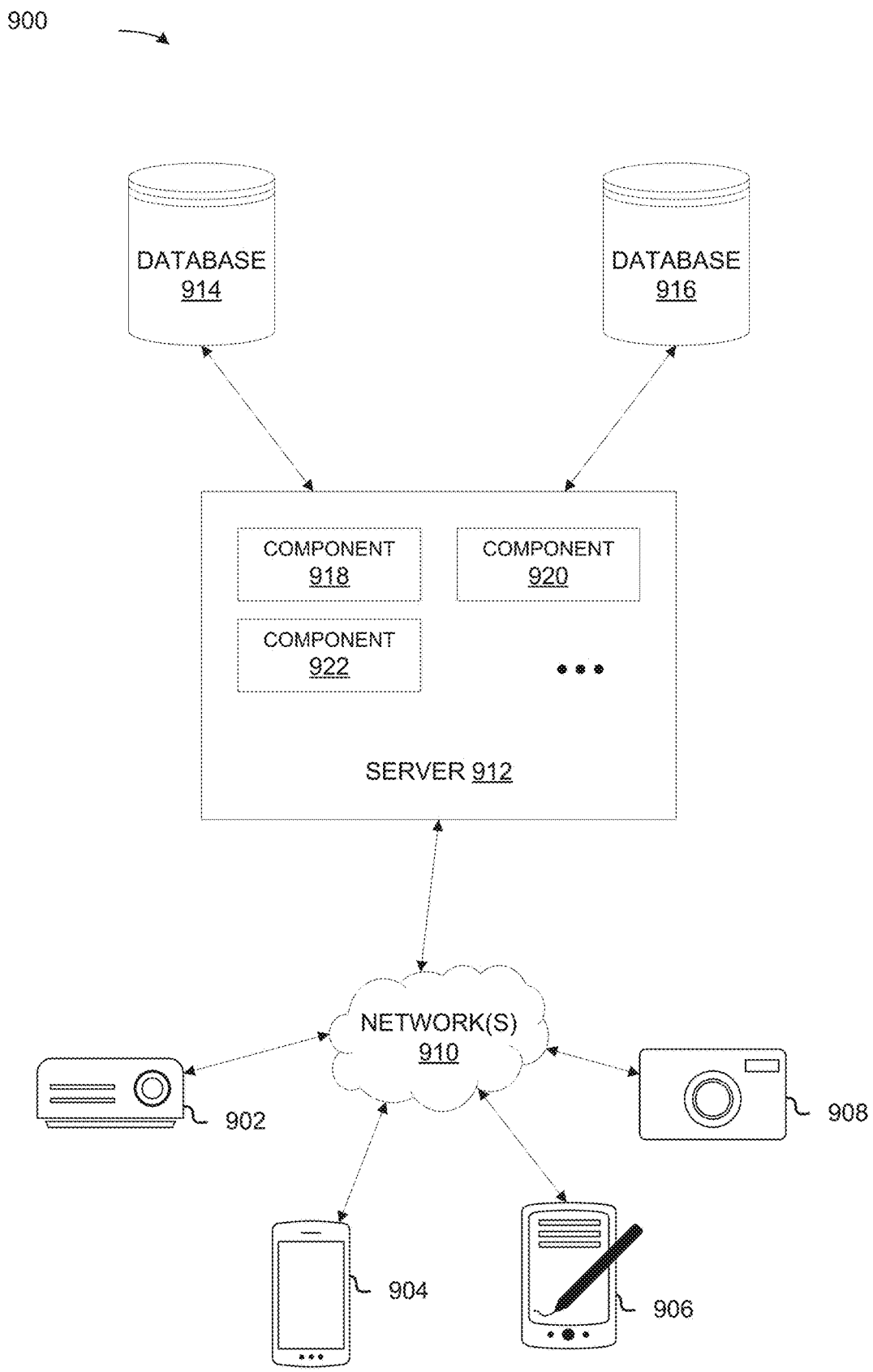
FIG. 9 illustrates a distributed system, in accordance with at least one embodiment.
Figure 10:
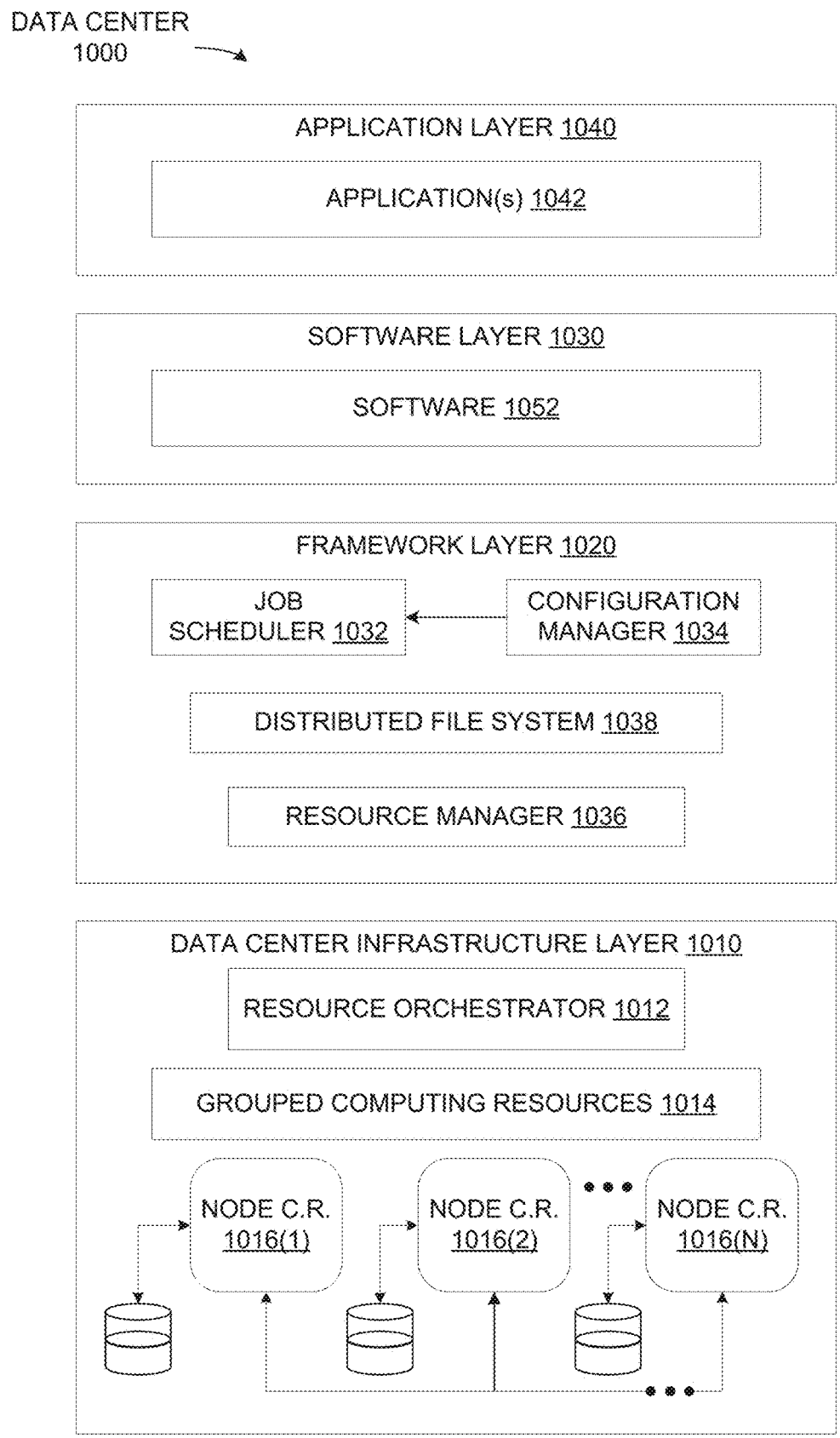
FIG. 10 illustrates an exemplary data center, in accordance with at least one embodiment.
Figure 11:
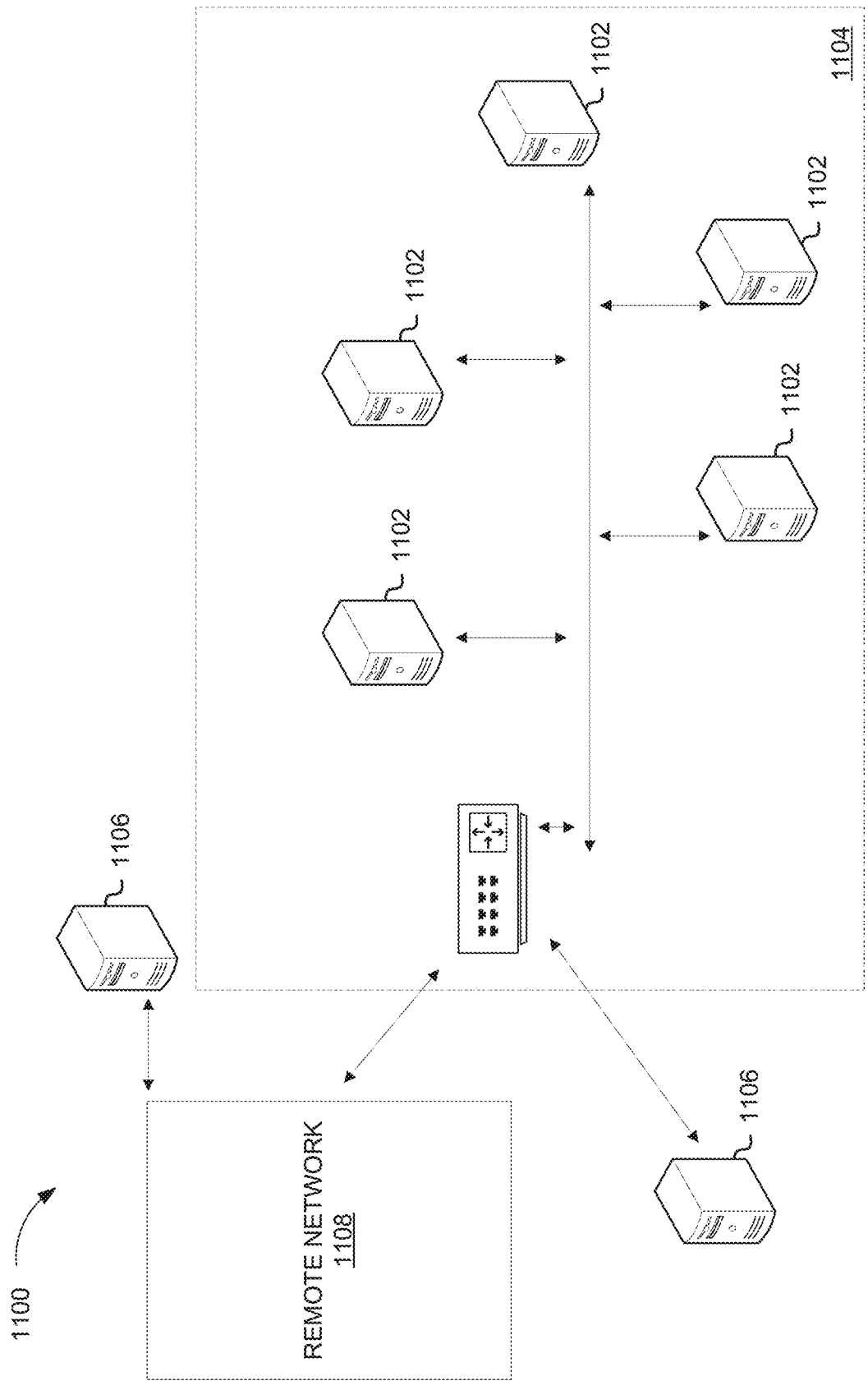
FIG. 11 illustrates a client-server network, in accordance with at least one embodiment.
Figure 12:
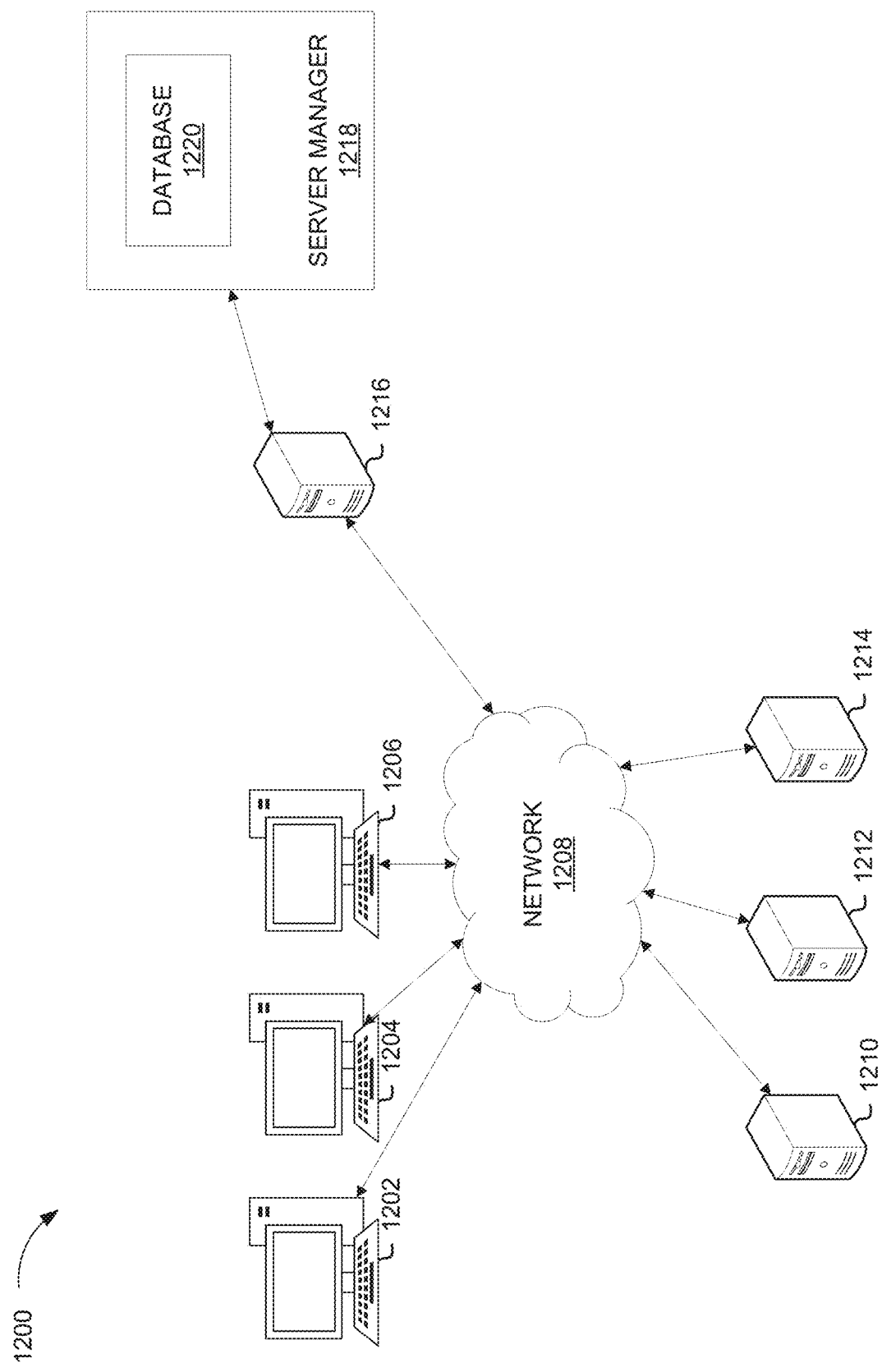
FIG. 12 illustrates an example of a computer network, in accordance with at least one embodiment.
Figure 13A:
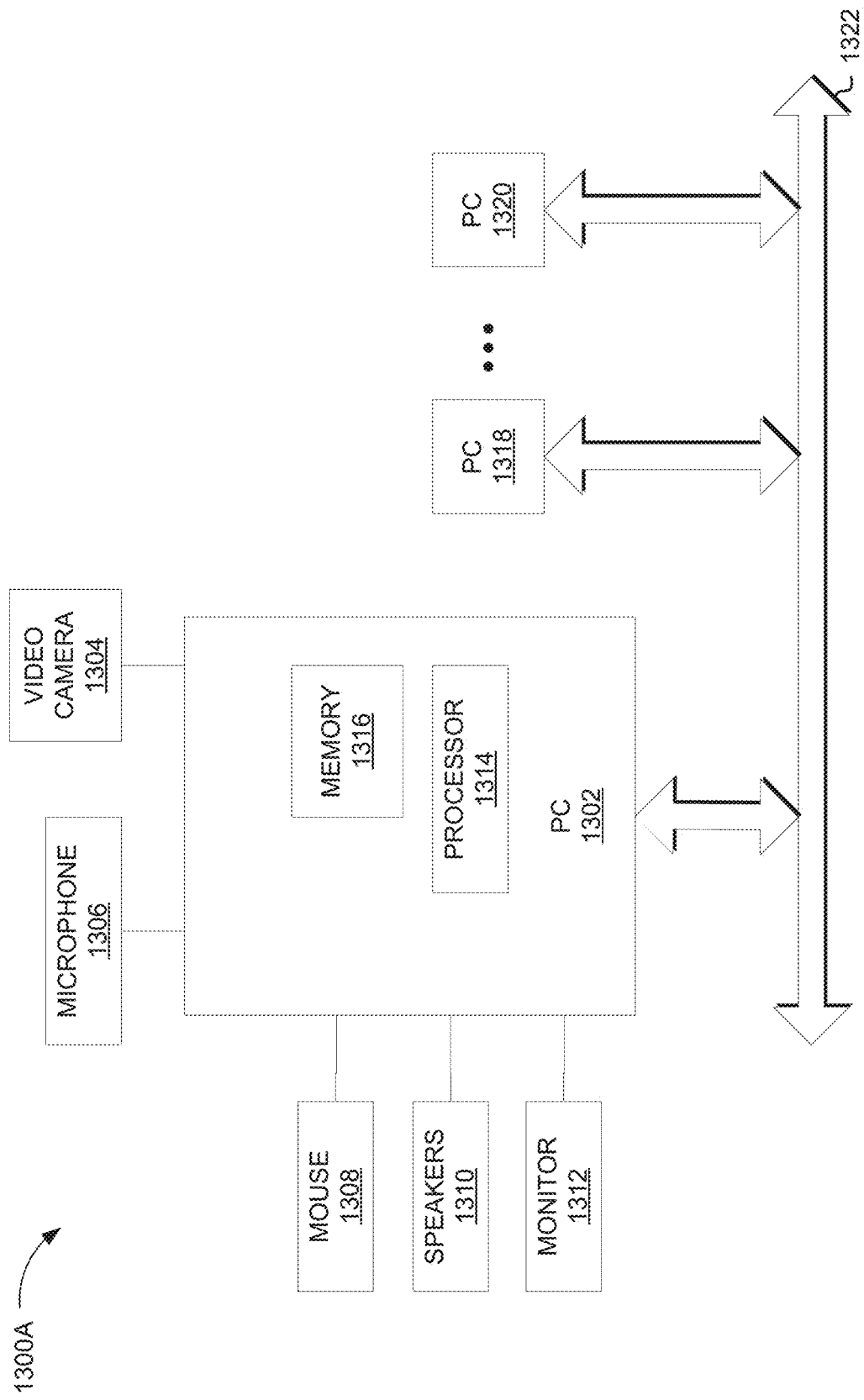
FIG. 13A illustrates a networked computer system, in accordance with at least one embodiment.
Figure 13B:
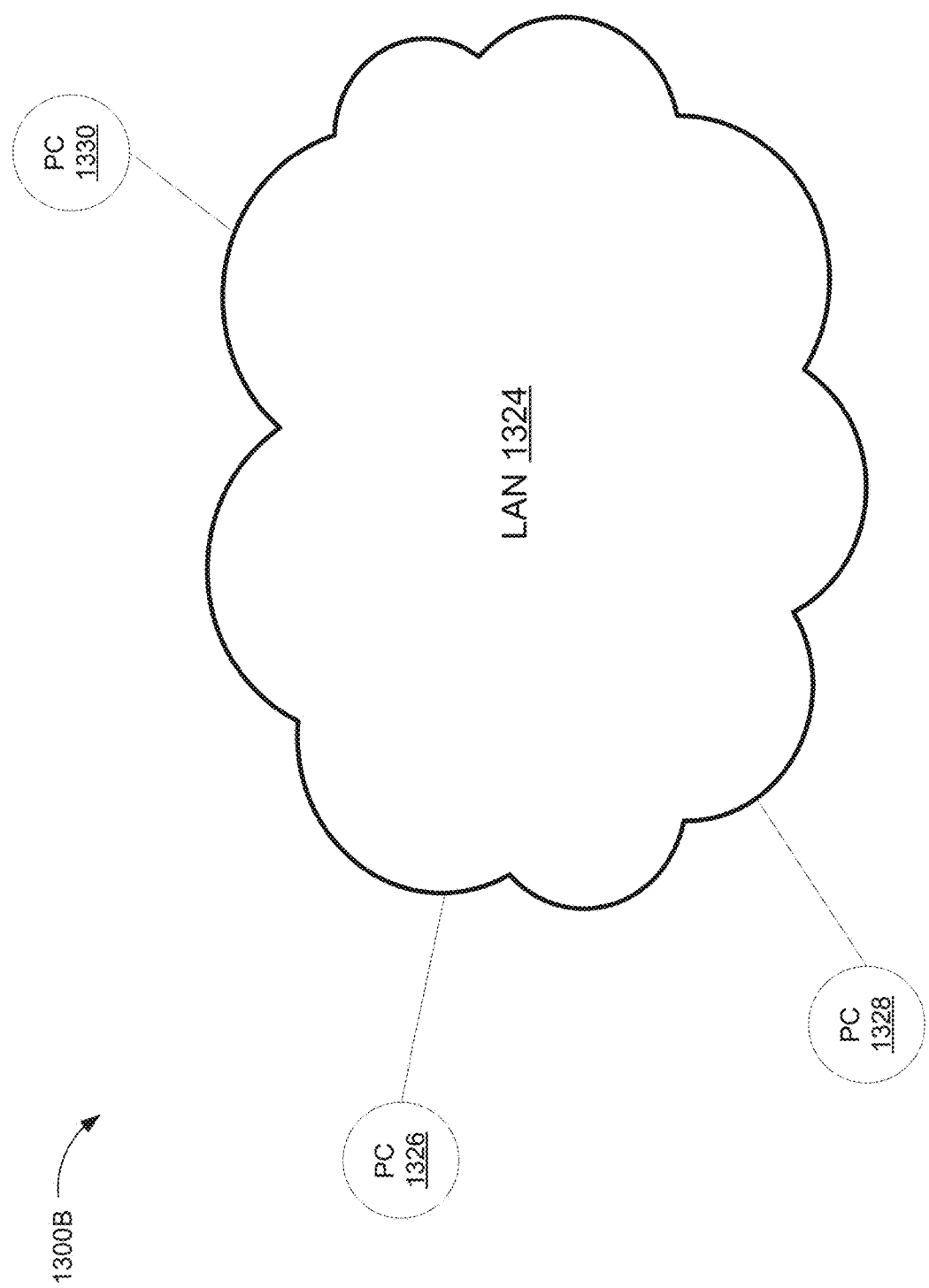
FIG. 13B illustrates a networked computer system, in accordance with at least one embodiment.
Figure 13C:
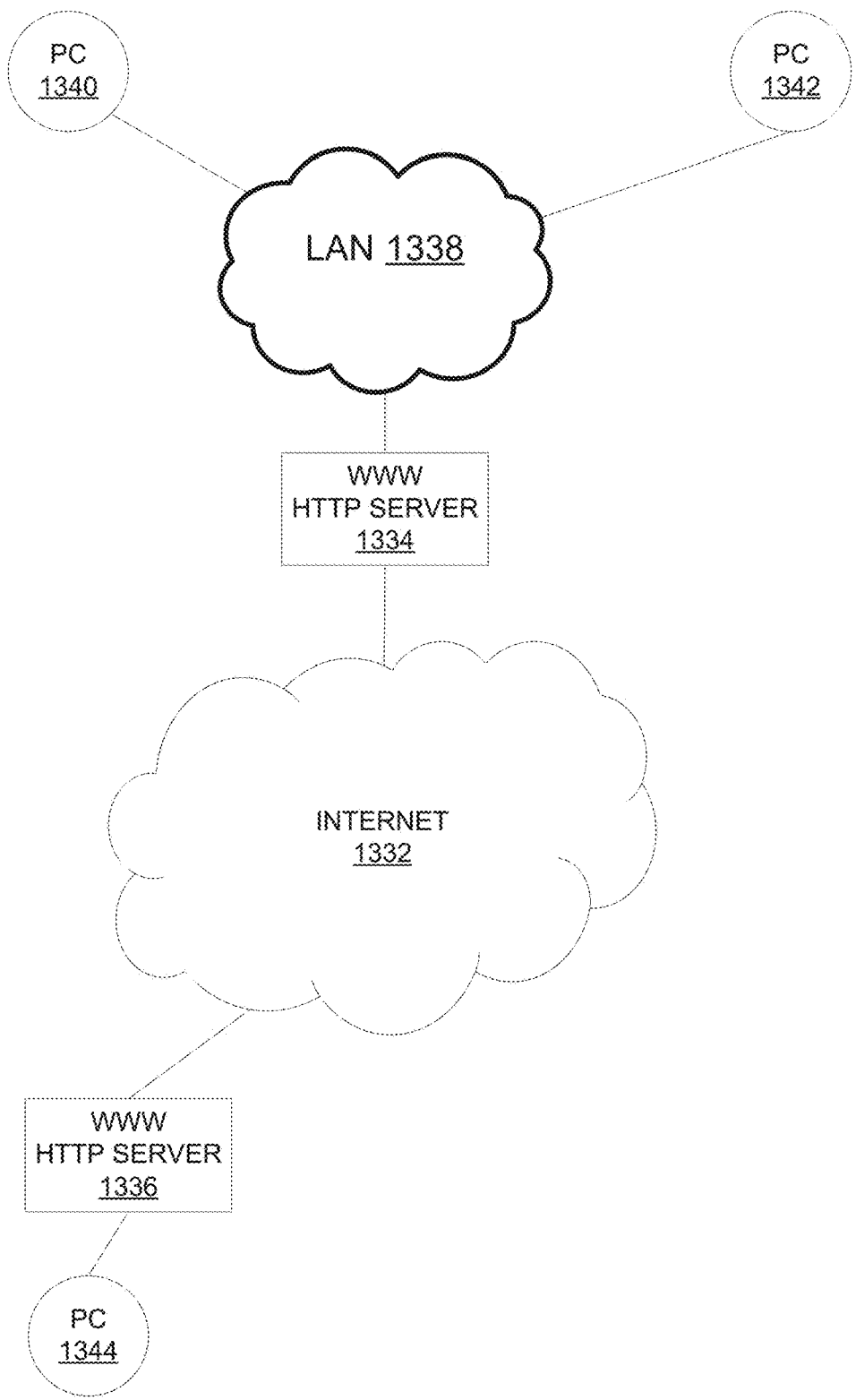
FIG. 13C illustrates a networked computer system, in accordance with at least one embodiment.
Figure 14:
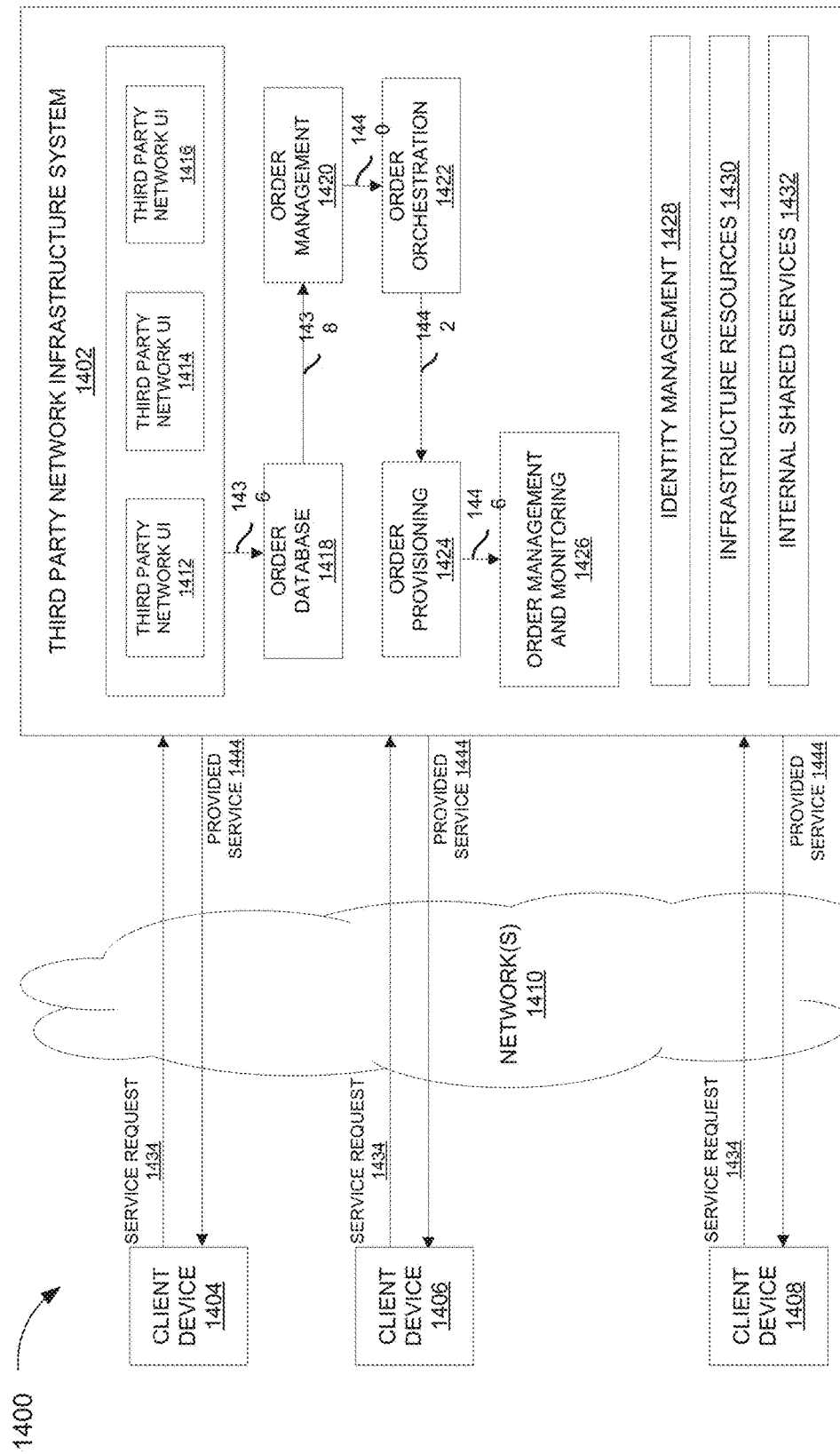
FIG. 14 illustrates one or more components of a system environment in which services may be offered as third party network services, in accordance with at least one embodiment.
Figure 15:
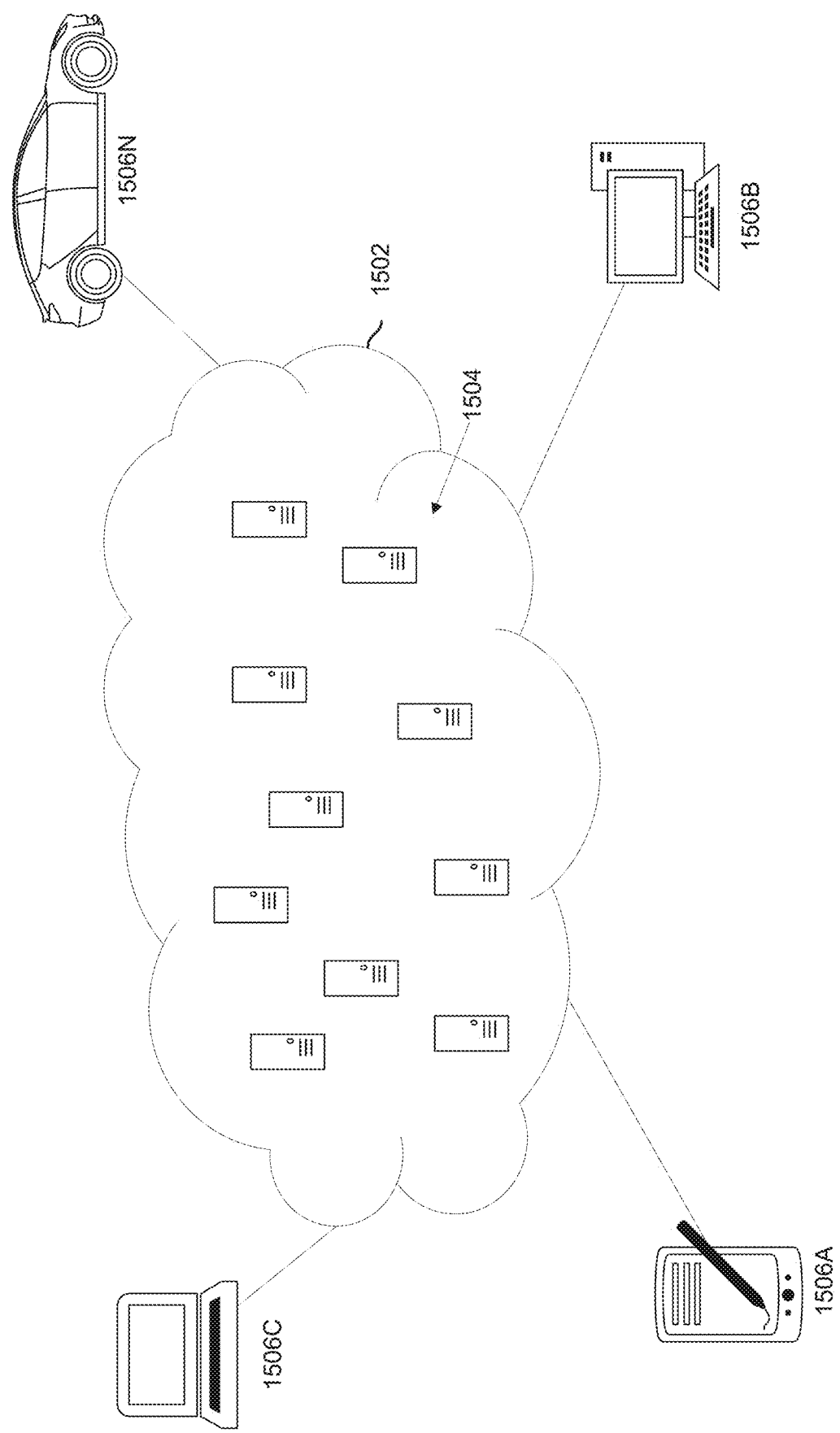
FIG. 15 illustrates a cloud computing environment, in accordance with at least one embodiment.

As non-limiting examples, the software stacks 400-1 and 400-2 may be deployed in a variety of environments such as the distributed system 900 illustrated in FIG. 9, the datacenter 1000 illustrated in FIG. 10, the system 1100 illustrated in FIG. 11, the computer network 1200 illustrated in FIG. 12, the networked computer system 1300A illustrated in FIG. 13A, the networked computer system 1300B illustrated in FIG. 13B, the networked computer 1300C system illustrated in FIG. 13C, the environment 1400 illustrated in FIG. 14, and/or the cloud computing environment 1502 illustrated in FIG. 15.

In various examples, SSD device personality (such as Zone Namespace or Open Channel) may be implemented through a software stack in a DPU, which allows each cloud service provider or SSD vendor to customize memory without requiring substantial changes to the supporting hardware. For example, Software Defined NAND Flash ("SDNF") may be customized without requiring substantial changes to the supporting SSD hardware. With this approach, SDNF may be customized to be specific to a workload type, namespace type, and/or NAND flash type. Table A below provides a comparison of SDNF features to alternative implementations, such as Software Defined Network Accelerated Processing ("SNAP") and Storage Performance Development Kit ("SPDK").

TABLE A

| Software Defined Network Accelerated Processing ("SNAP") and Storage Performance Development Kit ("SPDK") | Software Defined NAND Flash ("SDNF") |
| --- | --- |
| Device Personality (i.e., ZNS, block device, KV, Open Channel) defined by device | Device personality defined by software |
| NVMe command handling in device | NVMe to software-defined flash API in software and device executes NAND access and admin commands |
| Uses drive support for each personality | Common driver may support multiple personalities |
| FTL included inside device especially for block devices | Flexibility in FTL management, software stack defines level of FTL in software or in SSD |
| Challenging to integrate new type of NAND (for example QLC or PLC), software and hardware integration required | To integrate a new type of NAND memory, software can configure or optimize device personality as needed |
| NVMe command API and placement type changes with device personality changes | Device APIs are constant - software stack manages placement policy such as zone, stream, set, or parallel unit |
| Challenging to manage resource sharing, multi-tenancy, service level agreements, and load balancing | Improved ability to manage resource sharing, multi-tenancy, service level agreements, and load balancing |

As technology improves, NAND based SSDs often displace SATA SSDs in cloud computing applications and have nearly eliminated the use of serial attached SCSI ("SAS") hard disk drives. Unfortunately, existing implementations generally lack the ability to offload storage stack processing to a DPU, which has prevented the use of DPUs in public cloud computing infrastructure. The techniques described herein provide a mechanism that offloads storage stack processing to a DPU through a software defined flash API (e.g., that may solve one or more NAND flash scalability challenges), such as the flash API layer 226 (see FIG. 2), the software-defined flash API 318 (see FIG. 3), and/or the software-defined flash API 412. These techniques may enable increased adoption of DPUs in cloud and enterprise OEM server architectures.

Figure 5:
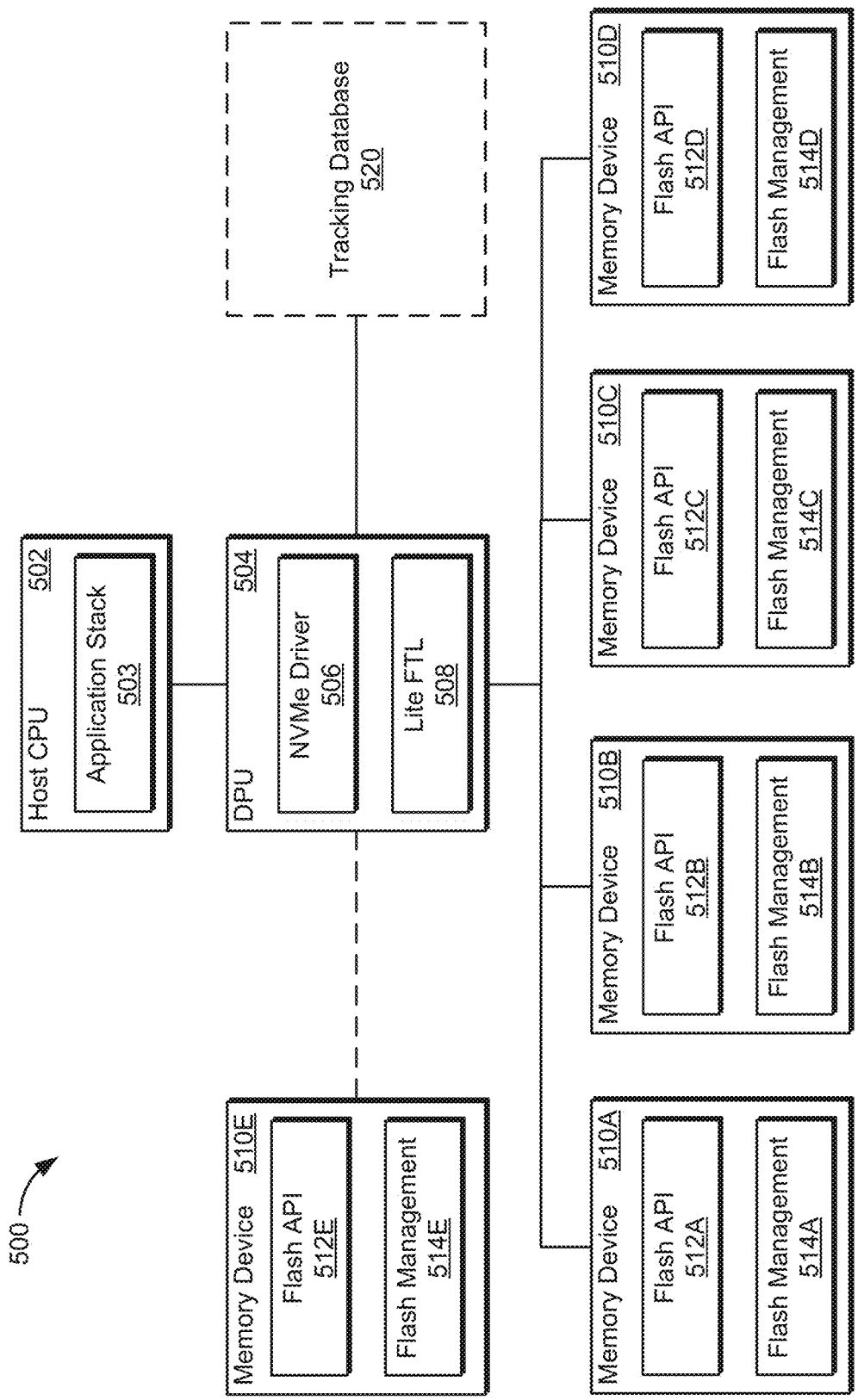
FIG. 5 illustrates a system that translates commands (e.g., specified by the non-volatile memory express ("NVMe") specifications) into calls to a flash application programming interface using a lite flash translation layer ("FTL") implementation hosted by a DPU, in accordance with at least one embodiment.

FIG. 5 illustrates a system 500 that translates commands (e.g., specified by the NVMe specifications) into calls to a flash API using a lite flash translation layer ("FTL") 508 implementation hosted by a DPU 504, in accordance with at least one embodiment. In the example illustrated, the system 500 includes a host CPU 502, the DPU 504, and one or more memory devices 510A-510E (e.g., SSDs). The memory device 510E may be implemented as a remote memory device and the memory devices 510A-510D may be implemented as local memory devices. The host CPU 502 may implement a kernel or application stack 503. The DPU 504 may implement an NVMe driver 506 and the lite FTL 508. In the example illustrated, the memory devices 510A-510E implement flash APIs 512A-512E, respectively, and flash management APIs 514A-514E, respectively.

By way of a non-limiting example, the system 500 may be an implementation of the second SW stack 200-2 in which the software interface layer 216 is implemented by the NVMe driver 506 (e.g., to perform write shaping) and the lite FTL 508 (the flash translation layer) and the append only protocol layer 218 is implemented by the flash APIs 512A-512E. The application stack 503 may be an implementation of the common software stack 408 (see FIG. 4) and/or the application(s) 308 (see FIG. 3) and/or the library(ies) 310 (see FIG. 3) of the user space 302 (see FIG. 3). The memory devices 510A-510E may be an implementation of the memory device 202 (see FIG. 2), the memory device 204 (see FIG. 2), the memory device 206 (see FIG. 2), the hardware 306 (see FIG. 3), and/or the memory device(s) 406 (see FIG. 4).

Figure 34:
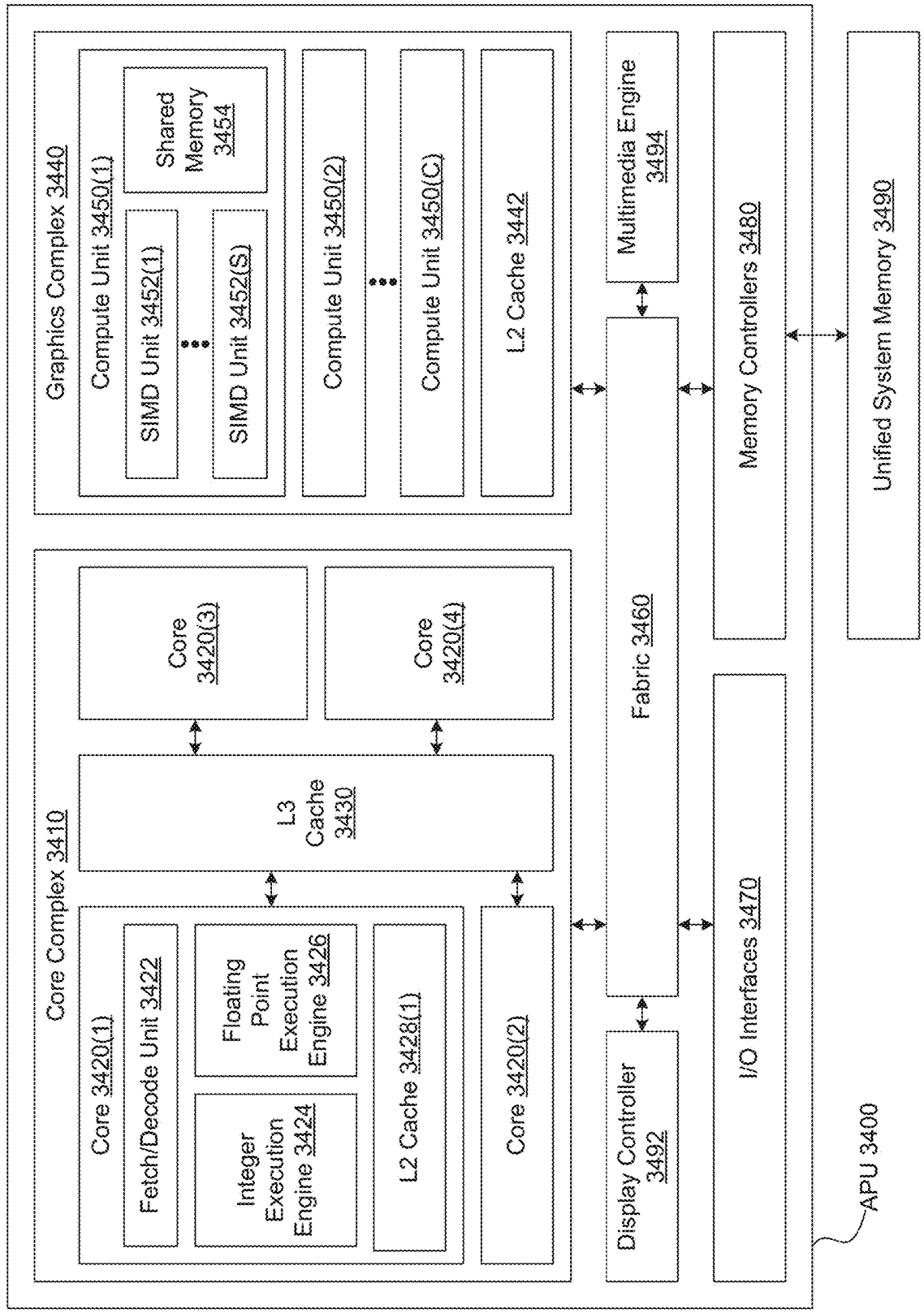
FIG. 34 illustrates an APU, in accordance with at least one embodiment.
Figure 35:
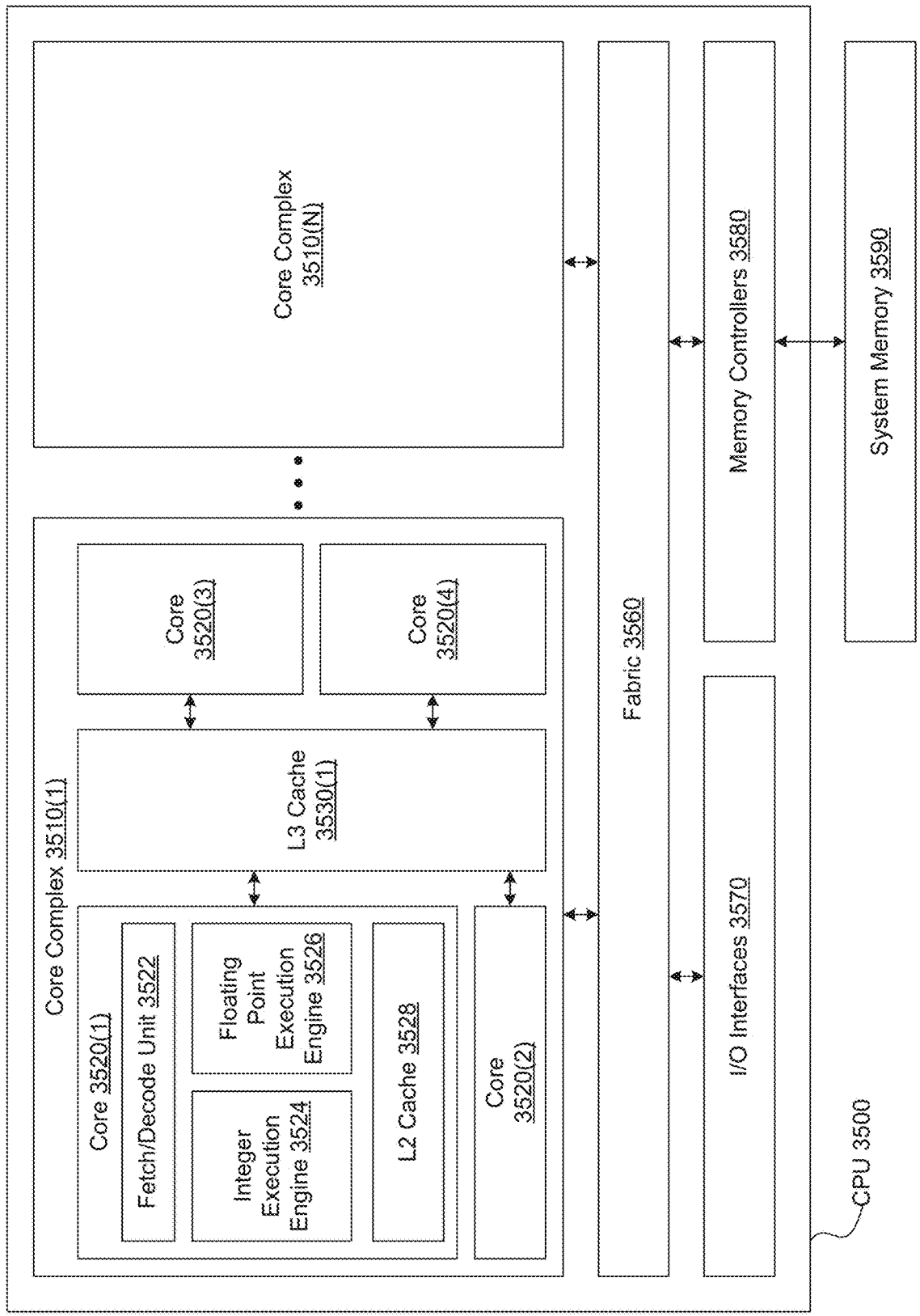
FIG. 35 illustrates a CPU, in accordance with at least one embodiment.
Figure 37A:
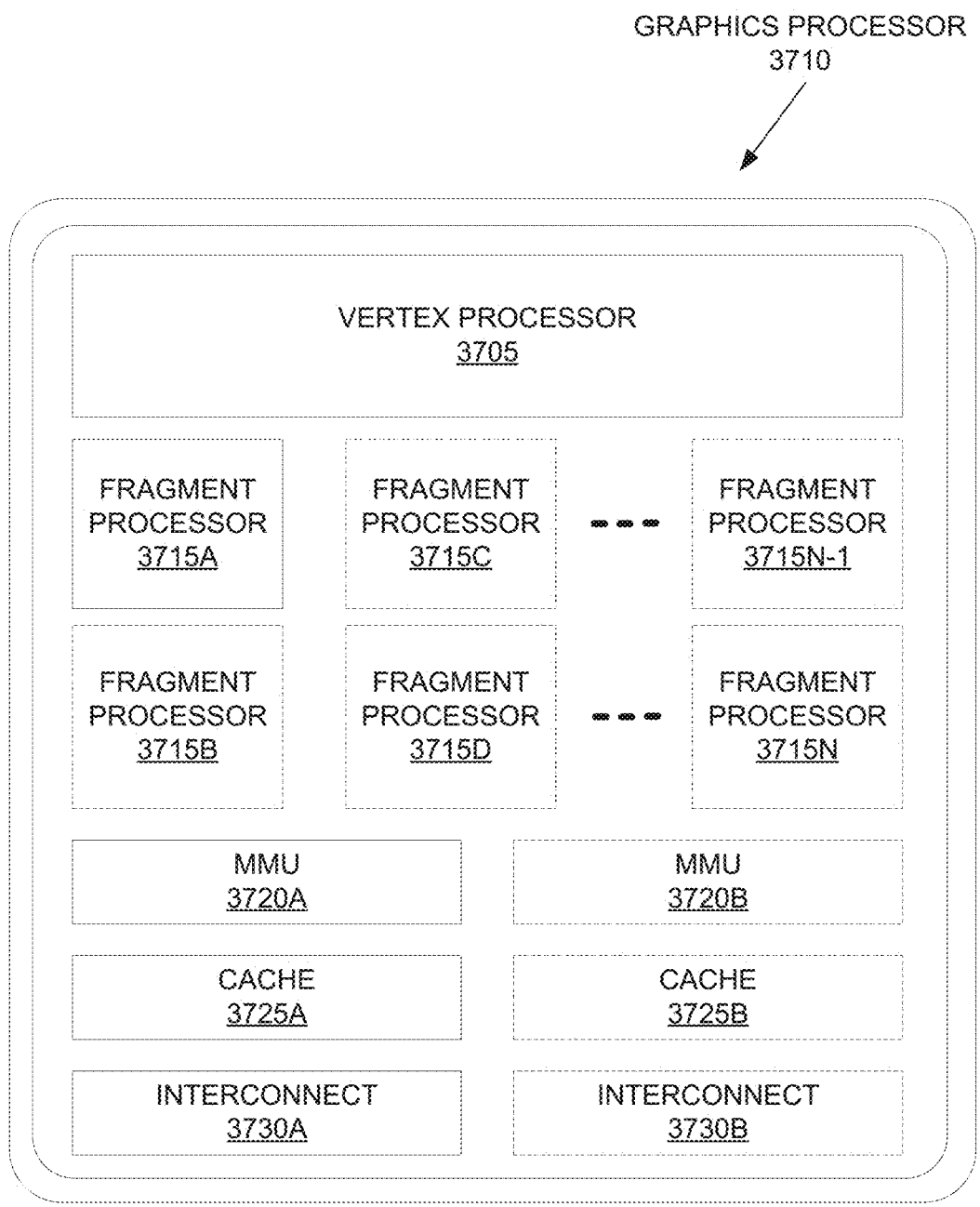
FIGS. 37A-37B illustrate exemplary graphics processors, in accordance with at least one embodiment.
Figure 37B:
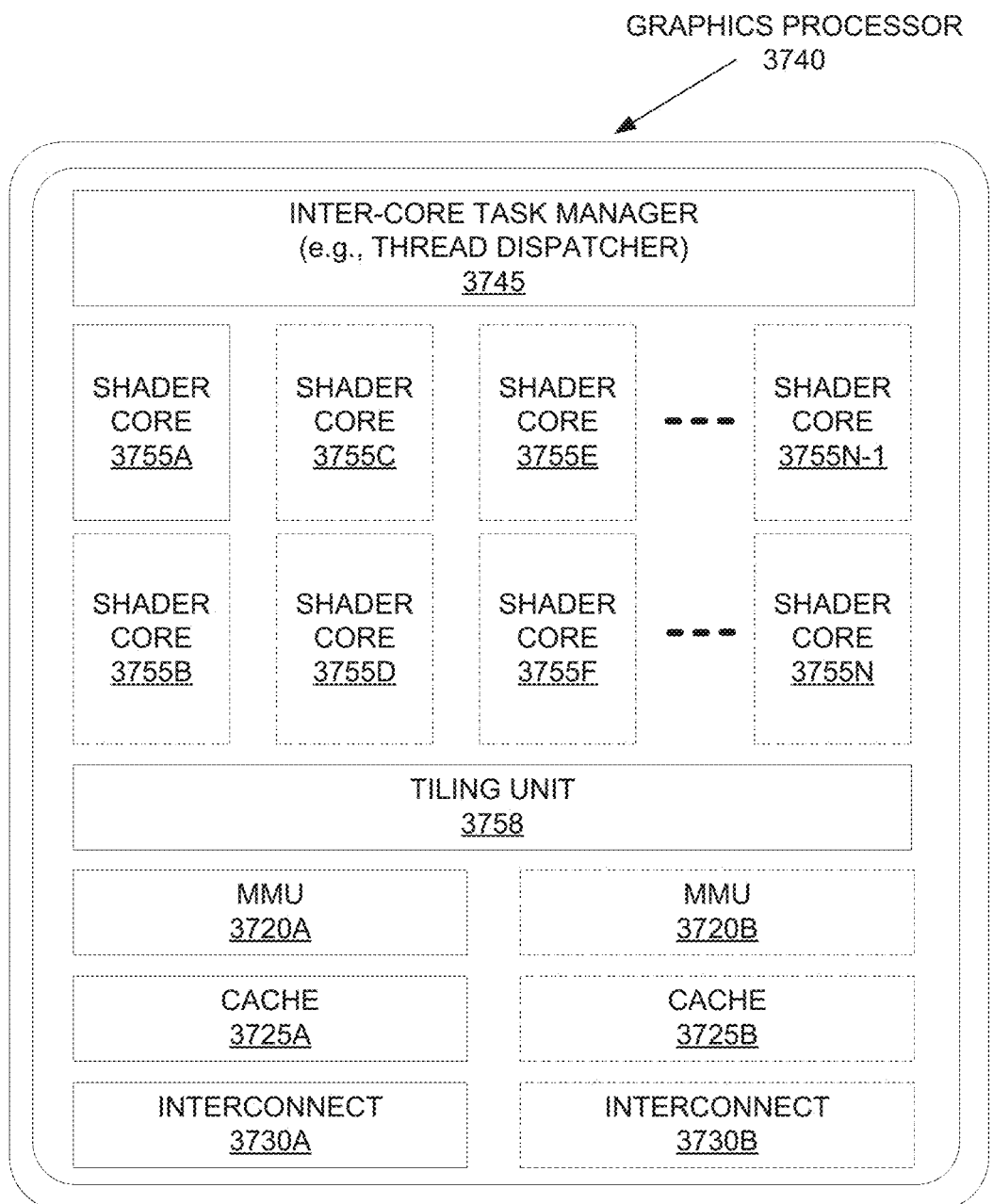
Figure 38A:
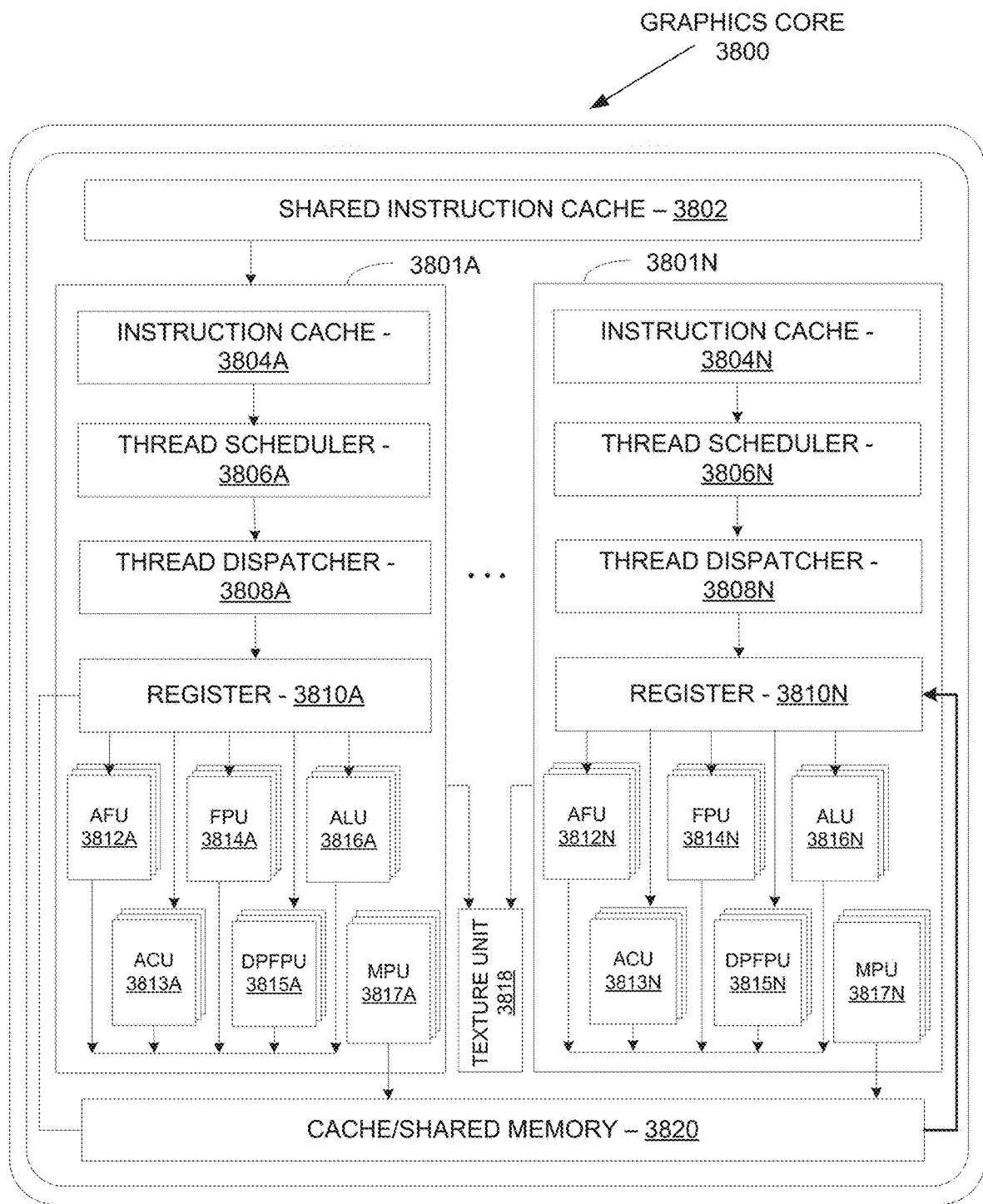
FIG. 38A illustrates a graphics core, in accordance with at least one embodiment.
Figure 38B:
FIG. 38B illustrates a GPGPU, in accordance with at least one embodiment.
Figure 39A:
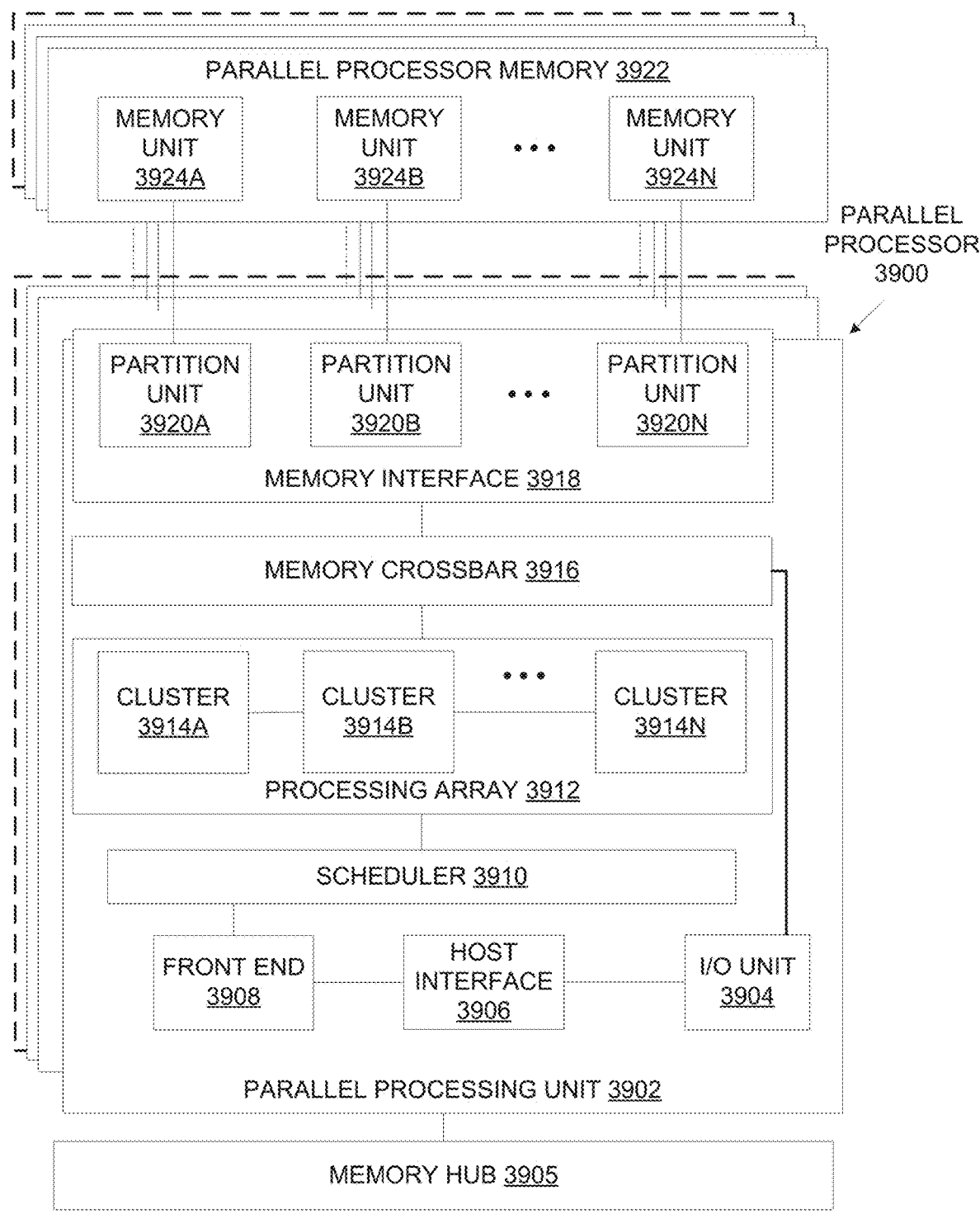
FIG. 39A illustrates a parallel processor, in accordance with at least one embodiment.
Figure 39B:
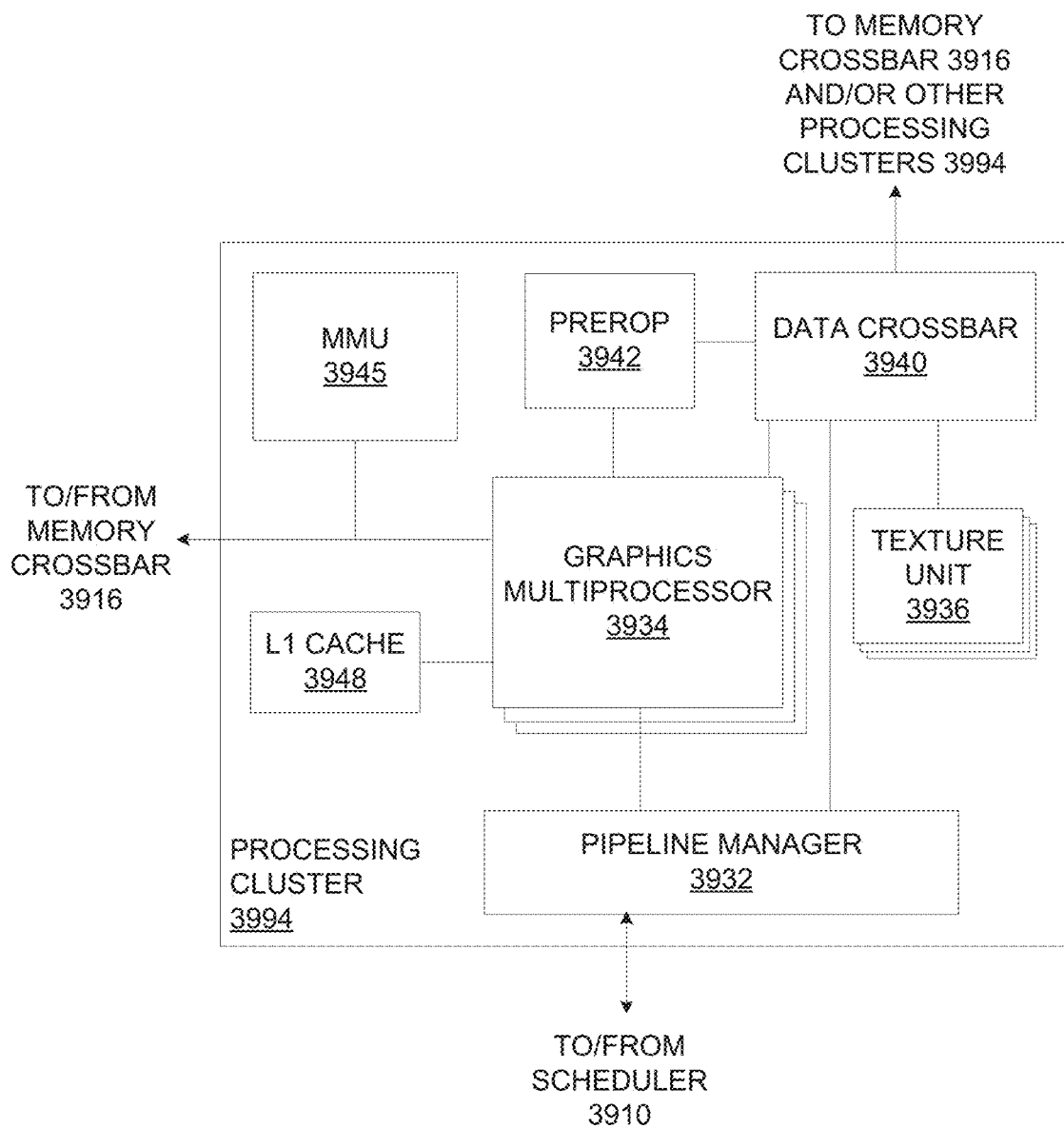
FIG. 39B illustrates a processing cluster, in accordance with at least one embodiment.
Figure 39C:
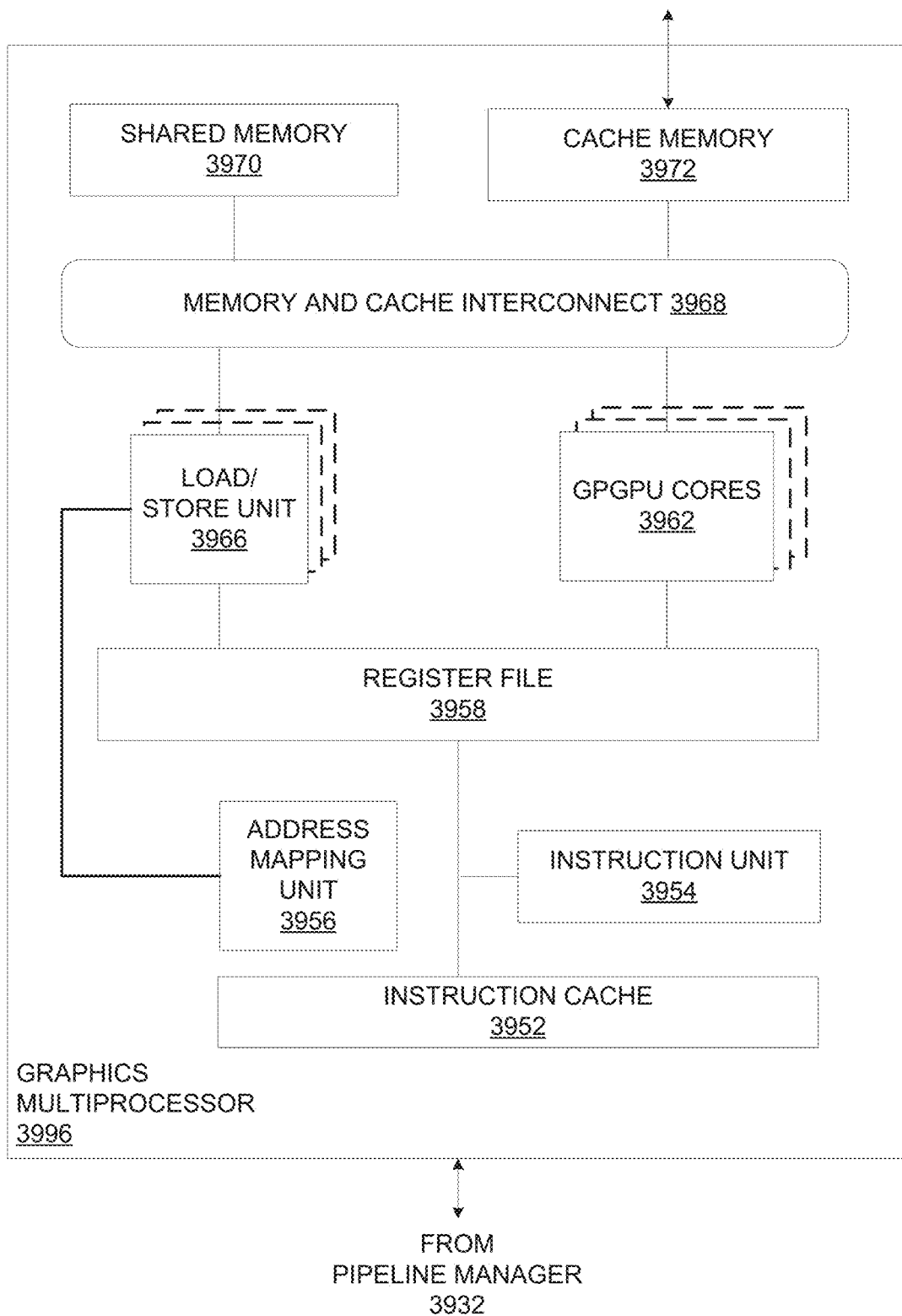
FIG. 39C illustrates a graphics multiprocessor, in accordance with at least one embodiment.

As non-limiting examples, the host CPU 502 and/or the DPU 504 may be an accelerated processing unit 3400 as illustrated in FIG. 34, a CPU 3500 as illustrated in FIG. 35, graphics processors 3710 and/or 3740 as illustrated in @FIG. 37A and FIG. 37B, a general-purpose graphics processing unit 3830 as illustrated in FIG. 38B, a parallel processor 3900 as illustrated in FIG. 39A, and/or a graphics multiprocessor 3996 as illustrated in FIG. 39C.

In at least one embodiment, the NVMe driver 506 acts as an interface between the application stack 503 executing on the host CPU 502 and one or more of the memory devices 510A-510E. The lite FTL 508 may convert NVMe commands generated by the NVMe driver 506 to calls to one or more of the flash APIs 512A-512E executing on one or more of the memory devices 510A-510E (e.g., SSD(s)). In at least one embodiment, the lite FTL 508 may implement a particular logical to physical mapping table. The logical to physical mapping table may implement a particular defragmentation policy, assign a particular NAND type, span multiple physical devices, and/or implement multiple FTLs for a single device. In at least one embodiment, the lite FTL 508 may be implemented as multiple components. For example, the lite FTL 508 may include a separate component implementing an NVMe-to-flash API convertor for each personality type (such as KV, OCP, ZNS, and/or the like) of the memory devices 510A-510E. In other examples, the NVMe-to-flash API converter may be implemented using at least one component that interfaces with multiple personality types of the memory devices 510A-510E (e.g., SSD). In at least one embodiment, components of the lite FTL 508 may be dynamically swapped or replaced with new components that support updated or different memory architectures.

The flash APIs 512A-512E may each implement standard memory (e.g., flash) functionality, such as read, write, and erase. In general, the flash APIs 512A-512E may provide the same or similar functionality with respect to all of the memory devices 510A-510E (e.g., including different types of memory devices, such as NAND memory and SSD types).

The flash management APIs 514A-514E may manage the memory cells (e.g., NAND cells) of the memory devices 510A-510E, respectively, and may be adapted to the specific characteristics of the cell design. For example, a PLC cell design has higher write multiplication than an SLC cell design, and writes may be cached by the corresponding flash management API differently as a result. In at least one embodiment, the memory devices 510A-510E may include multiple SSD devices having one or more SSD personality types. For example, the first memory device 510A may be implemented as a KV device, the second memory device 510B may be implemented as an OCP device, and the third memory device 510C may be implemented as a ZNS device. In addition, two or more of the memory devices 510A-510E may have different NAND cell types. For example, the third memory device 510C may have an MLC cell design, and the fourth memory device 510D may have a PLC cell design. By way of another non-limiting example, at least one of the memory devices 510A-510E may include two or more personality types.

Optionally, the system 500 may include a tracking database 520. When the DPU 504 assigns a personality type to one or more of the memory devices 510A-510E to be used by the application stack 503, the DPU 504 may assign one or more tracking parameters to the personality and may store that assignment in the tracking database 520. The DPU 504 may also associate the application stack 503 with the personality in the tracking database 520. Thus, when the DPU 504 receives a storage access request (e.g., including an identifier of the application stack 503) from the application stack 503 (e.g., workload), the DPU 504 may look up the application stack 503 (e.g., using the identifier) in the tracking database 520 and identify the personality associated with the application stack 503. Then, the DPU 504 may translate the storage access request for use with the personality type of the identified personality if the identified personality differs from the personality for which the storage access request was configured. For example, if the application stack 503 is configured to communicate with a first personality type and the identified personality has a different second personality type, the DPU 504 may translate the storage access request for use by the second personality type. The DPU 504 may map the storage access request to a physical memory location using the tracking database 520. Whenever the application stack 503 accesses the personality, the DPU 504 may store information about that access in the tracking database 520. By way of non-limiting examples, the tracking parameters may include a memory device identifier, a memory device type identifier, a personality type identifier, one or more command queue identifiers (e.g., one or more NVMe queue identifiers), and/or telemetry tracking information. The telemetry tracking information may be used by the DPU 504 to track and log information about deployed personalities in the tracking database 520. Thus, the DPU 504 may provide configuration management and deployment tracking mechanisms.

The lite FTL 508 may generate information (e.g., metadata) as the lite FTL 508 translates instructions from the NVMe driver 506 to one or more of the flash APIs 512A-512E. The DPU 504 may keep track of and manage this information, which the lite FTL 508 may store, for example, on the memory devices 510A-510E. The DPU 504 may be aware of on which of the memory devices 510A-510E the information is stored. Optionally, the DPU 504 may store at least a portion of this information in the tracking database 520.

The DPU 504 may manage newly created and/or or previously deployed personalities. For example, the DPU 504 may manage policies related to each personality, such as defragmentation policy, erasure coding policy, reliability scan policy, and/or the like.

Figure 6:
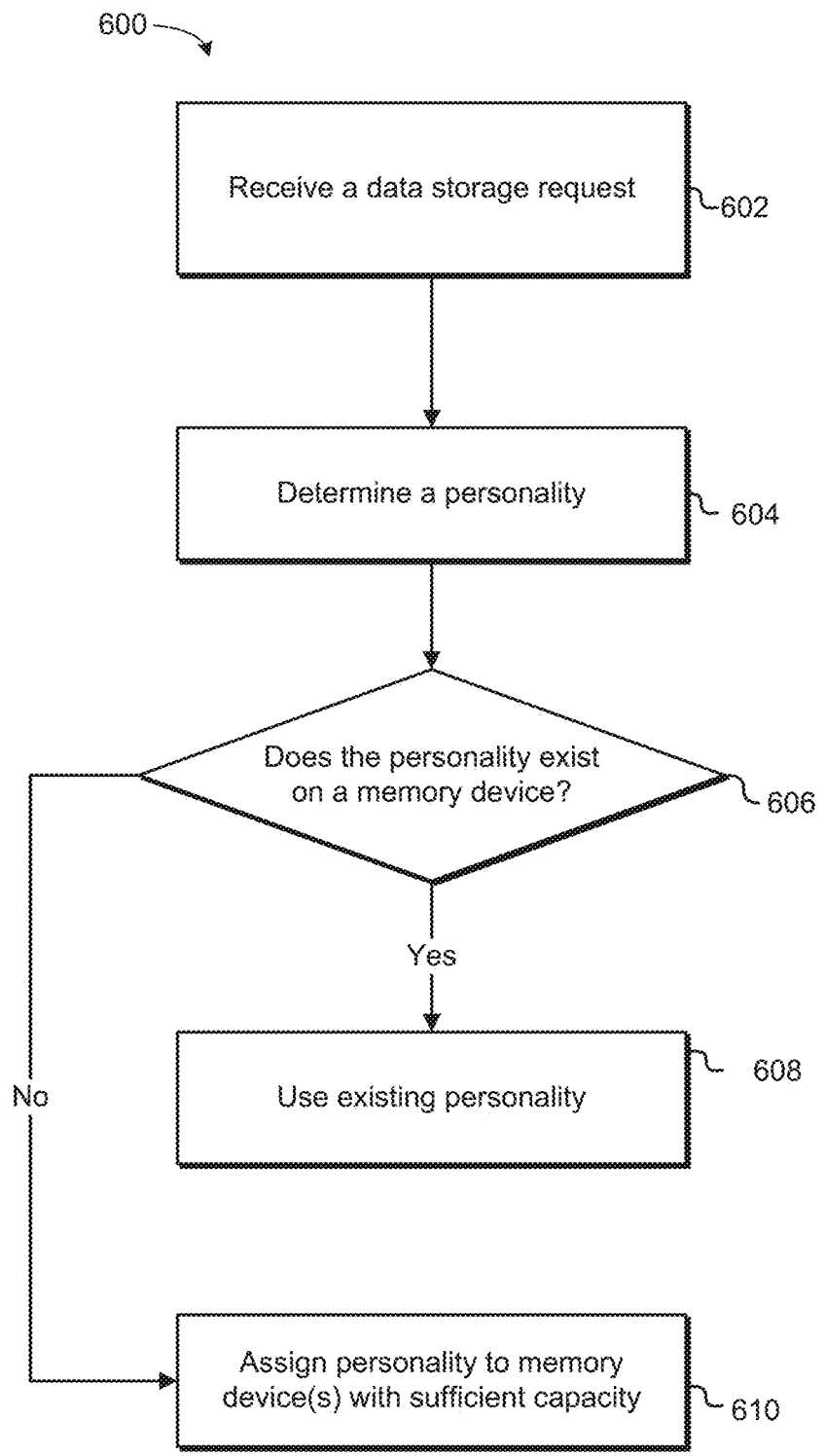
FIG. 6 illustrates a process that, as a result of being performed by a processor of a computer system, causes the computer system to assign a personality to a memory device, in accordance with at least one embodiment.

FIG. 6 illustrates a process 600 that, as a result of being performed by a processor of a computer system, causes the computer system to assign a personality to a memory device, in accordance with at least one embodiment. In at least one example, the processor (e.g., a DPU) hosts an interface abstraction layer that performs the process 600. The interface abstraction layer may be identical or similar to the software interface layer 216 illustrated in FIG. 2, the flash API layer 226 illustrated in FIG. 2, the sub-SW stacks 200-3A illustrated in FIG. 2, the flash abstraction layer 300 illustrated in FIG. 3, the abstraction layer 316 illustrated in FIG. 3, a software stack including the common storage API 409 and the software-defined flash API 412, and/or a software stack including the NVMe driver 506 and the lite FTL 508 illustrated in FIG. 5. The interface abstraction layer is a software component that provides an interface that mimics one or more SSD personality types. At block 602, the interface abstraction layer (implemented by the processor) receives a data storage request. In at least one embodiment, the data storage request is received from a workload or an application. At block 604, the interface abstraction layer determines a personality type corresponding to the workload or application.

In at least one embodiment, the interface abstraction layer may perform workload analysis to match the workload or application to a corresponding personality. In at least one embodiment, workload analysis may include matching characteristics of the workload or application with a personality. For example, the interface abstraction layer may select a KV personality having the KV personality type if the application or workload is associated with a database, a zone namespace if the application or workload is likely to have a high ratio of read applications to write applications, or a computational namespace if the application or workload is associated with computational storage. In at least one embodiment, the interface abstraction layer may perform workload analysis to match the workload or application to more than one personality. For example, the workload or application may have some storage requests associated with long-term static storage, which the interface abstraction layer may match with a first personality, and other storage requests associated with transient data expected to be frequently updated, which the interface abstraction layer may match with a second personality. In at least one embodiment, the workload analysis may include predictions based on storage requests made by the workload or application. For example, short writes may be assumed to be more likely to be updated than long writes, and text data may be assumed to be more likely to be updated than binary data. In at least one embodiment, the interface abstraction layer may use machine learning to perform the workload analysis. For example, the interface abstraction layer may use a neural network, such as the neural network illustrated in FIG. 22, trained to predict the future behavior of data (e.g., frequency of updates) associated with a storage request made by the workload or application. By way of another non-limiting example, the workload or application may communicate the personality type to the interface abstraction layer, e.g., using metadata, the storage access request, and/or the like.

At decision block 606, the interface abstraction layer determines whether the determined personality type exists on a memory device having sufficient memory capacity. In other words, the interface abstraction layer determines whether any memory devices connected to the processor (e.g., DPU) executing the interface abstraction layer include memory having the determined personality type and sufficient memory capacity to satisfy the request received in block 602. If the personality type exists, the interface abstraction layer proceeds to block 608 and the existing personality is used. After block 608, the process 600 may terminate. If the personality type does not exist, the interface abstraction layer proceeds to block 610 and assigns the personality to a memory device having sufficient capacity for the workload or application. In at least one embodiment, the personality type may be assigned to multiple memory devices. In at least one embodiment, assignment of a personality type may include setting parameters such as a namespace identifier ("ID"), a device ID, a SQ/CQ ID, a locking range, a LBA range, a directive type, a command set type, performance characteristics, and/or endurance groups. These parameter values may be stored in the tracking database 520 (see FIG. 5) for future access by the processor. After block 610, the process 600 may terminate.

In at least one embodiment, a personality other than the personality determined in block 602 may be assigned even when the determined personality type exists. For example, such an assignment may occur, in the event of a memory device (e.g., SSD) failure, for dynamic performance improvement (e.g., load balancing), or for data recovery.

Figure 7:
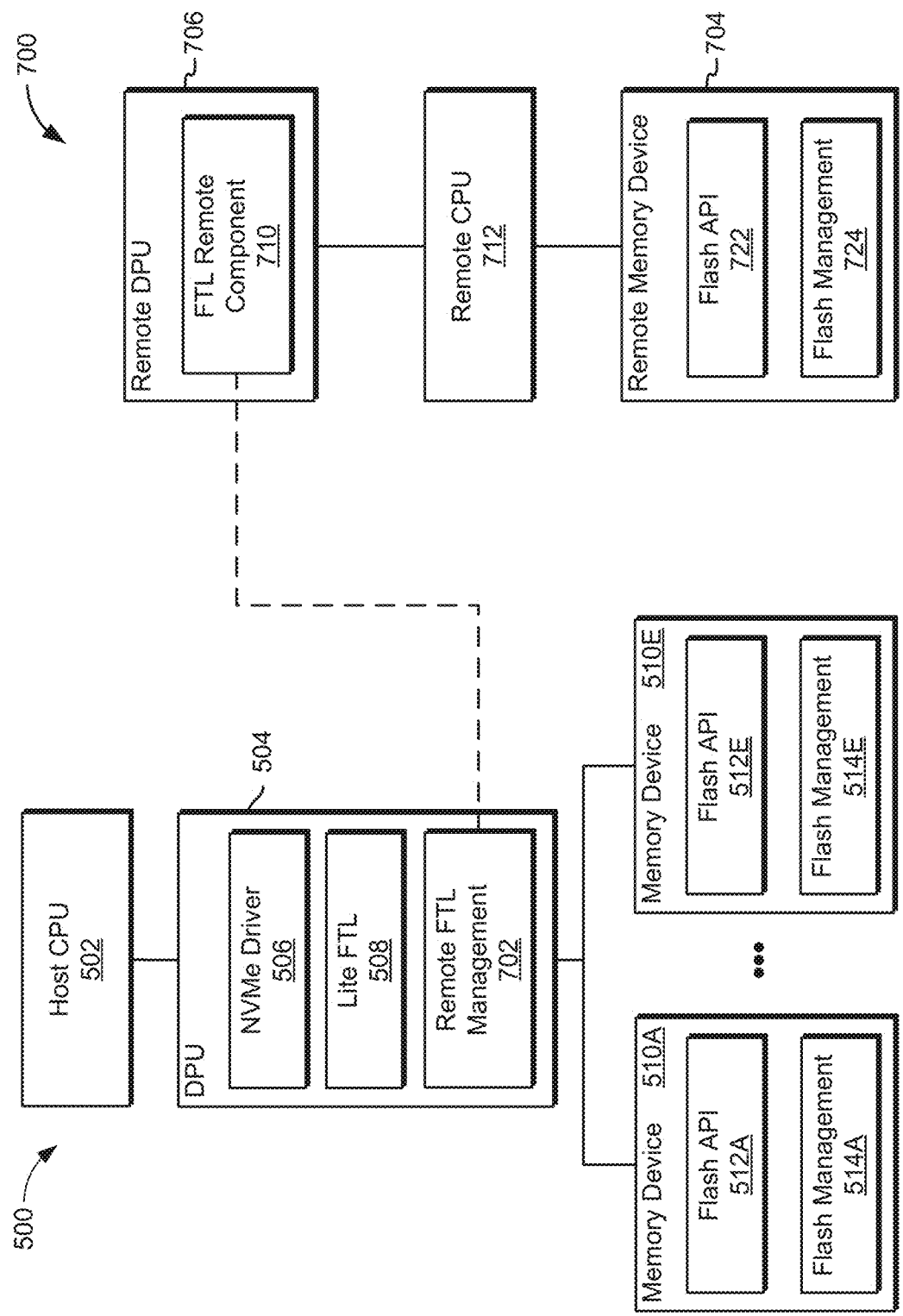
FIG. 7 illustrates a system that provides remote FTL management, in accordance with at least one embodiment.

FIG. 7 illustrates a system 700 that provides remote FTL management, in accordance with at least one embodiment. The system 700 may include any components of the system 500 illustrated in FIG. 5. In the embodiment illustrated, the system 700 includes the host CPU 502, the DPU 504, and one or more of the memory devices 510A-510E (e.g., SSDs). As illustrated in FIG. 7, the DPU 504 may include a remote FTL management component 702 for remote FTL management of a remote memory device 704 using a remote DPU 706. In the embodiment illustrated, the remote memory device 704 includes a flash API 722 and a flash management API 724, which may be substantially identical to the flash API 512A and the flash management API 514A, respectively. Using the remote FTL management component 702, the DPU 504 may communicate with an FTL remote component 710 implemented by the remote DPU 706, in order to manage the remote memory device 704 (e.g., SSD) connected to a remote CPU 712 and the remote DPU 706. For example, in at least one embodiment, the remote DPU 706 may receive a storage access request for data associated with a personality, from the local DPU 504. In response, the remote DPU 706 may associate the personality with the remote memory device 704, and provide a request to access the remote memory device 704 (e.g., to the remote CPU 712 and/or directly to the remote memory device 704).

By implementing the remote FTL management component 702 and the FTL remote component 710, the system 700 illustrated in FIG. 7 improves scalability. For example, in a system including many servers, it may not be desirable to implement the FTL on each device. Instead, the DPU 504 including the remote FTL management component 702 may be used to manage a number of remote SSDs (e.g., remote memory device 704) connected to remote DPUs, such as the remote DPU 706.

FIGS. 8A-8C illustrate example configurations of memory device personality assignments, according to at least one embodiment. FIG. 8A illustrates an example of a single device personality assigned to a single memory device 802 (e.g., SSD), in accordance with at least one embodiment. In the illustrated example, the memory device 802 is assigned a personality that implements a zone namespace 801.

FIG. 8B illustrates an example of multiple device personalities assigned to a single memory device 804 (e.g., SSD), in accordance with at least one embodiment. In the illustrated example, the memory device 804 is assigned personalities corresponding to both a zone namespace 803 and Lite NVMe namespace 805. In at least one embodiment, the memory device 804 may be assigned three or more personalities.

FIG. 8C illustrates an example of multiple device personalities assigned to multiple memory devices (e.g., SSDs), in accordance with at least one embodiment. In the illustrated example, personalities are assigned to memory devices 806, 808, and 810 such that a zone namespace 812, a Lite NVMe namespace 814, and/or a block device namespace 816 span the memory devices 806, 808, and/or 810. In at least one embodiment, personalities may be assigned such that at least one namespace (e.g., one, two, or four or more namespaces) spans multiple memory devices. In at least one embodiment, personalities may be assigned such that a namespace(s) spans two, or four or more, memory devices.

Servers and Data Centers

The following figures set forth, without limitation, exemplary network server and data center based systems that can be used to implement at least one embodiment.

FIG. 9 illustrates a distributed system 900, in accordance with at least one embodiment. In at least one embodiment, distributed system 900 includes one or more client computing devices 902, 904, 906, and 908, which are configured to execute and operate a client application such as a web browser, proprietary client, and/or variations thereof over one or more network(s) 910. In at least one embodiment, server 912 may be communicatively coupled with remote client computing devices 902, 904, 906, and 908 via network 910.

In at least one embodiment, server 912 may be adapted to run one or more services or software applications such as services and applications that may manage session activity of single sign-on (SSO) access across multiple data centers. In at least one embodiment, server 912 may also provide other services or software applications can include non-virtual and virtual environments. In at least one embodiment, these services may be offered as web-based or cloud services or under a Software as a Service (SaaS) model to users of client computing devices 902, 904, 906, and/or 908. In at least one embodiment, users operating client computing devices 902, 904, 906, and/or 908 may in turn utilize one or more client applications to interact with server 912 to utilize services provided by these components.

In at least one embodiment, software components 918, 920 and 922 of system 900 are implemented on server 912. In at least one embodiment, one or more components of system 900 and/or services provided by these components may also be implemented by one or more of client computing devices 902, 904, 906, and/or 908. In at least one embodiment, users operating client computing devices may then utilize one or more client applications to use services provided by these components. In at least one embodiment, these components may be implemented in hardware, firmware, software, or combinations thereof. It should be appreciated that various different system configurations are possible, which may be different from distributed system 900. The embodiment shown in FIG. 9 is thus one example of a distributed system for implementing an embodiment system and is not intended to be limiting.

In at least one embodiment, client computing devices 902, 904, 906, and/or 908 may include various types of computing systems. In at least one embodiment, a client computing device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and/or variations thereof. In at least one embodiment, devices may support various applications such as various Internet-related apps, e-mail, short message service (SMS) applications, and may use various other communication protocols. In at least one embodiment, client computing devices may also include general purpose personal computers including, by way of example, personal computers and/or laptop computers running various versions of Microsoft Windows®, Apple Macintosh®, and/or Linux operating systems. In at least one embodiment, client computing devices can be workstation computers running any of a variety of commercially-available UNIX® or UNIX-like operating systems, including without limitation a variety of GNU/Linux operating systems, such as Google Chrome OS. In at least one embodiment, client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 910. Although distributed system 900 in FIG. 9 is shown with four client computing devices, any number of client computing devices may be supported. Other devices, such as devices with sensors, etc., may interact with server 912.

In at least one embodiment, network(s) 910 in distributed system 900 may be any type of network that can support data communications using any of a variety of available protocols, including without limitation TCP/IP (transmission control protocol/Internet protocol), SNA (systems network architecture), IPX (Internet packet exchange), AppleTalk, and/or variations thereof. In at least one embodiment, network(s) 910 can be a local area network (LAN), networks based on Ethernet, Token-Ring, a wide-area network, Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

In at least one embodiment, server 912 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In at least one embodiment, server 912 can include one or more virtual machines running virtual operating systems, or other computing architectures involving virtualization. In at least one embodiment, one or more flexible pools of logical storage devices can be virtualized to maintain virtual storage devices for a server. In at least one embodiment, virtual networks can be controlled by server 912 using software defined networking. In at least one embodiment, server 912 may be adapted to run one or more services or software applications.

In at least one embodiment, server 912 may run any operating system, as well as any commercially available server operating system. In at least one embodiment, server 912 may also run any of a variety of additional server applications and/or mid-tier applications, including HTTP (hypertext transport protocol) servers, FTP (file transfer protocol) servers, CGI (common gateway interface) servers, JAVA® servers, database servers, and/or variations thereof. In at least one embodiment, exemplary database servers include without limitation those commercially available from Oracle, Microsoft, Sybase, IBM (International Business Machines), and/or variations thereof.

In at least one embodiment, server 912 may include one or more applications to analyze and consolidate data feeds and/or event updates received from users of client computing devices 902, 904, 906, and 908. In at least one embodiment, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and/or variations thereof. In at least one embodiment, server 912 may also include one or more applications to display data feeds and/or real-time events via one or more display devices of client computing devices 902, 904, 906, and 908.

In at least one embodiment, distributed system 900 may also include one or more databases 914 and 916. In at least one embodiment, databases may provide a mechanism for storing information such as user interactions information, usage patterns information, adaptation rules information, and other information. In at least one embodiment, databases 914 and 916 may reside in a variety of locations. In at least one embodiment, one or more of databases 914 and 916 may reside on a non-transitory storage medium local to (and/or resident in) server 912. In at least one embodiment, databases 914 and 916 may be remote from server 912 and in communication with server 912 via a network-based or dedicated connection. In at least one embodiment, databases 914 and 916 may reside in a storage-area network (SAN). In at least one embodiment, any necessary files for performing functions attributed to server 912 may be stored locally on server 912 and/or remotely, as appropriate. In at least one embodiment, databases 914 and 916 may include relational databases, such as databases that are adapted to store, update, and retrieve data in response to SQL-formatted commands.

FIG. 10 illustrates an exemplary data center 1000, in accordance with at least one embodiment. In at least one embodiment, data center 1000 includes, without limitation, a data center infrastructure layer 1010, a framework layer 1020, a software layer 1030 and an application layer 1040.

In at least one embodiment, as shown in FIG. 10, data center infrastructure layer 1010 may include a resource orchestrator 1012, grouped computing resources 1014, and node computing resources ("node C.R.s") 1016(1)-1016(N), where "N" represents any whole, positive integer. In at least one embodiment, node C.R.s 1016(1)-1016(N) may include, but are not limited to, any number of central processing units ("CPUs") or other processors (including accelerators, field programmable gate arrays ("FPGAs"), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 1016(1)-1016(N) may be a server having one or more of above-mentioned computing resources.

In at least one embodiment, grouped computing resources 1014 may include separate groupings of node C.R.s housed within one or more racks (not shown), or many racks housed in data centers at various geographical locations (also not shown). Separate groupings of node C.R.s within grouped computing resources 1014 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 1012 may configure or otherwise control one or more node C.R.s 1016(1)-1016(N) and/or grouped computing resources 1014. In at least one embodiment, resource orchestrator 1012 may include a software design infrastructure ("SDI") management entity for data center 1000. In at least one embodiment, resource orchestrator 1012 may include hardware, software or some combination thereof.

In at least one embodiment, as shown in FIG. 10, framework layer 1020 includes, without limitation, a job scheduler 1032, a configuration manager 1034, a resource manager 1036 and a distributed file system 1038. In at least one embodiment, framework layer 1020 may include a framework to support software 1052 of software layer 1030 and/or one or more application(s) 1042 of application layer 1040. In at least one embodiment, software 1052 or application(s) 1042 may respectively include web-based service software or applications, such as those provided by Amazon Web Services, Google Cloud and Microsoft Azure. In at least one embodiment, framework layer 1020 may be, but is not limited to, a type of free and open-source software web application framework such as Apache Spark™ (hereinafter "Spark") that may utilize distributed file system 1038 for large-scale data processing (e.g., "big data"). In at least one embodiment, job scheduler 1032 may include a Spark driver to facilitate scheduling of workloads supported by various layers of data center 1000. In at least one embodiment, configuration manager 1034 may be capable of configuring different layers such as software layer 1030 and framework layer 1020, including Spark and distributed file system 1038 for supporting large-scale data processing. In at least one embodiment, resource manager 1036 may be capable of managing clustered or grouped computing resources mapped to or allocated for support of distributed file system 1038 and job scheduler 1032. In at least one embodiment, clustered or grouped computing resources may include grouped computing resource 1014 at data center infrastructure layer 1010. In at least one embodiment, resource manager 1036 may coordinate with resource orchestrator 1012 to manage these mapped or allocated computing resources.

In at least one embodiment, software 1052 included in software layer 1030 may include software used by at least portions of node C.R.s 1016(1)-1016(N), grouped computing resources 1014, and/or distributed file system 1038 of framework layer 1020. One or more types of software may include, but are not limited to, Internet web page search software, e-mail virus scan software, database software, and streaming video content software.

In at least one embodiment, application(s) 1042 included in application layer 1040 may include one or more types of applications used by at least portions of node C.R.s 1016(1)-1016(N), grouped computing resources 1014, and/or distributed file system 1038 of framework layer 1020. In at least one or more types of applications may include, without limitation, CUDA applications, 5G network applications, artificial intelligence application, data center applications, and/or variations thereof.

In at least one embodiment, any of configuration manager 1034, resource manager 1036, and resource orchestrator 1012 may implement any number and type of self-modifying actions based on any amount and type of data acquired in any technically feasible fashion. In at least one embodiment, self-modifying actions may relieve a data center operator of data center 1000 from making possibly bad configuration decisions and possibly avoiding underutilized and/or poor performing portions of a data center.

FIG. 11 illustrates a client-server network 1104 formed by a plurality of network server computers 1102 which are interlinked, in accordance with at least one embodiment. In at least one embodiment, in a system 1100, each network server computer 1102 stores data accessible to other network server computers 1102 and to client computers 1106 and networks 1108 which link into a wide area network 1104. In at least one embodiment, configuration of a client-server network 1104 may change over time as client computers 1106 and one or more networks 1108 connect and disconnect from a network 1104, and as one or more trunk line server computers 1102 are added or removed from a network 1104. In at least one embodiment, when a client computer 1106 and a network 1108 are connected with network server computers 1102, client-server network includes such client computer 1106 and network 1108. In at least one embodiment, the term computer includes any device or machine capable of accepting data, applying prescribed processes to data, and supplying results of processes.

In at least one embodiment, client-server network 1104 stores information which is accessible to network server computers 1102, remote networks 1108 and client computers 1106. In at least one embodiment, network server computers 1102 are formed by main frame computers minicomputers, and/or microcomputers having one or more processors each. In at least one embodiment, server computers 1102 are linked together by wired and/or wireless transfer media, such as conductive wire, fiber optic cable, and/or microwave transmission media, satellite transmission media or other conductive, optic or electromagnetic wave transmission media. In at least one embodiment, client computers 1106 access a network server computer 1102 by a similar wired or a wireless transfer medium. In at least one embodiment, a client computer 1106 may link into a client-server network 1104 using a modem and a standard telephone communication network. In at least one embodiment, alternative carrier systems such as cable and satellite communication systems also may be used to link into client-server network 1104. In at least one embodiment, other private or time-shared carrier systems may be used. In at least one embodiment, network 1104 is a global information network, such as the Internet. In at least one embodiment, network is a private intranet using similar protocols as the Internet, but with added security measures and restricted access controls. In at least one embodiment, network 1104 is a private, or semi-private network using proprietary communication protocols.

In at least one embodiment, client computer 1106 is any end user computer, and may also be a mainframe computer, mini-computer or microcomputer having one or more microprocessors. In at least one embodiment, server computer 1102 may at times function as a client computer accessing another server computer 1102. In at least one embodiment, remote network 1108 may be a local area network, a network added into a wide area network through an independent service provider (ISP) for the Internet, or another group of computers interconnected by wired or wireless transfer media having a configuration which is either fixed or changing over time. In at least one embodiment, client computers 1106 may link into and access a network 1104 independently or through a remote network 1108.

FIG. 12 illustrates an example 1200 of a computer network 1208 connecting one or more computing machines, in accordance with at least one embodiment. In at least one embodiment, network 1208 may be any type of electronically connected group of computers including, for instance, the following networks: Internet, Intranet, Local Area Networks (LAN), Wide Area Networks (WAN) or an interconnected combination of these network types. In at least one embodiment, connectivity within a network 1208 may be a remote modem, Ethernet (IEEE 802.3), Token Ring (IEEE 802.5), Fiber Distributed Datalink Interface (FDDI), Asynchronous Transfer Mode (ATM), or any other communication protocol. In at least one embodiment, computing devices linked to a network may be desktop, server, portable, handheld, set-top box, personal digital assistant (PDA), a terminal, or any other desired type or configuration. In at least one embodiment, depending on their functionality, network connected devices may vary widely in processing power, internal memory, and other performance aspects. In at least one embodiment, communications within a network and to or from computing devices connected to a network may be either wired or wireless. In at least one embodiment, network 1208 may include, at least in part, the world-wide public Internet which generally connects a plurality of users in accordance with a client-server model in accordance with a transmission control protocol/internet protocol (TCP/IP) specification. In at least one embodiment, client-server network is a dominant model for communicating between two computers. In at least one embodiment, a client computer ("client") issues one or more commands to a server computer ("server"). In at least one embodiment, server fulfills client commands by accessing available network resources and returning information to a client pursuant to client commands. In at least one embodiment, client computer systems and network resources resident on network servers are assigned a network address for identification during communications between elements of a network. In at least one embodiment, communications from other network connected systems to servers will include a network address of a relevant server/network resource as part of communication so that an appropriate destination of a data/request is identified as a recipient. In at least one embodiment, when a network 1208 includes the global Internet, a network address is an IP address in a TCP/IP format which may, at least in part, route data to an e-mail account, a web site, or other Internet tool resident on a server. In at least one embodiment, information and services which are resident on network servers may be available to a web browser of a client computer through a domain name (e.g., www.site-.com) which maps to an IP address of a network server.

In at least one embodiment, a plurality of clients 1202, 1204, and 1206 are connected to a network 1208 via respective communication links. In at least one embodiment, each of these clients may access a network 1208 via any desired form of communication, such as via a dial-up modem connection, cable link, a digital subscriber line (DSL), wireless or satellite link, or any other form of communication. In at least one embodiment, each client may communicate using any machine that is compatible with a network 1208, such as a personal computer (PC), work station, dedicated terminal, personal data assistant (PDA), or other similar equipment. In at least one embodiment, clients 1202, 1204, and 1206 may or may not be located in a same geographical area.

In at least one embodiment, a plurality of servers 1210, 1212, and 1214 are connected to a network 1208 to serve clients that are in communication with a network 1208. In at least one embodiment, each server is typically a powerful computer or device that manages network resources and responds to client commands. In at least one embodiment, servers include computer readable data storage media such as hard disk drives and RAM memory that store program instructions and data. In at least one embodiment, servers 1210, 1212, 1214 run application programs that respond to client commands. In at least one embodiment, server 1210 may run a web server application for responding to client requests for HTML, pages and may also run a mail server application for receiving and routing electronic mail. In at least one embodiment, other application programs, such as an FTP server or a media server for streaming audio/video data to clients may also be running on a server 1210. In at least one embodiment, different servers may be dedicated to performing different tasks. In at least one embodiment, server 1210 may be a dedicated web server that manages resources relating to web sites for various users, whereas a server 1212 may be dedicated to provide electronic mail (email) management. In at least one embodiment, other servers may be dedicated for media (audio, video, etc.), file transfer protocol (FTP), or a combination of any two or more services that are typically available or provided over a network. In at least one embodiment, each server may be in a location that is the same as or different from that of other servers. In at least one embodiment, there may be multiple servers that perform mirrored tasks for users, thereby relieving congestion or minimizing traffic directed to and from a single server. In at least one embodiment, servers 1210, 1212, 1214 are under control of a web hosting provider in a business of maintaining and delivering third party content over a network 1208.

In at least one embodiment, web hosting providers deliver services to two different types of clients. In at least one embodiment, one type, which may be referred to as a browser, requests content from servers 1210, 1212, 1214 such as web pages, email messages, video clips, etc. In at least one embodiment, a second type, which may be referred to as a user, hires a web hosting provider to maintain a network resource such as a web site, and to make it available to browsers. In at least one embodiment, users contract with a web hosting provider to make memory space, processor capacity, and communication bandwidth available for their desired network resource in accordance with an amount of server resources a user desires to utilize.

In at least one embodiment, in order for a web hosting provider to provide services for both of these clients, application programs which manage a network resources hosted by servers must be properly configured. In at least one embodiment, program configuration process involves defining a set of parameters which control, at least in part, an application program's response to browser requests and which also define, at least in part, a server resources available to a particular user.

In one embodiment, an intranet server 1216 is in communication with a network 1208 via a communication link. In at least one embodiment, intranet server 1216 is in communication with a server manager 1218. In at least one embodiment, server manager 1218 includes a database of an application program configuration parameters which are being utilized in servers 1210, 1212, 1214. In at least one embodiment, users modify a database 1220 via an intranet 1216, and a server manager 1218 interacts with servers 1210, 1212, 1214 to modify application program parameters so that they match a content of a database. In at least one embodiment, a user logs onto an intranet server 1216 by connecting to an intranet 1216 via computer 1202 and entering authentication information, such as a username and password.

In at least one embodiment, when a user wishes to sign up for new service or modify an existing service, an intranet server 1216 authenticates a user and provides a user with an interactive screen display/control panel that allows a user to access configuration parameters for a particular application program. In at least one embodiment, a user is presented with a number of modifiable text boxes that describe aspects of a configuration of a user's web site or other network resource. In at least one embodiment, if a user desires to increase memory space reserved on a server for its web site, a user is provided with a field in which a user specifies a desired memory space. In at least one embodiment, in response to receiving this information, an intranet server 1216 updates a database 1220. In at least one embodiment, server manager 1218 forwards this information to an appropriate server, and a new parameter is used during application program operation. In at least one embodiment, an intranet server 1216 is configured to provide users with access to configuration parameters of hosted network resources (e.g., web pages, email, FTP sites, media sites, etc.), for which a user has contracted with a web hosting service provider.

FIG. 13A illustrates a networked computer system 1300A, in accordance with at least one embodiment. In at least one embodiment, networked computer system 1300A includes a plurality of nodes or personal computers ("PCs") 1302, 1318, 1320. In at least one embodiment, personal computer or node 1302 includes a processor 1314, memory 1316, video camera 1304, microphone 1306, mouse 1308, speakers 1310, and monitor 1312. In at least one embodiment, PCs 1302, 1318, 1320 may each run one or more desktop servers of an internal network within a given company, for instance, or may be servers of a general network not limited to a specific environment. In at least one embodiment, there is one server per PC node of a network, so that each PC node of a network represents a particular network server, having a particular network URL address. In at least one embodiment, each server defaults to a default web page for that server's user, which may itself contain embedded URLs pointing to further subpages of that user on that server, or to other servers or pages on other servers on a network.

In at least one embodiment, nodes 1302, 1318, 1320 and other nodes of a network are interconnected via medium 1322. In at least one embodiment, medium 1322 may be, a communication channel such as an Integrated Services Digital Network ("ISDN"). In at least one embodiment, various nodes of a networked computer system may be connected through a variety of communication media, including local area networks ("LANs"), plain-old telephone lines ("POTS"), sometimes referred to as public switched telephone networks ("PSTN"), and/or variations thereof. In at least one embodiment, various nodes of a network may also constitute computer system users inter-connected via a network such as the Internet. In at least one embodiment, each server on a network (running from a particular node of a network at a given instance) has a unique address or identification within a network, which may be specifiable in terms of an URL.

In at least one embodiment, a plurality of multi-point conferencing units ("MCUs") may thus be utilized to transmit data to and from various nodes or "endpoints" of a conferencing system. In at least one embodiment, nodes and/or MCUs may be interconnected via an ISDN link or through a local area network ("LAN"), in addition to various other communications media such as nodes connected through the Internet. In at least one embodiment, nodes of a conferencing system may, in general, be connected directly to a communications medium such as a LAN or through an MCU, and that a conferencing system may include other nodes or elements such as routers, servers, and/or variations thereof.

In at least one embodiment, processor 1314 is a general-purpose programmable processor. In at least one embodiment, processors of nodes of networked computer system 1300A may also be special-purpose video processors. In at least one embodiment, various peripherals and components of a node such as those of node 1302 may vary from those of other nodes. In at least one embodiment, node 1318 and node 1320 may be configured identically to or differently than node 1302. In at least one embodiment, a node may be implemented on any suitable computer system in addition to PC systems.

FIG. 13B illustrates a networked computer system 1300B, in accordance with at least one embodiment. In at least one embodiment, system 1300B illustrates a network such as LAN 1324, which may be used to interconnect a variety of nodes that may communicate with each other. In at least one embodiment, attached to LAN 1324 are a plurality of nodes such as PC nodes 1326, 1328, 1330. In at least one embodiment, a node may also be connected to the LAN via a network server or other means. In at least one embodiment, system 1300B includes other types of nodes or elements, for example including routers, servers, and nodes.

FIG. 13C illustrates a networked computer system 1300C, in accordance with at least one embodiment. In at least one embodiment, system 1300C illustrates a WWW system having communications across a backbone communications network such as Internet 1332, which may be used to interconnect a variety of nodes of a network. In at least one embodiment, WWW is a set of protocols operating on top of the Internet, and allows a graphical interface system to operate thereon for accessing information through the Internet. In at least one embodiment, attached to Internet 1332 in WWW are a plurality of nodes such as PCs 1340, 1342, 1344. In at least one embodiment, a node is interfaced to other nodes of WWW through a WWW HTTP server such as servers 1334, 1336. In at least one embodiment, PC 1344 may be a PC forming a node of network 1332 and itself running its server 1336, although PC 1344 and server 1336 are illustrated separately in FIG. 13C for illustrative purposes.

In at least one embodiment, WWW is a distributed type of application, characterized by WWW HTTP, WWW's protocol, which runs on top of the Internet's transmission control protocol/Internet protocol ("TCP/IP"). In at least one embodiment, WWW may thus be characterized by a set of protocols (i.e., HTTP) running on the Internet as its "backbone."

In at least one embodiment, a web browser is an application running on a node of a network that, in WWW-compatible type network systems, allows users of a particular server or node to view such information and thus allows a user to search graphical and text-based files that are linked together using hypertext links that are embedded in documents or files available from servers on a network that understand HTTP. In at least one embodiment, when a given web page of a first server associated with a first node is retrieved by a user using another server on a network such as the Internet, a document retrieved may have various hypertext links embedded therein and a local copy of a page is created local to a retrieving user. In at least one embodiment, when a user clicks on a hypertext link, locally-stored information related to a selected hypertext link is typically sufficient to allow a user's machine to open a connection across the Internet to a server indicated by a hypertext link.

In at least one embodiment, more than one user may be coupled to each HTTP server, for example through a LAN such as LAN 1338 as illustrated with respect to WWW HTTP server 1334. In at least one embodiment, system 1300C may also include other types of nodes or elements. In at least one embodiment, a WWW HTTP server is an application running on a machine, such as a PC. In at least one embodiment, each user may be considered to have a unique "server," as illustrated with respect to PC 1344. In at least one embodiment, a server may be considered to be a server such as WWW HTTP server 1334, which provides access to a network for a LAN or plurality of nodes or plurality of LANs. In at least one embodiment, there are a plurality of users, each having a desktop PC or node of a network, each desktop PC potentially establishing a server for a user thereof. In at least one embodiment, each server is associated with a particular network address or URL, which, when accessed, provides a default web page for that user. In at least one embodiment, a web page may contain further links (embedded URLs) pointing to further subpages of that user on that server, or to other servers on a network or to pages on other servers on a network.

Cloud Computing and Services

The following figures set forth, without limitation, exemplary cloud-based systems that can be used to implement at least one embodiment.

In at least one embodiment, cloud computing is a style of computing in which dynamically scalable and often virtualized resources are provided as a service over the Internet. In at least one embodiment, users need not have knowledge of, expertise in, or control over technology infrastructure, which can be referred to as "in the cloud," that supports them. In at least one embodiment, cloud computing incorporates infrastructure as a service, platform as a service, software as a service, and other variations that have a common theme of reliance on the Internet for satisfying computing needs of users. In at least one embodiment, a typical cloud deployment, such as in a private cloud (e.g., enterprise network), or a data center (DC) in a public cloud (e.g., Internet) can consist of thousands of servers (or alternatively, VMs), hundreds of Ethernet, Fiber Channel or Fiber Channel over Ethernet (FCoE) ports, switching and storage infrastructure, etc. In at least one embodiment, cloud can also consist of network services infrastructure like IPsec VPN hubs, firewalls, load balancers, wide area network (WAN) optimizers etc. In at least one embodiment, remote subscribers can access cloud applications and services securely by connecting via a VPN tunnel, such as an IPsec VPN tunnel.

In at least one embodiment, cloud computing is a model for enabling convenient, on-demand network access to a shared pool of configurable computing resources (e.g., networks, servers, storage, applications, and services) that can be rapidly provisioned and released with minimal management effort or service provider interaction.

In at least one embodiment, cloud computing is characterized by on-demand self-service, in which a consumer can unilaterally provision computing capabilities, such as server time and network storage, as needed automatically without requiring human inter-action with each service's provider. In at least one embodiment, cloud computing is characterized by broad network access, in which capabilities are available over a network and accessed through standard mechanisms that promote use by heterogeneous thin or thick client platforms (e.g., mobile phones, laptops, and PDAs). In at least one embodiment, cloud computing is characterized by resource pooling, in which a provider's computing resources are pooled to serve multiple consumers using a multi-tenant model, with different physical and virtual resources dynamically as-signed and reassigned according to consumer demand. In at least one embodiment, there is a sense of location independence in that a customer generally has no control or knowledge over an exact location of provided resources, but may be able to specify location at a higher level of abstraction (e.g., country, state, or datacenter). In at least one embodiment, examples of resources include storage, processing, memory, network bandwidth, and virtual machines. In at least one embodiment, cloud computing is characterized by rapid elasticity, in which capabilities can be rapidly and elastically provisioned, in some cases automatically, to quickly scale out and rapidly released to quickly scale in. In at least one embodiment, to a consumer, capabilities available for provisioning often appear to be unlimited and can be purchased in any quantity at any time. In at least one embodiment, cloud computing is characterized by measured service, in which cloud systems automatically control and optimize resource use by leveraging a metering capability at some level of abstraction appropriate to a type of service (e.g., storage, processing, bandwidth, and active user accounts). In at least one embodiment, resource usage can be monitored, controlled, and reported providing transparency for both a provider and consumer of a utilized service.

In at least one embodiment, cloud computing may be associated with various services. In at least one embodiment, cloud Software as a Service (SaaS) may refer to as service in which a capability provided to a consumer is to use a provider's applications running on a cloud infrastructure. In at least one embodiment, applications are accessible from various client devices through a thin client interface such as a web browser (e.g., web-based email). In at least one embodiment, consumer does not manage or control underlying cloud infrastructure including network, servers, operating systems, storage, or even individual application capabilities, with a possible exception of limited user-specific application configuration settings.

In at least one embodiment, cloud Platform as a Service (PaaS) may refer to a service in which a capability provided to a consumer is to deploy onto cloud infrastructure consumer-created or acquired applications created using programming languages and tools supported by a provider. In at least one embodiment, consumer does not manage or control underlying cloud infrastructure including networks, servers, operating systems, or storage, but has control over deployed applications and possibly application hosting environment configurations.

In at least one embodiment, cloud Infrastructure as a Service (IaaS) may refer to a service in which a capability provided to a consumer is to provision processing, storage, networks, and other fundamental computing resources where a consumer is able to deploy and run arbitrary software, which can include operating systems and applications. In at least one embodiment, consumer does not manage or control underlying cloud infrastructure, but has control over operating systems, storage, deployed applications, and possibly limited control of select networking components (e.g., host firewalls).

In at least one embodiment, cloud computing may be deployed in various ways. In at least one embodiment, a private cloud may refer to a cloud infrastructure that is operated solely for an organization. In at least one embodiment, a private cloud may be managed by an organization or a third party and may exist on-premises or off-premises. In at least one embodiment, a community cloud may refer to a cloud infrastructure that is shared by several organizations and supports a specific community that has shared concerns (e.g., mission, security requirements, policy, and compliance considerations). In at least one embodiment, a community cloud may be managed by organizations or a third party and may exist on-premises or off-premises. In at least one embodiment, a public cloud may refer to a cloud infrastructure that is made available to a general public or a large industry group and is owned by an organization providing cloud services. In at least one embodiment, a hybrid cloud may refer to a cloud infrastructure is a composition of two or more clouds (private, community, or public) that remain unique entities, but are bound together by standardized or proprietary technology that enables data and application portability (e.g., cloud bursting for load-balancing between clouds). In at least one embodiment, a cloud computing environment is service oriented with a focus on statelessness, low coupling, modularity, and semantic interoperability.

FIG. 14 illustrates one or more components of a system environment 1400 in which services may be offered as third party network services, in accordance with at least one embodiment. In at least one embodiment, a third party network may be referred to as a cloud, cloud network, cloud computing network, and/or variations thereof. In at least one embodiment, system environment 1400 includes one or more client computing devices 1404, 1406, and 1408 that may be used by users to interact with a third party network infrastructure system 1402 that provides third party network services, which may be referred to as cloud computing services. In at least one embodiment, third party network infrastructure system 1402 may include one or more computers and/or servers.

It should be appreciated that third party network infrastructure system 1402 depicted in FIG. 14 may have other components than those depicted. Further, FIG. 14 depicts an embodiment of a third party network infrastructure system. In at least one embodiment, third party network infrastructure system 1402 may have more or fewer components than depicted in FIG. 14, may combine two or more components, or may have a different configuration or arrangement of components.

In at least one embodiment, client computing devices 1404, 1406, and 1408 may be configured to operate a client application such as a web browser, a proprietary client application, or some other application, which may be used by a user of a client computing device to interact with third party network infrastructure system 1402 to use services provided by third party network infrastructure system 1402. Although exemplary system environment 1400 is shown with three client computing devices, any number of client computing devices may be supported. In at least one embodiment, other devices such as devices with sensors, etc. may interact with third party network infrastructure system 1402. In at least one embodiment, network(s) 1410 may facilitate communications and exchange of data between client computing devices 1404, 1406, and 1408 and third party network infrastructure system 1402.

In at least one embodiment, services provided by third party network infrastructure system 1402 may include a host of services that are made available to users of a third party network infrastructure system on demand. In at least one embodiment, various services may also be offered including without limitation online data storage and backup solutions, Web-based e-mail services, hosted office suites and document collaboration services, database management and processing, managed technical support services, and/or variations thereof. In at least one embodiment, services provided by a third party network infrastructure system can dynamically scale to meet needs of its users.

In at least one embodiment, a specific instantiation of a service provided by third party network infrastructure system 1402 may be referred to as a "service instance." In at least one embodiment, in general, any service made available to a user via a communication network, such as the Internet, from a third party network service provider's system is referred to as a "third party network service." In at least one embodiment, in a public third party network environment, servers and systems that make up a third party network service provider's system are different from a customer's own on-premises servers and systems. In at least one embodiment, a third party network service provider's system may host an application, and a user may, via a communication network such as the Internet, on demand, order and use an application.

In at least one embodiment, a service in a computer network third party network infrastructure may include protected computer network access to storage, a hosted database, a hosted web server, a software application, or other service provided by a third party network vendor to a user. In at least one embodiment, a service can include password-protected access to remote storage on a third party network through the Internet. In at least one embodiment, a service can include a web service-based hosted relational database and a script-language middleware engine for private use by a networked developer. In at least one embodiment, a service can include access to an email software application hosted on a third party network vendor's web site.

In at least one embodiment, third party network infrastructure system 1402 may include a suite of applications, middleware, and database service offerings that are delivered to a customer in a self-service, subscription-based, elastically scalable, reliable, highly available, and secure manner. In at least one embodiment, third party network infrastructure system 1402 may also provide "big data" related computation and analysis services. In at least one embodiment, term "big data" is generally used to refer to extremely large data sets that can be stored and manipulated by analysts and researchers to visualize large amounts of data, detect trends, and/or otherwise interact with data. In at least one embodiment, big data and related applications can be hosted and/or manipulated by an infrastructure system on many levels and at different scales. In at least one embodiment, tens, hundreds, or thousands of processors linked in parallel can act upon such data in order to present it or simulate external forces on data or what it represents. In at least one embodiment, these data sets can involve structured data, such as that organized in a database or otherwise according to a structured model, and/or unstructured data (e.g., emails, images, data blobs (binary large objects), web pages, complex event processing). In at least one embodiment, by leveraging an ability of an embodiment to relatively quickly focus more (or fewer) computing resources upon an objective, a third party network infrastructure system may be better available to carry out tasks on large data sets based on demand from a business, government agency, research organization, private individual, group of like-minded individuals or organizations, or other entity.

In at least one embodiment, third party network infrastructure system 1402 may be adapted to automatically provision, manage and track a customer's subscription to services offered by third party network infrastructure system 1402. In at least one embodiment, third party network infrastructure system 1402 may provide third party network services via different deployment models. In at least one embodiment, services may be provided under a public third party network model in which third party network infrastructure system 1402 is owned by an organization selling third party network services and services are made available to a general public or different industry enterprises. In at least one embodiment, services may be provided under a private third party network model in which third party network infrastructure system 1402 is operated solely for a single organization and may provide services for one or more entities within an organization. In at least one embodiment, third party network services may also be provided under a community third party network model in which third party network infrastructure system 1402 and services provided by third party network infrastructure system 1402 are shared by several organizations in a related community. In at least one embodiment, third party network services may also be provided under a hybrid third party network model, which is a combination of two or more different models.

In at least one embodiment, services provided by third party network infrastructure system 1402 may include one or more services provided under Software as a Service (SaaS) category, Platform as a Service (PaaS) category, Infrastructure as a Service (IaaS) category, or other categories of services including hybrid services. In at least one embodiment, a customer, via a subscription order, may order one or more services provided by third party network infrastructure system 1402. In at least one embodiment, third party network infrastructure system 1402 then performs processing to provide services in a customer's subscription order.

In at least one embodiment, services provided by third party network infrastructure system 1402 may include, without limitation, application services, platform services and infrastructure services. In at least one embodiment, application services may be provided by a third party network infrastructure system via a SaaS platform. In at least one embodiment, SaaS platform may be configured to provide third party network services that fall under a SaaS category. In at least one embodiment, SaaS platform may provide capabilities to build and deliver a suite of on-demand applications on an integrated development and deployment platform. In at least one embodiment, SaaS platform may manage and control underlying software and infrastructure for providing SaaS services. In at least one embodiment, by utilizing services provided by a SaaS platform, customers can utilize applications executing on a third party network infrastructure system. In at least one embodiment, customers can acquire an application services without a need for customers to purchase separate licenses and support. In at least one embodiment, various different SaaS services may be provided. In at least one embodiment, examples include, without limitation, services that provide solutions for sales performance management, enterprise integration, and business flexibility for large organizations.

In at least one embodiment, platform services may be provided by third party network infrastructure system 1402 via a PaaS platform. In at least one embodiment, PaaS platform may be configured to provide third party network services that fall under a PaaS category. In at least one embodiment, examples of platform services may include without limitation services that enable organizations to consolidate existing applications on a shared, common architecture, as well as an ability to build new applications that leverage shared services provided by a platform. In at least one embodiment, PaaS platform may manage and control underlying software and infrastructure for providing PaaS services. In at least one embodiment, customers can acquire PaaS services provided by third party network infrastructure system 1402 without a need for customers to purchase separate licenses and support.

In at least one embodiment, by utilizing services provided by a PaaS platform, customers can employ programming languages and tools supported by a third party network infrastructure system and also control deployed services. In at least one embodiment, platform services provided by a third party network infrastructure system may include database third party network services, middleware third party network services and third party network services. In at least one embodiment, database third party network services may support shared service deployment models that enable organizations to pool database resources and offer customers a Database as a Service in a form of a database third party network. In at least one embodiment, middleware third party network services may provide a platform for customers to develop and deploy various business applications, and third party network services may provide a platform for customers to deploy applications, in a third party network infrastructure system.

In at least one embodiment, various different infrastructure services may be provided by an IaaS platform in a third party network infrastructure system. In at least one embodiment, infrastructure services facilitate management and control of underlying computing resources, such as storage, networks, and other fundamental computing resources for customers utilizing services provided by a SaaS platform and a PaaS platform.

In at least one embodiment, third party network infrastructure system 1402 may also include infrastructure resources 1430 for providing resources used to provide various services to customers of a third party network infrastructure system. In at least one embodiment, infrastructure resources 1430 may include pre-integrated and optimized combinations of hardware, such as servers, storage, and networking resources to execute services provided by a Paas platform and a Saas platform, and other resources.

In at least one embodiment, resources in third party network infrastructure system 1402 may be shared by multiple users and dynamically re-allocated per demand. In at least one embodiment, resources may be allocated to users in different time zones. In at least one embodiment, third party network infrastructure system 1402 may enable a first set of users in a first time zone to utilize resources of a third party network infrastructure system for a specified number of hours and then enable a re-allocation of same resources to another set of users located in a different time zone, thereby maximizing utilization of resources.

In at least one embodiment, a number of internal shared services 1432 may be provided that are shared by different components or modules of third party network infrastructure system 1402 to enable provision of services by third party network infrastructure system 1402. In at least one embodiment, these internal shared services may include, without limitation, a security and identity service, an integration service, an enterprise repository service, an enterprise manager service, a virus scanning and white list service, a high availability, backup and recovery service, service for enabling third party network support, an email service, a notification service, a file transfer service, and/or variations thereof.

In at least one embodiment, third party network infrastructure system 1402 may provide comprehensive management of third party network services (e.g., SaaS, PaaS, and IaaS services) in a third party network infrastructure system. In at least one embodiment, third party network management functionality may include capabilities for provisioning, managing and tracking a customer's subscription received by third party network infrastructure system 1402, and/or variations thereof.

In at least one embodiment, as depicted in FIG. 14, third party network management functionality may be provided by one or more modules, such as an order management module 1420, an order orchestration module 1422, an order provisioning module 1424, an order management and monitoring module 1426, and an identity management module 1428. In at least one embodiment, these modules may include or be provided using one or more computers and/or servers, which may be general purpose computers, specialized server computers, server farms, server clusters, or any other appropriate arrangement and/or combination.

In at least one embodiment, at step 1434, a customer using a client device, such as client computing devices 1404, 1406 or 1408, may interact with third party network infrastructure system 1402 by requesting one or more services provided by third party network infrastructure system 1402 and placing an order for a subscription for one or more services offered by third party network infrastructure system 1402. In at least one embodiment, a customer may access a third party network User Interface (UI) such as third party network UI 1412, third party network UI 1414 and/or third party network UI 1416 and place a subscription order via these UIs. In at least one embodiment, order information received by third party network infrastructure system 1402 in response to a customer placing an order may include information identifying a customer and one or more services offered by a third party network infrastructure system 1402 that a customer intends to subscribe to.

In at least one embodiment, at step 1436, an order information received from a customer may be stored in an order database 1418. In at least one embodiment, if this is a new order, a new record may be created for an order. In at least one embodiment, order database 1418 can be one of several databases operated by third party network infrastructure system 1418 and operated in conjunction with other system elements.

In at least one embodiment, at step 1438, an order information may be forwarded to an order management module 1420 that may be configured to perform billing and accounting functions related to an order, such as verifying an order, and upon verification, booking an order.

In at least one embodiment, at step 1440, information regarding an order may be communicated to an order orchestration module 1422 that is configured to orchestrate provisioning of services and resources for an order placed by a customer. In at least one embodiment, order orchestration module 1422 may use services of order provisioning module 1424 for provisioning. In at least one embodiment, order orchestration module 1422 enables management of business processes associated with each order and applies business logic to determine whether an order should proceed to provisioning.

In at least one embodiment, at step 1442, upon receiving an order for a new subscription, order orchestration module 1422 sends a request to order provisioning module 1424 to allocate resources and configure resources needed to fulfill a subscription order. In at least one embodiment, order provisioning module 1424 enables an allocation of resources for services ordered by a customer. In at least one embodiment, order provisioning module 1424 provides a level of abstraction between third party network services provided by third party network infrastructure system 1400 and a physical implementation layer that is used to provision resources for providing requested services. In at least one embodiment, this enables order orchestration module 1422 to be isolated from implementation details, such as whether or not services and resources are actually provisioned in real-time or pre-provisioned and only allocated/assigned upon request.

In at least one embodiment, at step 1444, once services and resources are provisioned, a notification may be sent to subscribing customers indicating that a requested service is now ready for use. In at least one embodiment, information (e.g., a link) may be sent to a customer that enables a customer to start using requested services.

In at least one embodiment, at step 1446, a customer's subscription order may be managed and tracked by an order management and monitoring module 1426. In at least one embodiment, order management and monitoring module 1426 may be configured to collect usage statistics regarding a customer use of subscribed services. In at least one embodiment, statistics may be collected for an amount of storage used, an amount data transferred, a number of users, and an amount of system up time and system down time, and/or variations thereof.

In at least one embodiment, third party network infrastructure system 1400 may include an identity management module 1428 that is configured to provide identity services, such as access management and authorization services in third party network infrastructure system 1400. In at least one embodiment, identity management module 1428 may control information about customers who wish to utilize services provided by third party network infrastructure system 1402. In at least one embodiment, such information can include information that authenticates identities of such customers and information that describes which actions those customers are authorized to perform relative to various system resources (e.g., files, directories, applications, communication ports, memory segments, etc.). In at least one embodiment, identity management module 1428 may also include management of descriptive information about each customer and about how and by whom that descriptive information can be accessed and modified.

FIG. 15 illustrates a cloud computing environment 1502, in accordance with at least one embodiment. In at least one embodiment, cloud computing environment 1502 includes one or more computer system/servers 1504 with which computing devices such as, personal digital assistant (PDA) or cellular telephone 1506A, desktop computer 1506B, laptop computer 1506C, and/or automobile computer system 1506N communicate. In at least one embodiment, this allows for infrastructure, platforms and/or software to be offered as services from cloud computing environment 1502, so as to not require each client to separately maintain such resources. It is understood that types of computing devices 1506A-N shown in FIG. 15 are intended to be illustrative only and that cloud computing environment 1502 can communicate with any type of computerized device over any type of network and/or network/addressable connection (e.g., using a web browser).

In at least one embodiment, a computer system/server 1504, which can be denoted as a cloud computing node, is operational with numerous other general purpose or special purpose computing system environments or configurations. In at least one embodiment, examples of computing systems, environments, and/or configurations that may be suitable for use with computer system/server 1504 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and/or variations thereof.

In at least one embodiment, computer system/server 1504 may be described in a general context of computer system-executable instructions, such as program modules, being executed by a computer system. In at least one embodiment, program modules include routines, programs, objects, components, logic, data structures, and so on, that perform particular tasks or implement particular abstract data types. In at least one embodiment, exemplary computer system/server 1504 may be practiced in distributed loud computing environments where tasks are performed by remote processing devices that are linked through a communications network. In at least one embodiment, in a distributed cloud computing environment, program modules may be located in both local and remote computer system storage media including memory storage devices.

Figure 16:
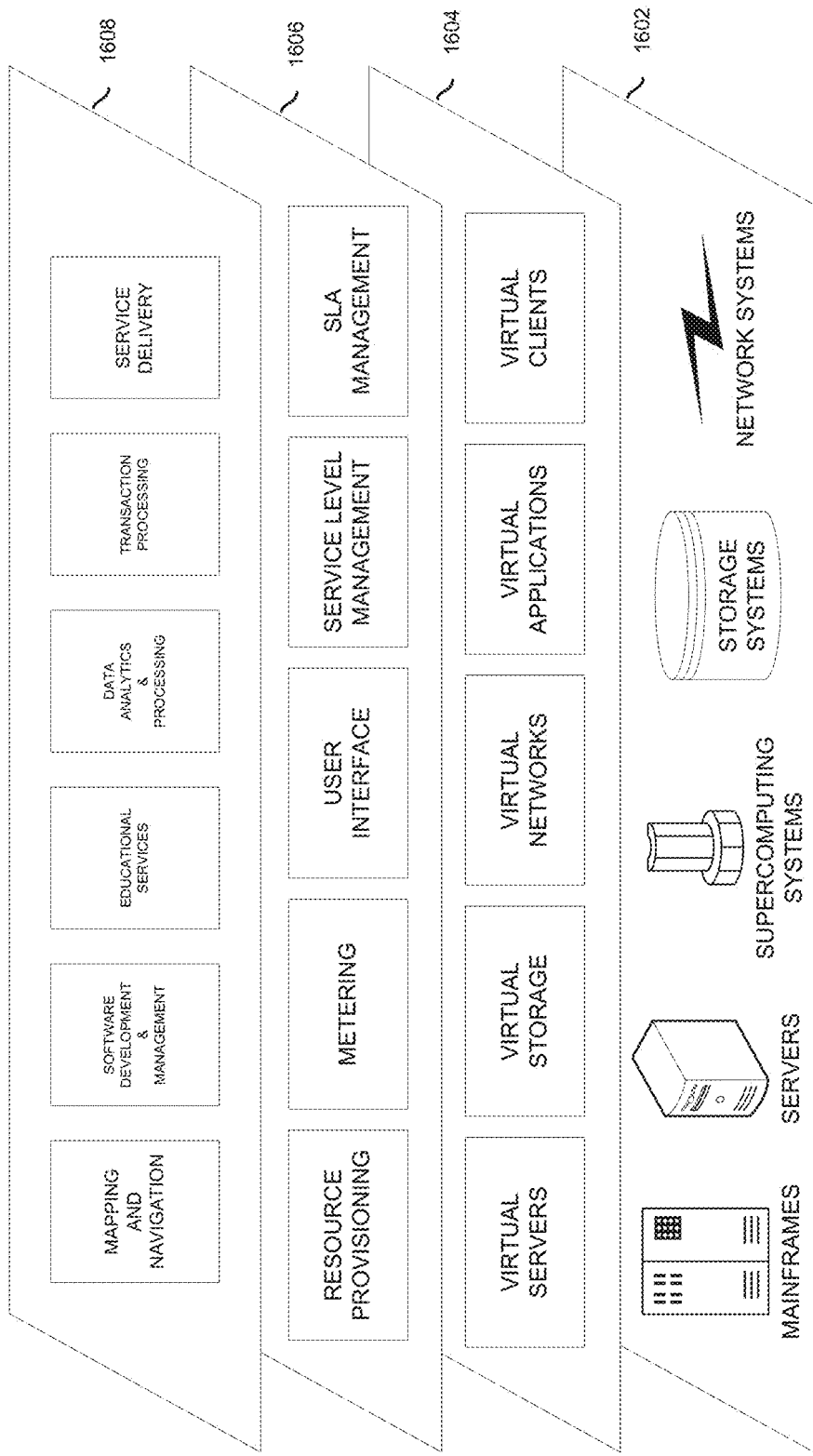
FIG. 16 illustrates a set of functional abstraction layers provided by a cloud computing environment, in accordance with at least one embodiment.

FIG. 16 illustrates a set of functional abstraction layers provided by cloud computing environment 1502 (FIG. 15), in accordance with at least one embodiment. It should be understood in advance that components, layers, and functions shown in FIG. 16 are intended to be illustrative only, and components, layers, and functions may vary.

In at least one embodiment, hardware and software layer 1602 includes hardware and software components. In at least one embodiment, examples of hardware components include mainframes, various RISC (Reduced Instruction Set Computer) architecture based servers, various computing systems, supercomputing systems, storage devices, networks, networking components, and/or variations thereof. In at least one embodiment, examples of software components include network application server software, various application server software, various database software, and/or variations thereof.

In at least one embodiment, virtualization layer 1604 provides an abstraction layer from which following exemplary virtual entities may be provided: virtual servers, virtual storage, virtual networks, including virtual private networks, virtual applications, virtual clients, and/or variations thereof.

In at least one embodiment, management layer 1606 provides various functions. In at least one embodiment, resource provisioning provides dynamic procurement of computing resources and other resources that are utilized to perform tasks within a cloud computing environment. In at least one embodiment, metering provides usage tracking as resources are utilized within a cloud computing environment, and billing or invoicing for consumption of these resources. In at least one embodiment, resources may include application software licenses. In at least one embodiment, security provides identity verification for users and tasks, as well as protection for data and other resources. In at least one embodiment, user interface provides access to a cloud computing environment for both users and system administrators. In at least one embodiment, service level management provides cloud computing resource allocation and management such that required service levels are met. In at least one embodiment, Service Level Agreement (SLA) management provides pre-arrangement for, and procurement of, cloud computing resources for which a future requirement is anticipated in accordance with an SLA.

In at least one embodiment, workloads layer 1608 provides functionality for which a cloud computing environment is utilized. In at least one embodiment, examples of workloads and functions which may be provided from this layer include: mapping and navigation, software development and management, educational services, data analytics and processing, transaction processing, and service delivery.

Supercomputing

The following figures set forth, without limitation, exemplary supercomputer-based systems that can be used to implement at least one embodiment.

In at least one embodiment, a supercomputer may refer to a hardware system exhibiting substantial parallelism and including at least one chip, where chips in a system are interconnected by a network and are placed in hierarchically organized enclosures. In at least one embodiment, a large hardware system filling a machine room, with several racks, each containing several boards/rack modules, each containing several chips, all interconnected by a scalable network, is one particular example of a supercomputer. In at least one embodiment, a single rack of such a large hardware system is another example of a supercomputer. In at least one embodiment, a single chip exhibiting substantial parallelism and containing several hardware components can equally be considered to be a supercomputer, since as feature sizes may decrease, an amount of hardware that can be incorporated in a single chip may also increase.

Figure 17:
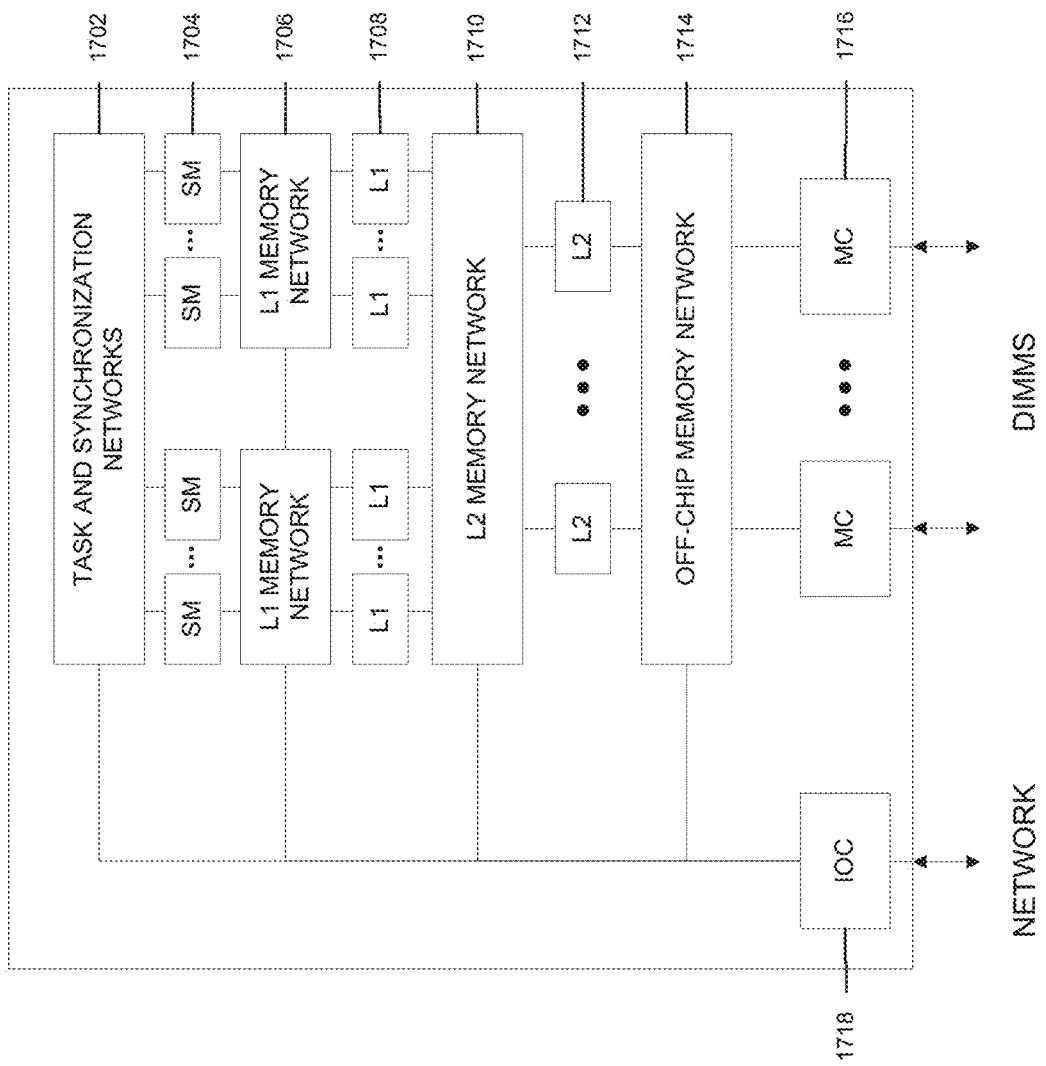
FIG. 17 illustrates a supercomputer at a chip level, in accordance with at least one embodiment.

FIG. 17 illustrates a supercomputer at a chip level, in accordance with at least one embodiment. In at least one embodiment, inside an FPGA or ASIC chip, main computation is performed within finite state machines (1704) called thread units. In at least one embodiment, task and synchronization networks (1702) connect finite state machines and are used to dispatch threads and execute operations in correct order. In at least one embodiment, a multi-level partitioned on-chip cache hierarchy (1708, 1712) is accessed using memory networks (1706, 1710). In at least one embodiment, off-chip memory is accessed using memory controllers (1716) and an off-chip memory network (1714). In at least one embodiment, I/O controller (1718) is used for cross-chip communication when a design does not fit in a single logic chip.

Figure 18:
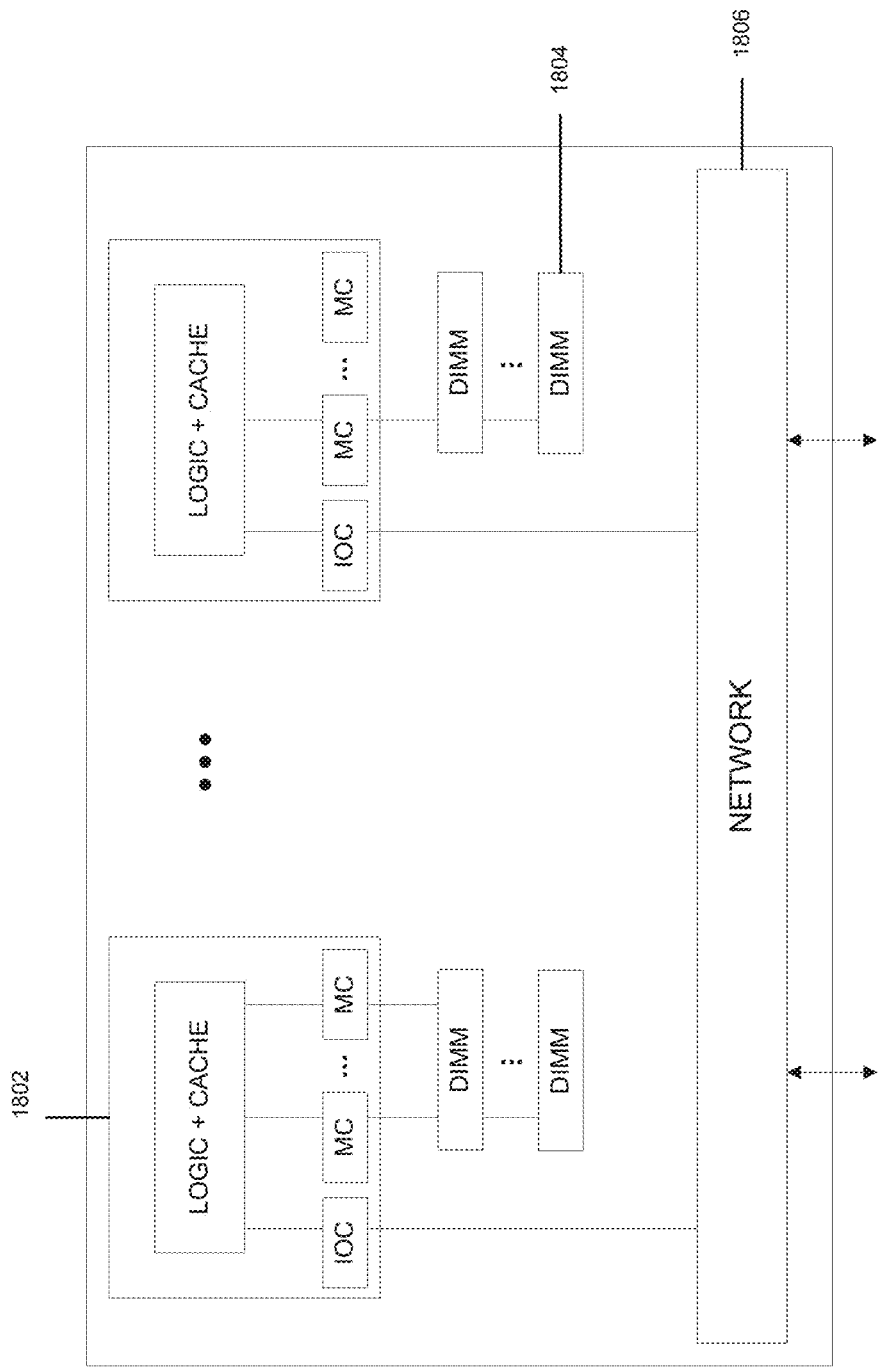
FIG. 18 illustrates a supercomputer at a rack module level, in accordance with at least one embodiment.

FIG. 18 illustrates a supercomputer at a rock module level, in accordance with at least one embodiment. In at least one embodiment, within a rack module, there are multiple FPGA or ASIC chips (1802) that are connected to one or more DRAM units (1804) which constitute main accelerator memory. In at least one embodiment, each FPGA/ASIC chip is connected to its neighbor FPGA/ASIC chip using wide busses on a board, with differential high speed signaling (1806). In at least one embodiment, each FPGA/ASIC chip is also connected to at least one high-speed serial communication cable.

Figure 19:
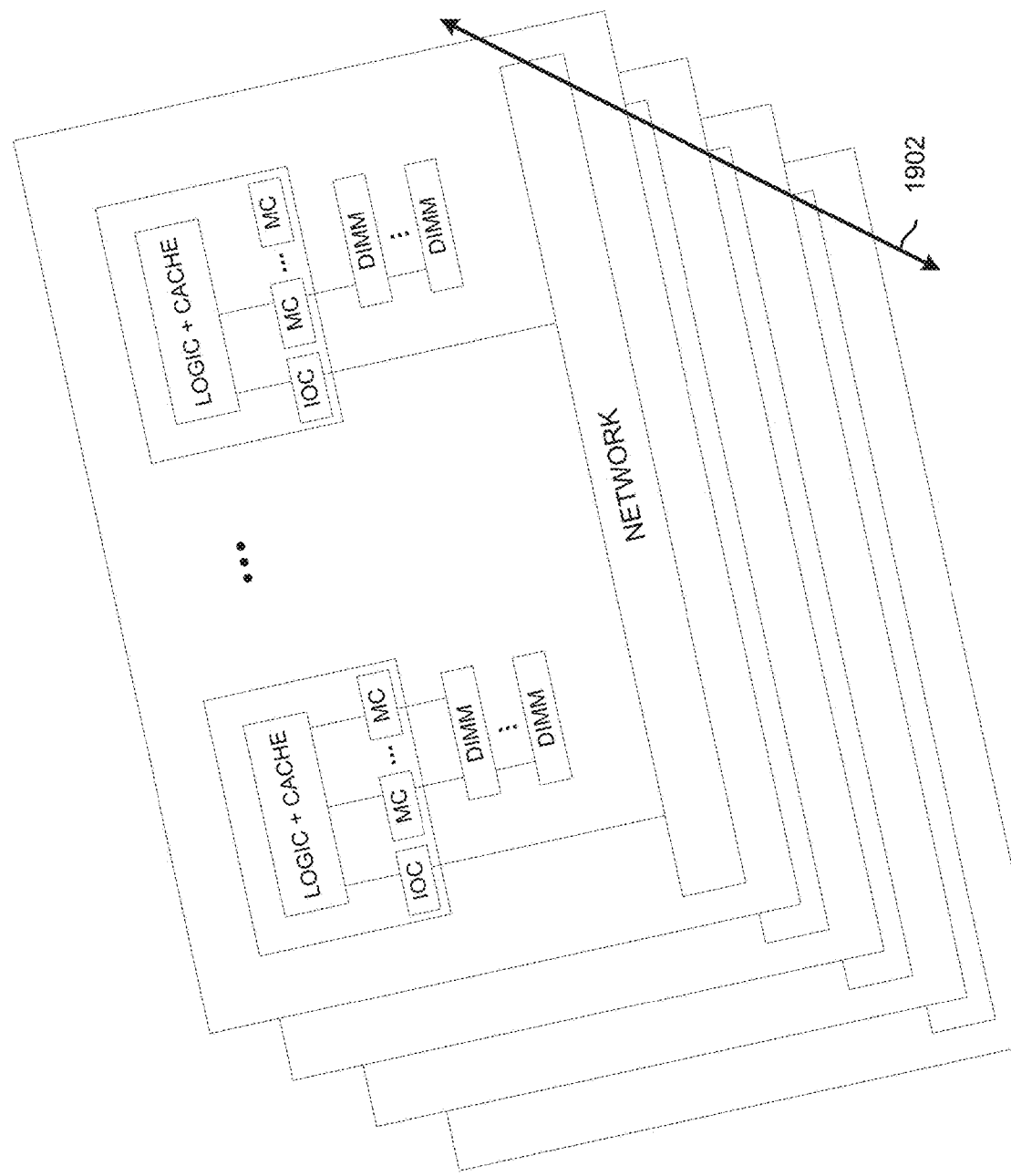
FIG. 19 illustrates a supercomputer at a rack level, in accordance with at least one embodiment.
Figure 20:
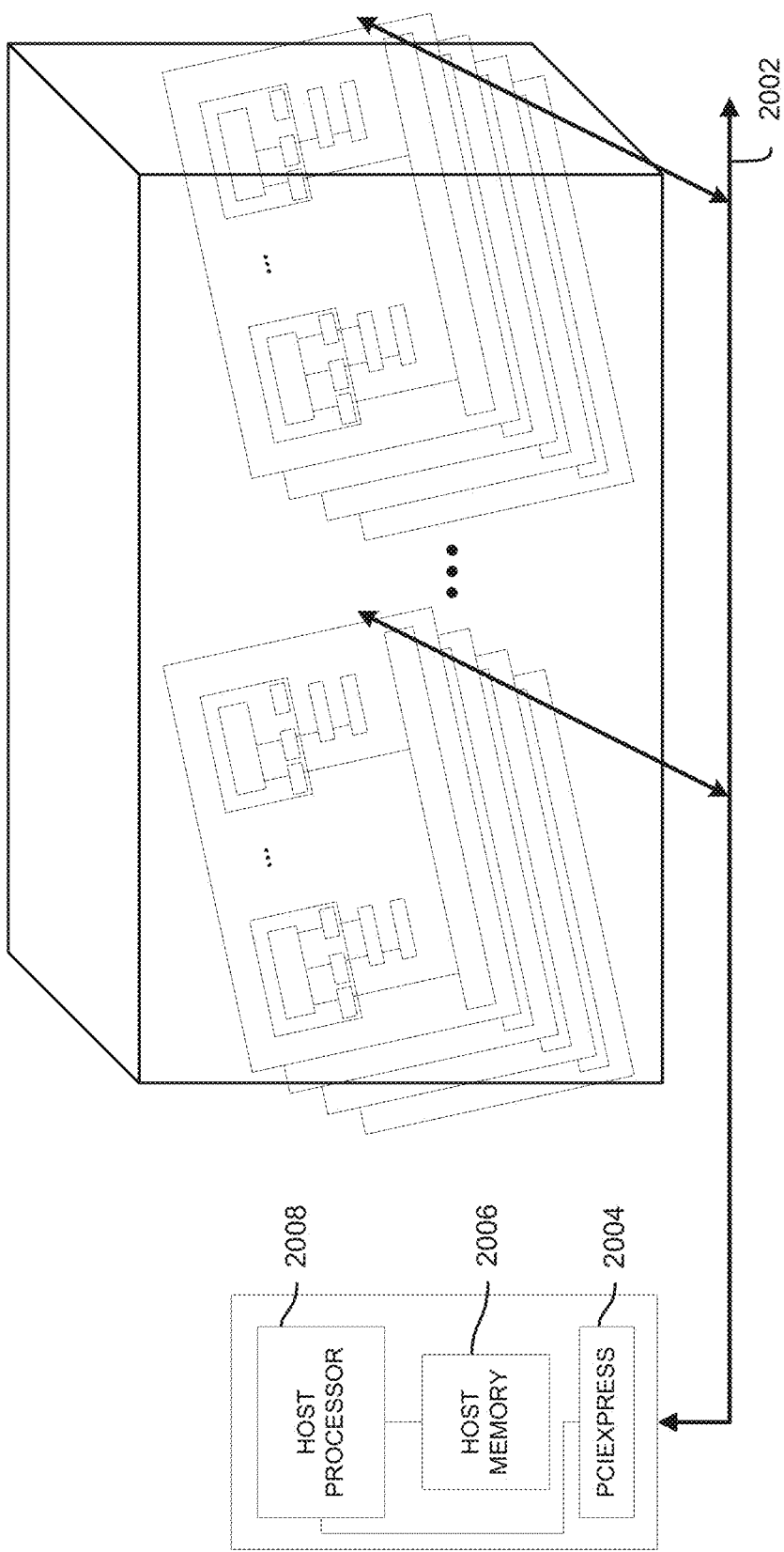
FIG. 20 illustrates a supercomputer at a whole system level, in accordance with at least one embodiment.

FIG. 19 illustrates a supercomputer at a rack level, in accordance with at least one embodiment. FIG. 20 illustrates a supercomputer at a whole system level, in accordance with at least one embodiment. In at least one embodiment, referring to FIG. 19 and FIG. 20, between rack modules in a rack and across racks throughout an entire system, high-speed serial optical or copper cables (1902, 2002) are used to realize a scalable, possibly incomplete hypercube network. In at least one embodiment, one of FPGA/ASIC chips of an accelerator is connected to a host system through a PCI-Express connection (2004). In at least one embodiment, host system includes a host microprocessor (2008) that a software part of an application runs on and a memory consisting of one or more host memory DRAM units (2006) that is kept coherent with memory on an accelerator. In at least one embodiment, host system can be a separate module on one of racks, or can be integrated with one of a supercomputer's modules. In at least one embodiment, cube-connected cycles topology provide communication links to create a hypercube network for a large supercomputer. In at least one embodiment, a small group of FPGA/ASIC chips on a rack module can act as a single hypercube node, such that a total number of external links of each group is increased, compared to a single chip. In at least one embodiment, a group contains chips A, B, C and D on a rack module with internal wide differential busses connecting A, B, C and D in a torus organization. In at least one embodiment, there are 12 serial communication cables connecting a rack module to an outside world. In at least one embodiment, chip A on a rack module connects to serial communication cables 0, 1, 2. In at least one embodiment, chip B connects to cables 3, 4, 5. In at least one embodiment, chip C connects to 6, 7, 8. In at least one embodiment, chip D connects to 9, 10, 11. In at least one embodiment, an entire group {A, B, C, D} constituting a rack module can form a hypercube node within a supercomputer system, with up to $2^{12}$=4096 rack modules (16384 FPGA/ASIC chips). In at least one embodiment, for chip A to send a message out on link 4 of group {A, B, C, D}, a message has to be routed first to chip B with an on-board differential wide bus connection. In at least one embodiment, a message arriving into a group {A, B, C, D} on link 4 (i.e., arriving at B) destined to chip A, also has to be routed first to a correct destination chip (A) internally within a group {A, B, C, D}. In at least one embodiment, parallel supercomputer systems of other sizes may also be implemented.

Artificial Intelligence

The following figures set forth, without limitation, exemplary artificial intelligence-based systems that can be used to implement at least one embodiment.

Figure 21A:
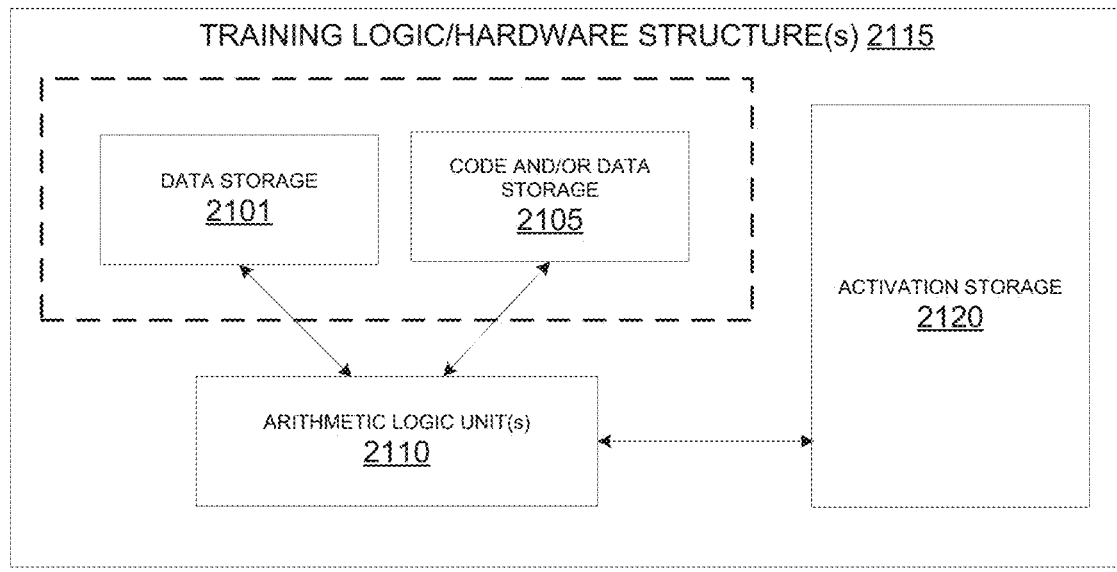
FIG. 21A illustrates inference and/or training logic, in accordance with at least one embodiment.

FIG. 21A illustrates inference and/or training logic 2115 used to perform inferencing and/or training operations associated with one or more embodiments. Details regarding inference and/or training logic 2115 are provided below in conjunction with FIGS. 21A and/or 21B.

In at least one embodiment, inference and/or training logic 2115 may include, without limitation, code and/or data storage 2101 to store forward and/or output weight and/or input/output data, and/or other parameters to configure neurons or layers of a neural network trained and/or used for inferencing in aspects of one or more embodiments. In at least one embodiment, training logic 2115 may include, or be coupled to code and/or data storage 2101 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which such code corresponds. In at least one embodiment code and/or data storage 2101 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 2101 may be included with other on-chip or off-chip data storage, including a processor's L1, L2, or L3 cache or system memory.

In at least one embodiment, any portion of code and/or data storage 2101 may be internal or external to one or more processors or other hardware logic devices or circuits. In at least one embodiment, code and/or code and/or data storage 2101 may be cache memory, dynamic randomly addressable memory ("DRAM"), static randomly addressable memory ("SRAM"), non-volatile memory (e.g., flash memory), or other storage. In at least one embodiment, a choice of whether code and/or code and/or data storage 2101 is internal or external to a processor, for example, or including DRAM, SRAM, flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 2115 may include, without limitation, a code and/or data storage 2105 to store backward and/or output weight and/or input/output data corresponding to neurons or layers of a neural network trained and/or used for inferencing in aspects of one or more embodiments. In at least one embodiment, code and/or data storage 2105 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 2115 may include, or be coupled to code and/or data storage 2105 to store graph code or other software to control timing and/or order, in which weight and/or other parameter information is to be loaded to configure, logic, including integer and/or floating point units (collectively, arithmetic logic units (ALUs)).

In at least one embodiment, code, such as graph code, causes loading of weight or other parameter information into processor ALUs based on an architecture of a neural network to which such code corresponds. In at least one embodiment, any portion of code and/or data storage 2105 may be included with other on-chip or off-chip data storage, including a processor's L1, L2, or L3 cache or system memory. In at least one embodiment, any portion of code and/or data storage 2105 may be internal or external to one or more processors or other hardware logic devices or circuits. In at least one embodiment, code and/or data storage 2105 may be cache memory, DRAM, SRAM, non-volatile memory (e.g., flash memory), or other storage. In at least one embodiment, a choice of whether code and/or data storage 2105 is internal or external to a processor, for example, or including DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 2101 and code and/or data storage 2105 may be separate storage structures. In at least one embodiment, code and/or data storage 2101 and code and/or data storage 2105 may be a combined storage structure. In at least one embodiment, code and/or data storage 2101 and code and/or data storage 2105 may be partially combined and partially separate. In at least one embodiment, any portion of code and/or data storage 2101 and code and/or data storage 2105 may be included with other on-chip or off-chip data storage, including a processor's L1, L2, or L3 cache or system memory.

In at least one embodiment, inference and/or training logic 2115 may include, without limitation, one or more arithmetic logic unit(s) ("ALU(s)") 2110, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 2120 that are functions of input/output and/or weight parameter data stored in code and/or data storage 2101 and/or code and/or data storage 2105. In at least one embodiment, activations stored in activation storage 2120 are generated according to linear algebraic and or matrix-based mathematics performed by ALU(s) 2110 in response to performing instructions or other code, wherein weight values stored in code and/or data storage 2105 and/or data storage 2101 are used as operands along with other values, such as bias values, gradient information, momentum values, or other parameters or hyperparameters, any or all of which may be stored in code and/or data storage 2105 or code and/or data storage 2101 or another storage on or off-chip.

In at least one embodiment, ALU(s) 2110 are included within one or more processors or other hardware logic devices or circuits, whereas in another embodiment, ALU(s) 2110 may be external to a processor or other hardware logic device or circuit that uses them (e.g., a co-processor). In at least one embodiment, ALUs 2110 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 2101, code and/or data storage 2105, and activation storage 2120 may share a processor or other hardware logic device or circuit, whereas in another embodiment, they may be in different processors or other hardware logic devices or circuits, or some combination of same and different processors or other hardware logic devices or circuits. In at least one embodiment, any portion of activation storage 2120 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 2120 may be cache memory, DRAM, SRAM, non-volatile memory (e.g., flash memory), or other storage. In at least one embodiment, activation storage 2120 may be completely or partially within or external to one or more processors or other logical circuits. In at least one embodiment, a choice of whether activation storage 2120 is internal or external to a processor, for example, or including DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 2115 illustrated in FIG. 21A may be used in conjunction with an application-specific integrated circuit ("ASIC"), such as a TensorFlow® Processing Unit from Google, an inference processing unit (IPU) from Graphcore™, or a Nervana® (e.g., "Lake Crest") processor from Intel Corp. In at least one embodiment, inference and/or training logic 2115 illustrated in FIG. 21A may be used in conjunction with central processing unit ("CPU") hardware, graphics processing unit ("GPU") hardware or other hardware, such as field programmable gate arrays ("FPGAs").

Figure 21B:
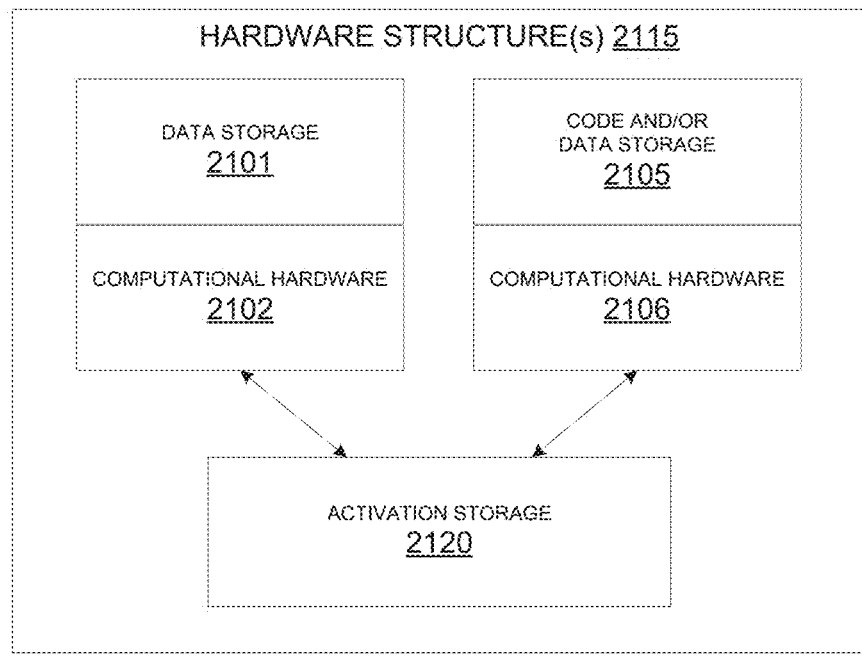
FIG. 21B illustrates inference and/or training logic, in accordance with at least one embodiment.

FIG. 21B illustrates inference and/or training logic 2115, according to at least one embodiment. In at least one embodiment, inference and/or training logic 2115 may include, without limitation, hardware logic in which computational resources are dedicated or otherwise exclusively used in conjunction with weight values or other information corresponding to one or more layers of neurons within a neural network. In at least one embodiment, inference and/or training logic 2115 illustrated in FIG. 21B may be used in conjunction with an application-specific integrated circuit (ASIC), such as TensorFlow® Processing Unit from Google, an inference processing unit (IPU) from Graphcore™, or a Nervana® (e.g., "Lake Crest") processor from Intel Corp. In at least one embodiment, inference and/or training logic 2115 illustrated in FIG. 21B may be used in conjunction with central processing unit (CPU) hardware, graphics processing unit (GPU) hardware or other hardware, such as field programmable gate arrays (FPGAs). In at least one embodiment, inference and/or training logic 2115 includes, without limitation, code and/or data storage 2101 and code and/or data storage 2105, which may be used to store code (e.g., graph code), weight values and/or other information, including bias values, gradient information, momentum values, and/or other parameter or hyperparameter information. In at least one embodiment illustrated in FIG. 21B, each of code and/or data storage 2101 and code and/or data storage 2105 is associated with a dedicated computational resource, such as computational hardware 2102 and computational hardware 2106, respectively. In at least one embodiment, each of computational hardware 2102 and computational hardware 2106 includes one or more ALUs that perform mathematical functions, such as linear algebraic functions, only on information stored in code and/or data storage 2101 and code and/or data storage 2105, respectively, result of which is stored in activation storage 2120.

In at least one embodiment, each of code and/or data storage 2101 and 2105 and corresponding computational hardware 2102 and 2106, respectively, correspond to different layers of a neural network, such that resulting activation from one storage/computational pair 2101/2102 of code and/or data storage 2101 and computational hardware 2102 is provided as an input to a next storage/computational pair 2105/2106 of code and/or data storage 2105 and computational hardware 2106, in order to mirror a conceptual organization of a neural network. In at least one embodiment, each of storage/computational pairs 2101/2102 and 2105/2106 may correspond to more than one neural network layer. In at least one embodiment, additional storage/computation pairs (not shown) subsequent to or in parallel with storage/computation pairs 2101/2102 and 2105/2106 may be included in inference and/or training logic 2115.

Figure 22:
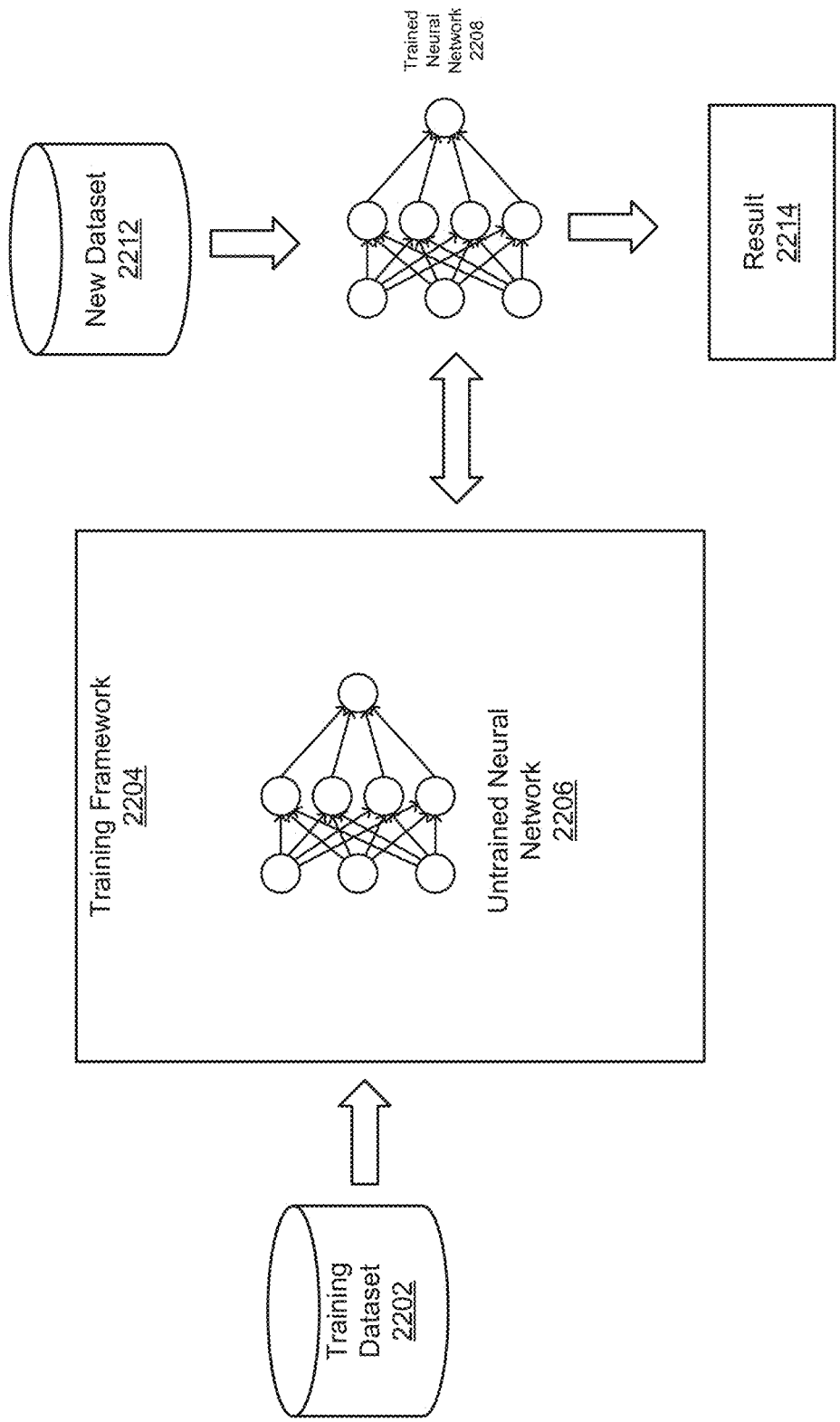
FIG. 22 illustrates training and deployment of a neural network, in accordance with at least one embodiment.

FIG. 22 illustrates training and deployment of a deep neural network, according to at least one embodiment. In at least one embodiment, untrained neural network 2206 is trained using a training dataset 2202. In at least one embodiment, training framework 2204 is a PyTorch framework, whereas in other embodiments, training framework 2204 is a TensorFlow, Boost, Caffe, Microsoft Cognitive Toolkit/CNTK, MXNet, Chainer, Keras, Deeplearning4j, or other training framework. In at least one embodiment, training framework 2204 trains an untrained neural network 2206 and enables it to be trained using processing resources described herein to generate a trained neural network 2208. In at least one embodiment, weights may be chosen randomly or by pre-training using a deep belief network. In at least one embodiment, training may be performed in either a supervised, partially supervised, or unsupervised manner.

In at least one embodiment, untrained neural network 2206 is trained using supervised learning, wherein training dataset 2202 includes an input paired with a desired output for an input, or where training dataset 2202 includes input having a known output and an output of neural network 2206 is manually graded. In at least one embodiment, untrained neural network 2206 is trained in a supervised manner and processes inputs from training dataset 2202 and compares resulting outputs against a set of expected or desired outputs. In at least one embodiment, errors are then propagated back through untrained neural network 2206. In at least one embodiment, training framework 2204 adjusts weights that control untrained neural network 2206. In at least one embodiment, training framework 2204 includes tools to monitor how well untrained neural network 2206 is converging towards a model, such as trained neural network 2208, suitable to generating correct answers, such as in result 2214, based on input data such as a new dataset 2212. In at least one embodiment, training framework 2204 trains untrained neural network 2206 repeatedly while adjust weights to refine an output of untrained neural network 2206 using a loss function and adjustment algorithm, such as stochastic gradient descent. In at least one embodiment, training framework 2204 trains untrained neural network 2206 until untrained neural network 2206 achieves a desired accuracy. In at least one embodiment, trained neural network 2208 can then be deployed to implement any number of machine learning operations.

In at least one embodiment, untrained neural network 2206 is trained using unsupervised learning, wherein untrained neural network 2206 attempts to train itself using unlabeled data. In at least one embodiment, unsupervised learning training dataset 2202 will include input data without any associated output data or "ground truth" data. In at least one embodiment, untrained neural network 2206 can learn groupings within training dataset 2202 and can determine how individual inputs are related to untrained dataset 2202. In at least one embodiment, unsupervised training can be used to generate a self-organizing map in trained neural network 2208 capable of performing operations useful in reducing dimensionality of new dataset 2212. In at least one embodiment, unsupervised training can also be used to perform anomaly detection, which allows identification of data points in new dataset 2212 that deviate from normal patterns of new dataset 2212.

In at least one embodiment, semi-supervised learning may be used, which is a technique in which in training dataset 2202 includes a mix of labeled and unlabeled data. In at least one embodiment, training framework 2204 may be used to perform incremental learning, such as through transferred learning techniques. In at least one embodiment, incremental learning enables trained neural network 2208 to adapt to new dataset 2212 without forgetting knowledge instilled within trained neural network 2208 during initial training.

5G Networks

The following figures set forth, without limitation, exemplary 5G network-based systems that can be used to implement at least one embodiment.

Figure 23:
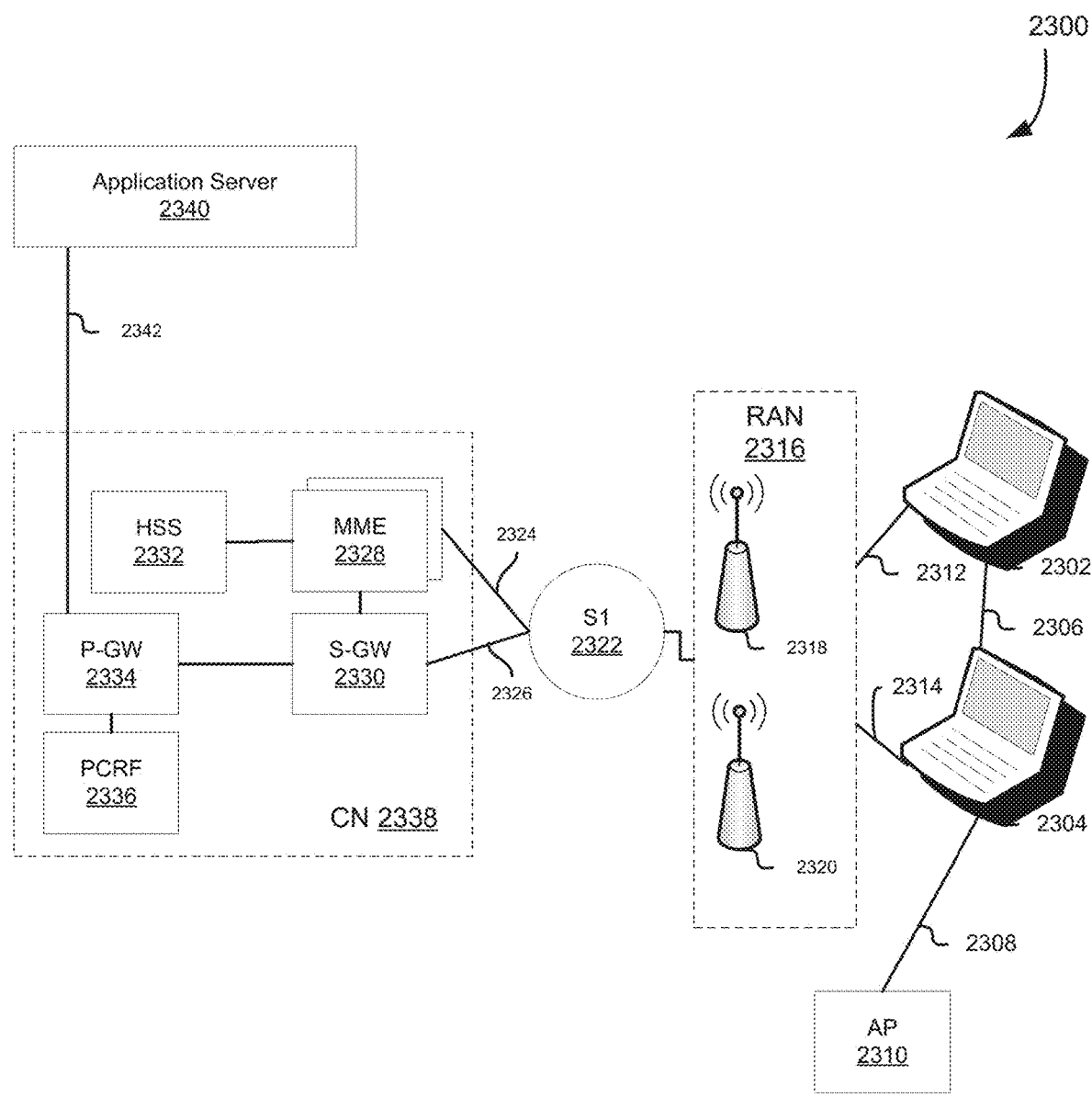
FIG. 23 illustrates an architecture of a system of a network, in accordance with at least one embodiment.

FIG. 23 illustrates an architecture of a system 2300 of a network, in accordance with at least one embodiment. In at least one embodiment, system 2300 is shown to include a user equipment (UE) 2302 and a UE 2304. In at least one embodiment, UEs 2302 and 2304 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, or any computing device including a wireless communications interface.

In at least one embodiment, any of UEs 2302 and 2304 can include an Internet of Things (IoT) UE, which can include a network access layer designed for low-power IoT applications utilizing short-lived UE connections. In at least one embodiment, an IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. In at least one embodiment, a M2M or MTC exchange of data may be a machine-initiated exchange of data. In at least one embodiment, an IoT network describes interconnecting IoT UEs, which may include uniquely identifiable embedded computing devices (within Internet infrastructure), with short-lived connections. In at least one embodiment, an IoT UEs may execute background applications (e.g., keep alive messages, status updates, etc.) to facilitate connections of an IoT network.

In at least one embodiment, UEs 2302 and 2304 may be configured to connect, e.g., communicatively couple, with a radio access network (RAN) 2316. In at least one embodiment, RAN 2316 may be, for example, an Evolved Universal Mobile Telecommunications System (UMTS) Terrestrial Radio Access Network (E-UTRAN), a NextGen RAN (NG RAN), or some other type of RAN. In at least one embodiment, UEs 2302 and 2304 utilize connections 2312 and 2314, respectively, each of which includes a physical communications interface or layer. In at least one embodiment, connections 2312 and 2314 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and variations thereof.

In at least one embodiment, UEs 2302 and 2304 may further directly exchange communication data via a ProSe interface 2306. In at least one embodiment, ProSe interface 2306 may alternatively be referred to as a sidelink interface including one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

In at least one embodiment, UE 2304 is shown to be configured to access an access point (AP) 2310 via connection 2308. In at least one embodiment, connection 2308 can include a local wireless connection, such as a connection consistent with any IEEE 802.11 protocol, wherein AP 2310 would include a wireless fidelity (WiFi®) router. In at least one embodiment, AP 2310 is shown to be connected to an Internet without connecting to a core network of a wireless system.

In at least one embodiment, RAN 2316 can include one or more access nodes that enable connections 2312 and 2314. In at least one embodiment, these access nodes (ANs) can be referred to as base stations (BSs), NodeBs, evolved NodeBs (eNBs), next Generation NodeBs (gNB), RAN nodes, and so forth, and can include ground stations (e.g., terrestrial access points) or satellite stations providing coverage within a geographic area (e.g., a cell). In at least one embodiment, RAN 2316 may include one or more RAN nodes for providing macrocells, e.g., macro RAN node 2318, and one or more RAN nodes for providing femtocells or picocells (e.g., cells having smaller coverage areas, smaller user capacity, or higher bandwidth compared to macrocells), e.g., low power (LP) RAN node 2320.

In at least one embodiment, any of RAN nodes 2318 and 2320 can terminate an air interface protocol and can be a first point of contact for UEs 2302 and 2304. In at least one embodiment, any of RAN nodes 2318 and 2320 can fulfill various logical functions for RAN 2316 including, but not limited to, radio network controller (RNC) functions such as radio bearer management, uplink and downlink dynamic radio resource management and data packet scheduling, and mobility management.

In at least one embodiment, UEs 2302 and 2304 can be configured to communicate using Orthogonal Frequency-Division Multiplexing (OFDM) communication signals with each other or with any of RAN nodes 2318 and 2320 over a multi-carrier communication channel in accordance various communication techniques, such as, but not limited to, an Orthogonal Frequency Division Multiple Access (OFDMA) communication technique (e.g., for downlink communications) or a Single Carrier Frequency Division Multiple Access (SC-FDMA) communication technique (e.g., for uplink and ProSe or sidelink communications), and/or variations thereof. In at least one embodiment, OFDM signals can include a plurality of orthogonal subcarriers.

In at least one embodiment, a downlink resource grid can be used for downlink transmissions from any of RAN nodes 2318 and 2320 to UEs 2302 and 2304, while uplink transmissions can utilize similar techniques. In at least one embodiment, a grid can be a time frequency grid, called a resource grid or time-frequency resource grid, which is a physical resource in a downlink in each slot. In at least one embodiment, such a time frequency plane representation is a common practice for OFDM systems, which makes it intuitive for radio resource allocation. In at least one embodiment, each column and each row of a resource grid corresponds to one OFDM symbol and one OFDM subcarrier, respectively. In at least one embodiment, a duration of a resource grid in a time domain corresponds to one slot in a radio frame. In at least one embodiment, a smallest time-frequency unit in a resource grid is denoted as a resource element. In at least one embodiment, each resource grid includes a number of resource blocks, which describe a mapping of certain physical channels to resource elements. In at least one embodiment, each resource block includes a collection of resource elements. In at least one embodiment, in a frequency domain, this may represent a smallest quantity of resources that currently can be allocated. In at least one embodiment, there are several different physical downlink channels that are conveyed using such resource blocks.

In at least one embodiment, a physical downlink shared channel (PDSCH) may carry user data and higher-layer signaling to UEs 2302 and 2304. In at least one embodiment, a physical downlink control channel (PDCCH) may carry information about a transport format and resource allocations related to PDSCH channel, among other things. In at least one embodiment, it may also inform UEs 2302 and 2304 about a transport format, resource allocation, and HARQ (Hybrid Automatic Repeat Request) information related to an uplink shared channel. In at least one embodiment, typically, downlink scheduling (assigning control and shared channel resource blocks to UE 2302 within a cell) may be performed at any of RAN nodes 2318 and 2320 based on channel quality information fed back from any of UEs 2302 and 2304. In at least one embodiment, downlink resource assignment information may be sent on a PDCCH used for (e.g., assigned to) each of UEs 2302 and 2304.

In at least one embodiment, a PDCCH may use control channel elements (CCEs) to convey control information. In at least one embodiment, before being mapped to resource elements, PDCCH complex valued symbols may first be organized into quadruplets, which may then be permuted using a sub-block interleaver for rate matching. In at least one embodiment, each PDCCH may be transmitted using one or more of these CCEs, where each CCE may correspond to nine sets of four physical resource elements known as resource element groups (REGs). In at least one embodiment, four Quadrature Phase Shift Keying (QPSK) symbols may be mapped to each REG. In at least one embodiment, PDCCH can be transmitted using one or more CCEs, depending on a size of a downlink control information (DCI) and a channel condition. In at least one embodiment, there can be four or more different PDCCH formats defined in LTE with different numbers of CCEs (e.g., aggregation level, L=1, 2, 4, or 8).

In at least one embodiment, an enhanced physical downlink control channel (EPDCCH) that uses PDSCH resources may be utilized for control information transmission. In at least one embodiment, EPDCCH may be transmitted using one or more enhanced control channel elements (ECCEs). In at least one embodiment, each ECCE may correspond to nine sets of four physical resource elements known as an enhanced resource element groups (EREGs). In at least one embodiment, an ECCE may have other numbers of EREGs in some situations.

In at least one embodiment, RAN 2316 is shown to be communicatively coupled to a core network (CN) 2338 via an S1 interface 2322. In at least one embodiment, CN 2338 may be an evolved packet core (EPC) network, a NextGen Packet Core (NPC) network, or some other type of CN. In at least one embodiment, S1 interface 2322 is split into two parts: S1-U interface 2326, which carries traffic data between RAN nodes 2318 and 2320 and serving gateway (S-GW) 2330, and a S1-mobility management entity (MME) interface 2324, which is a signaling interface between RAN nodes 2318 and 2320 and MMES 2328.

In at least one embodiment, CN 2338 includes MMES 2328, S-GW 2330, Packet Data Network (PDN) Gateway (P-GW) 2334, and a home subscriber server (HSS) 2332. In at least one embodiment, MMEs 2328 may be similar in function to a control plane of legacy Serving General Packet Radio Service (GPRS) Support Nodes (SGSN). In at least one embodiment, MMEs 2328 may manage mobility aspects in access such as gateway selection and tracking area list management. In at least one embodiment, HSS 2332 may include a database for network users, including subscription related information to support a network entities' handling of communication sessions. In at least one embodiment, CN 2338 may include one or several HSSs 2332, depending on a number of mobile subscribers, on a capacity of an equipment, on an organization of a network, etc. In at least one embodiment, HSS 2332 can provide support for routing/roaming, authentication, authorization, naming/addressing resolution, location dependencies, etc.

In at least one embodiment, S-GW 2330 may terminate a S1 interface 2322 towards RAN 2316, and routes data packets between RAN 2316 and CN 2338. In at least one embodiment, S-GW 2330 may be a local mobility anchor point for inter-RAN node handovers and also may provide an anchor for inter-3GPP mobility. In at least one embodiment, other responsibilities may include lawful intercept, charging, and some policy enforcement.

In at least one embodiment, P-GW 2334 may terminate an SGi interface toward a PDN. In at least one embodiment, P-GW 2334 may route data packets between an EPC network 2338 and external networks such as a network including application server 2340 (alternatively referred to as application function (AF)) via an Internet Protocol (IP) interface 2342. In at least one embodiment, application server 2340 may be an element offering applications that use IP bearer resources with a core network (e.g., UMTS Packet Services (PS) domain, LTE PS data services, etc.). In at least one embodiment, P-GW 2334 is shown to be communicatively coupled to an application server 2340 via an IP communications interface 2342. In at least one embodiment, application server 2340 can also be configured to support one or more communication services (e.g., Voice-over-Internet Protocol (VoIP) sessions, PTT sessions, group communication sessions, social networking services, etc.) for UEs 2302 and 2304 via CN 2338.

In at least one embodiment, P-GW 2334 may further be a node for policy enforcement and charging data collection. In at least one embodiment, policy and Charging Enforcement Function (PCRF) 2336 is a policy and charging control element of CN 2338. In at least one embodiment, in a non-roaming scenario, there may be a single PCRF in a Home Public Land Mobile Network (HPLMN) associated with a UE's Internet Protocol Connectivity Access Network (IP-CAN) session. In at least one embodiment, in a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). In at least one embodiment, PCRF 2336 may be communicatively coupled to application server 2340 via P-GW 2334. In at least one embodiment, application server 2340 may signal PCRF 2336 to indicate a new service flow and select an appropriate Quality of Service (QoS) and charging parameters. In at least one embodiment, PCRF 2336 may provision this rule into a Policy and Charging Enforcement Function (PCEF) (not shown) with an appropriate traffic flow template (TFT) and QoS class of identifier (QCI), which commences a QoS and charging as specified by application server 2340.

Figure 24:
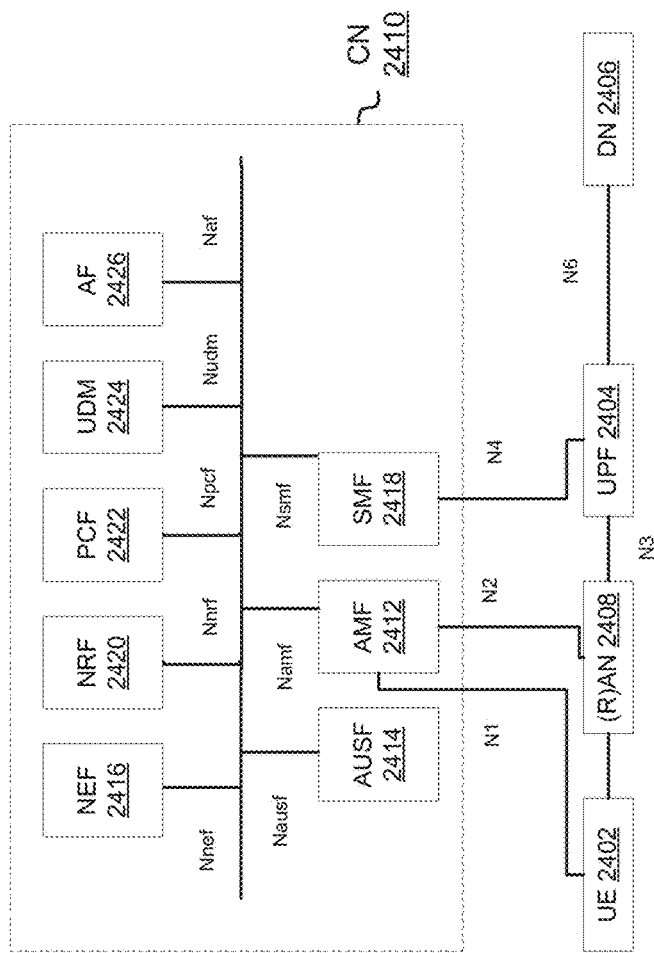
FIG. 24 illustrates an architecture of a system of a network, in accordance with at least one embodiment.

FIG. 24 illustrates an architecture of a system 2400 of a network in accordance with some embodiments. In at least one embodiment, system 2400 is shown to include a UE 2402, a 5G access node or RAN node (shown as (R)AN node 2408), a User Plane Function (shown as UPF 2404), a Data Network (DN 2406), which may be, for example, operator services, Internet access or 3rd party services, and a 5G Core Network (5GC) (shown as CN 2410).

In at least one embodiment, CN 2410 includes an Authentication Server Function (AUSF 2414); a Core Access and Mobility Management Function (AMF 2412); a Session Management Function (SMF 2418); a Network Exposure Function (NEF 2416); a Policy Control Function (PCF 2422); a Network Function (NF) Repository Function (NRF 2420); a Unified Data Management (UDM 2424); and an Application Function (AF 2426). In at least one embodiment, CN 2410 may also include other elements that are not shown, such as a Structured Data Storage network function (SDSF), an Unstructured Data Storage network function (UDSF), and variations thereof.

In at least one embodiment, UPF 2404 may act as an anchor point for intra-RAT and inter-RAT mobility, an external PDU session point of interconnect to DN 2406, and a branching point to support multi-homed PDU session. In at least one embodiment, UPF 2404 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in uplink and downlink, and downlink packet buffering and downlink data notification triggering. In at least one embodiment, UPF 2404 may include an uplink classifier to support routing traffic flows to a data network. In at least one embodiment, DN 2406 may represent various network operator services, Internet access, or third party services.

In at least one embodiment, AUSF 2414 may store data for authentication of UE 2402 and handle authentication related functionality. In at least one embodiment, AUSF 2414 may facilitate a common authentication framework for various access types.

In at least one embodiment, AMF 2412 may be responsible for registration management (e.g., for registering UE 2402, etc.), connection management, reachability management, mobility management, and lawful interception of AMF-related events, and access authentication and authorization. In at least one embodiment, AMF 2412 may provide transport for SM messages for SMF 2418, and act as a transparent proxy for routing SM messages. In at least one embodiment, AMF 2412 may also provide transport for short message service (SMS) messages between UE 2402 and an SMS function (SMSF) (not shown by FIG. 24). In at least one embodiment, AMF 2412 may act as Security Anchor Function (SEA), which may include interaction with AUSF 2414 and UE 2402 and receipt of an intermediate key that was established as a result of UE 2402 authentication process. In at least one embodiment, where USIM based authentication is used, AMF 2412 may retrieve security material from AUSF 2414. In at least one embodiment, AMF 2412 may also include a Security Context Management (SCM) function, which receives a key from SEA that it uses to derive access-network specific keys. In at least one embodiment, furthermore, AMF 2412 may be a termination point of RAN CP interface (N2 reference point), a termination point of NAS (NI) signaling, and perform NAS ciphering and integrity protection.

In at least one embodiment, AMF 2412 may also support NAS signaling with a UE 2402 over an N3 interworking-function (IWF) interface. In at least one embodiment, N3IWF may be used to provide access to untrusted entities. In at least one embodiment, N3IWF may be a termination point for N2 and N3 interfaces for control plane and user plane, respectively, and as such, may handle N2 signaling from SMF and AMF for PDU sessions and QoS, encapsulate/de-encapsulate packets for IPSec and N3 tunneling, mark N3 user-plane packets in uplink, and enforce QoS corresponding to N3 packet marking taking into account QoS requirements associated to such marking received over N2. In at least one embodiment, N3IWF may also relay uplink and downlink control-plane NAS (NI) signaling between UE 2402 and AMF 2412, and relay uplink and downlink user-plane packets between UE 2402 and UPF 2404. In at least one embodiment, N3IWF also provides mechanisms for IPsec tunnel establishment with UE 2402.

In at least one embodiment, SMF 2418 may be responsible for session management (e.g., session establishment, modify and release, including tunnel maintain between UPF and AN node); UE IP address allocation & management (including optional Authorization); Selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. In at least one embodiment, SMF 2418 may include following roaming functionality: handle local enforcement to apply QoS SLAB (VPLMN); charging data collection and charging interface (VPLMN); lawful intercept (in VPLMN for SM events and interface to LI System); support for interaction with external DN for transport of signaling for PDU session authorization/authentication by external DN.

In at least one embodiment, NEF 2416 may provide means for securely exposing services and capabilities provided by 3GPP network functions for third party, internal exposure/re-exposure, Application Functions (e.g., AF 2426), edge computing or fog computing systems, etc. In at least one embodiment, NEF 2416 may authenticate, authorize, and/or throttle AFs. In at least one embodiment, NEF 2416 may also translate information exchanged with AF 2426 and information exchanged with internal network functions. In at least one embodiment, NEF 2416 may translate between an AF-Service-Identifier and an internal 5GC information. In at least one embodiment, NEF 2416 may also receive information from other network functions (NFs) based on exposed capabilities of other network functions. In at least one embodiment, this information may be stored at NEF 2416 as structured data, or at a data storage NF using a standardized interfaces. In at least one embodiment, stored information can then be re-exposed by NEF 2416 to other NFs and AFs, and/or used for other purposes such as analytics.

In at least one embodiment, NRF 2420 may support service discovery functions, receive NF Discovery Requests from NF instances, and provide information of discovered NF instances to NF instances. In at least one embodiment, NRF 2420 also maintains information of available NF instances and their supported services.

In at least one embodiment, PCF 2422 may provide policy rules to control plane function(s) to enforce them, and may also support unified policy framework to govern network behavior. In at least one embodiment, PCF 2422 may also implement a front end (FE) to access subscription information relevant for policy decisions in a UDR of UDM 2424.

In at least one embodiment, UDM 2424 may handle subscription-related information to support a network entities' handling of communication sessions, and may store subscription data of UE 2402. In at least one embodiment, UDM 2424 may include two parts, an application FE and a User Data Repository (UDR). In at least one embodiment, UDM may include a UDM FE, which is in charge of processing of credentials, location management, subscription management and so on. In at least one embodiment, several different front ends may serve a same user in different transactions. In at least one embodiment, UDM-FE accesses subscription information stored in an UDR and performs authentication credential processing; user identification handling; access authorization; registration/mobility management; and subscription management. In at least one embodiment, UDR may interact with PCF 2422. In at least one embodiment, UDM 2424 may also support SMS management, wherein an SMS-FE implements a similar application logic as discussed previously.

In at least one embodiment, AF 2426 may provide application influence on traffic routing, access to a Network Capability Exposure (NCE), and interact with a policy framework for policy control. In at least one embodiment, NCE may be a mechanism that allows a 5GC and AF 2426 to provide information to each other via NEF 2416, which may be used for edge computing implementations. In at least one embodiment, network operator and third party services may be hosted close to UE 2402 access point of attachment to achieve an efficient service delivery through a reduced end-to-end latency and load on a transport network. In at least one embodiment, for edge computing implementations, 5GC may select a UPF 2404 close to UE 2402 and execute traffic steering from UPF 2404 to DN 2406 via N6 interface. In at least one embodiment, this may be based on UE subscription data, UE location, and information provided by AF 2426. In at least one embodiment, AF 2426 may influence UPF (re)selection and traffic routing. In at least one embodiment, based on operator deployment, when AF 2426 is considered to be a trusted entity, a network operator may permit AF 2426 to interact directly with relevant NFs.

In at least one embodiment, CN 2410 may include an SMSF, which may be responsible for SMS subscription checking and verification, and relaying SM messages to/from UE 2402 to/from other entities, such as an SMS-GMSC/IWMSC/SMS-router. In at least one embodiment, SMS may also interact with AMF 2412 and UDM 2424 for notification procedure that UE 2402 is available for SMS transfer (e.g., set a UE not reachable flag, and notifying UDM 2424 when UE 2402 is available for SMS).

In at least one embodiment, system 2400 may include following service-based interfaces: Namf: Service-based interface exhibited by AMF; Nsmf: Service-based interface exhibited by SMF; Nnef: Service-based interface exhibited by NEF; Npcf: Service-based interface exhibited by PCF; Nudm: Service-based interface exhibited by UDM; Naf: Service-based interface exhibited by AF; Nnrf: Service-based interface exhibited by NRF; and Nausf: Service-based interface exhibited by AUSF.

In at least one embodiment, system 2400 may include following reference points: N1: Reference point between UE and AMF; N2: Reference point between (R)AN and AMF; N3: Reference point between (R)AN and UPF; N4: Reference point between SMF and UPF; and N6: Reference point between UPF and a Data Network. In at least one embodiment, there may be many more reference points and/or service-based interfaces between a NF services in NFs, however, these interfaces and reference points have been omitted for clarity. In at least one embodiment, an NS reference point may be between a PCF and AF; an N7 reference point may be between PCF and SMF; an N11 reference point between AMF and SMF; etc. In at least one embodiment, CN 2410 may include an Nx interface, which is an inter-CN interface between MME and AMF 2412 in order to enable interworking between CN 2410 and CN 7224.

In at least one embodiment, system 2400 may include multiple RAN nodes (such as (R)AN node 2408) wherein an Xn interface is defined between two or more (R)AN node 2408 (e.g., gNBs) that connecting to 5GC 410, between a (R)AN node 2408 (e.g., gNB) connecting to CN 2410 and an eNB (e.g., a macro RAN node), and/or between two eNBs connecting to CN 2410.

In at least one embodiment, Xn interface may include an Xn user plane (Xn-U) interface and an Xn control plane (Xn-C) interface. In at least one embodiment, Xn-U may provide non-guaranteed delivery of user plane PDUs and support/provide data forwarding and flow control functionality. In at least one embodiment, Xn-C may provide management and error handling functionality, functionality to manage a Xn-C interface; mobility support for UE 2402 in a connected mode (e.g., CM-CONNECTED) including functionality to manage UE mobility for connected mode between one or more (R)AN node 2408. In at least one embodiment, mobility support may include context transfer from an old (source) serving (R)AN node 2408 to new (target) serving (R)AN node 2408; and control of user plane tunnels between old (source) serving (R)AN node 2408 to new (target) serving (R)AN node 2408.

In at least one embodiment, a protocol stack of a Xn-U may include a transport network layer built on Internet Protocol (IP) transport layer, and a GTP-U layer on top of a UDP and/or IP layer(s) to carry user plane PDUs. In at least one embodiment, Xn-C protocol stack may include an application layer signaling protocol (referred to as Xn Application Protocol (Xn-AP)) and a transport network layer that is built on an SCTP layer. In at least one embodiment, SCTP layer may be on top of an IP layer. In at least one embodiment, SCTP layer provides a guaranteed delivery of application layer messages. In at least one embodiment, in a transport IP layer point-to-point transmission is used to deliver signaling PDUs. In at least one embodiment, Xn-U protocol stack and/or a Xn-C protocol stack may be same or similar to an user plane and/or control plane protocol stack(s) shown and described herein.

Figure 25:
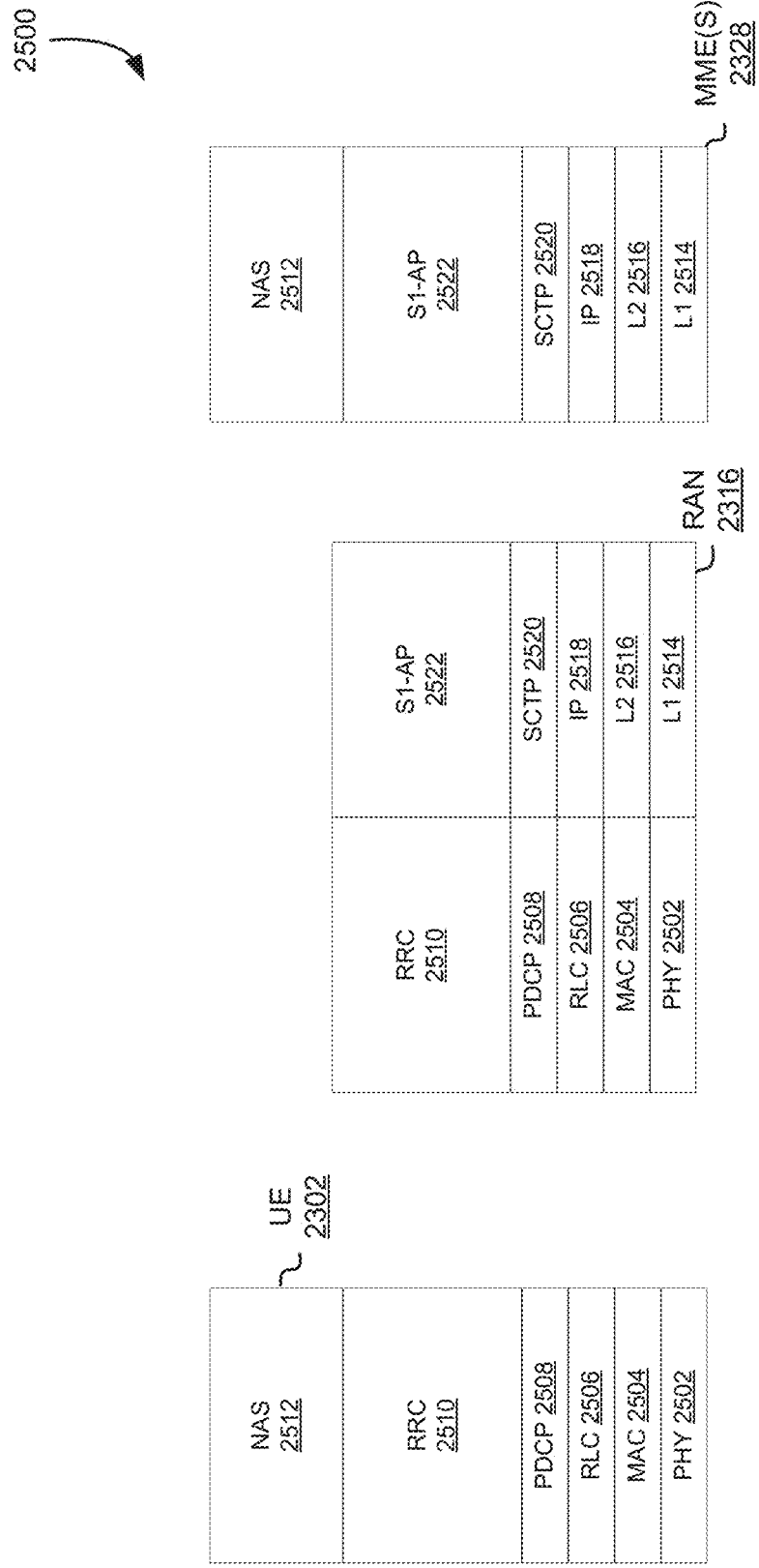
FIG. 25 illustrates a control plane protocol stack, in accordance with at least one embodiment.

FIG. 25 is an illustration of a control plane protocol stack in accordance with some embodiments. In at least one embodiment, a control plane 2500 is shown as a communications protocol stack between UE 2302 (or alternatively, UE 2304), RAN 2316, and MME(s) 2328.

In at least one embodiment, PHY layer 2502 may transmit or receive information used by MAC layer 2504 over one or more air interfaces. In at least one embodiment, PHY layer 2502 may further perform link adaptation or adaptive modulation and coding (AMC), power control, cell search (e.g., for initial synchronization and handover purposes), and other measurements used by higher layers, such as an RRC layer 2510. In at least one embodiment, PHY layer 2502 may still further perform error detection on transport channels, forward error correction (FEC) coding/de-coding of transport channels, modulation/demodulation of physical channels, interleaving, rate matching, mapping onto physical channels, and Multiple Input Multiple Output (MIMO) antenna processing.

In at least one embodiment, MAC layer 2504 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from PHY via transport channels, multiplexing MAC SDUs onto TBs, scheduling information reporting, error correction through hybrid automatic repeat request (HARD), and logical channel prioritization.

In at least one embodiment, RLC layer 2506 may operate in a plurality of modes of operation, including: Transparent Mode (TM), Unacknowledged Mode (UM), and Acknowledged Mode (AM). In at least one embodiment, RLC layer 2506 may execute transfer of upper layer protocol data units (PDUs), error correction through automatic repeat request (ARQ) for AM data transfers, and concatenation, segmentation and reassembly of RLC SDUs for UM and AM data transfers. In at least one embodiment, RLC layer 2506 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

In at least one embodiment, PDCP layer 2508 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

In at least one embodiment, main services and functions of a RRC layer 2510 may include broadcast of system information (e.g., included in Master Information Blocks (MIBs) or System Information Blocks (SIBs) related to a non-access stratum (NAS)), broadcast of system information related to an access stratum (AS), paging, establishment, maintenance and release of an RRC connection between an UE and E-UTRAN (e.g., RRC connection paging, RRC connection establishment, RRC connection modification, and RRC connection release), establishment, configuration, maintenance and release of point-to-point radio bearers, security functions including key management, inter radio access technology (RAT) mobility, and measurement configuration for UE measurement reporting. In at least one embodiment, said MIBs and SIBs may include one or more information elements (IEs), which may each include individual data fields or data structures.

In at least one embodiment, UE 2302 and RAN 2316 may utilize a Uu interface (e.g., an LTE-Uu interface) to exchange control plane data via a protocol stack including PHY layer 2502, MAC layer 2504, RLC layer 2506, PDCP layer 2508, and RRC layer 2510.

In at least one embodiment, non-access stratum (NAS) protocols (NAS protocols 2512) form a highest stratum of a control plane between UE 2302 and MME(s) 2328. In at least one embodiment, NAS protocols 2512 support mobility of UE 2302 and session management procedures to establish and maintain IP connectivity between UE 2302 and P-GW 2334.

In at least one embodiment, Si Application Protocol (S1-AP) layer (Si-AP layer 2522) may support functions of a Si interface and include Elementary Procedures (EPs). In at least one embodiment, an EP is a unit of interaction between RAN 2316 and CN 2328. In at least one embodiment, S1-AP layer services may include two groups: UE-associated services and non UE-associated services. In at least one embodiment, these services perform functions including, but not limited to: E-UTRAN Radio Access Bearer (E-RAB) management, UE capability indication, mobility, NAS signaling transport, RAN Information Management (RIM), and configuration transfer.

In at least one embodiment, Stream Control Transmission Protocol (SCTP) layer (alternatively referred to as a stream control transmission protocol/internet protocol (SCTP/IP) layer) (SCTP layer 2520) may ensure reliable delivery of signaling messages between RAN 2316 and MME(s) 2328 based, in part, on an IP protocol, supported by an IP layer 2518. In at least one embodiment, L2 layer 2516 and an L1 layer 2514 may refer to communication links (e.g., wired or wireless) used by a RAN node and MME to exchange information.

In at least one embodiment, RAN 2316 and MME(s) 2328 may utilize an S1-MME interface to exchange control plane data via a protocol stack including a L1 layer 2514, L2 layer 2516, IP layer 2518, SCTP layer 2520, and Si-AP layer 2522.

Figure 26:
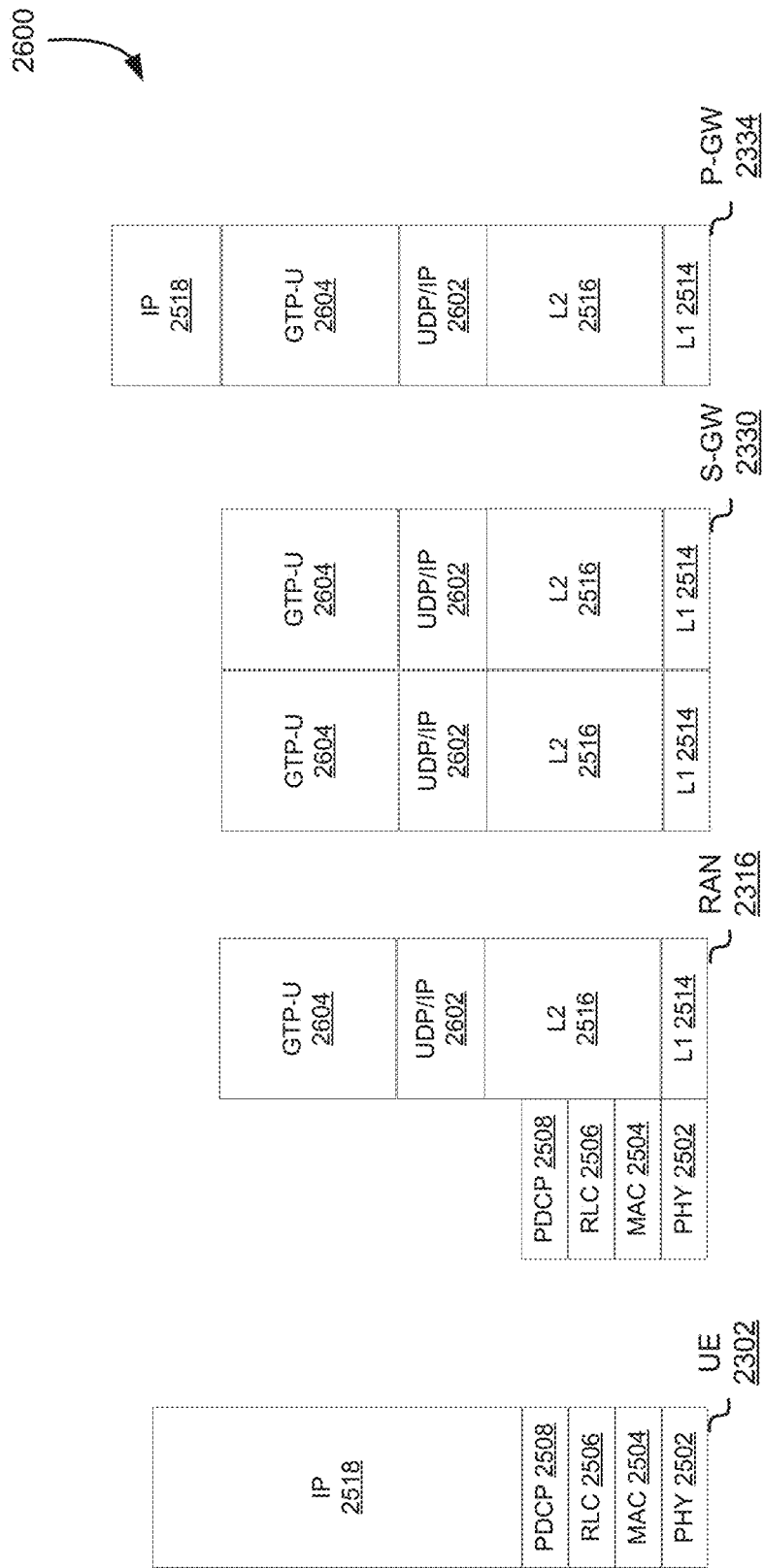
FIG. 26 illustrates a user plane protocol stack, in accordance with at least one embodiment.

FIG. 26 is an illustration of a user plane protocol stack in accordance with at least one embodiment. In at least one embodiment, a user plane 2600 is shown as a communications protocol stack between a UE 2302, RAN 2316, S-GW 2330, and P-GW 2334. In at least one embodiment, user plane 2600 may utilize a same protocol layers as control plane 2500. In at least one embodiment, for example, UE 2302 and RAN 2316 may utilize a Uu interface (e.g., an LTE-Uu interface) to exchange user plane data via a protocol stack including PHY layer 2502, MAC layer 2504, RLC layer 2506, PDCP layer 2508.

In at least one embodiment, General Packet Radio Service (GPRS) Tunneling Protocol for a user plane (GTP-U) layer (GTP-U layer 2604) may be used for carrying user data within a GPRS core network and between a radio access network and a core network. In at least one embodiment, user data transported can be packets in any of IPv4, IPv6, or PPP formats, for example. In at least one embodiment, UDP and IP security (UDP/IP) layer (UDP/IP layer 2602) may provide checksums for data integrity, port numbers for addressing different functions at a source and destination, and encryption and authentication on selected data flows. In at least one embodiment, RAN 2316 and S-GW 2330 may utilize an S1-U interface to exchange user plane data via a protocol stack including L1 layer 2514, L2 layer 2516, UDP/IP layer 2602, and GTP-U layer 2604. In at least one embodiment, S-GW 2330 and P-GW 2334 may utilize an S5/S8a interface to exchange user plane data via a protocol stack including L1 layer 2514, L2 layer 2516, UDP/IP layer 2602, and GTP-U layer 2604. In at least one embodiment, as discussed above with respect to FIG. 25, NAS protocols support a mobility of UE 2302 and session management procedures to establish and maintain IP connectivity between UE 2302 and P-GW 2334.

Figure 27:
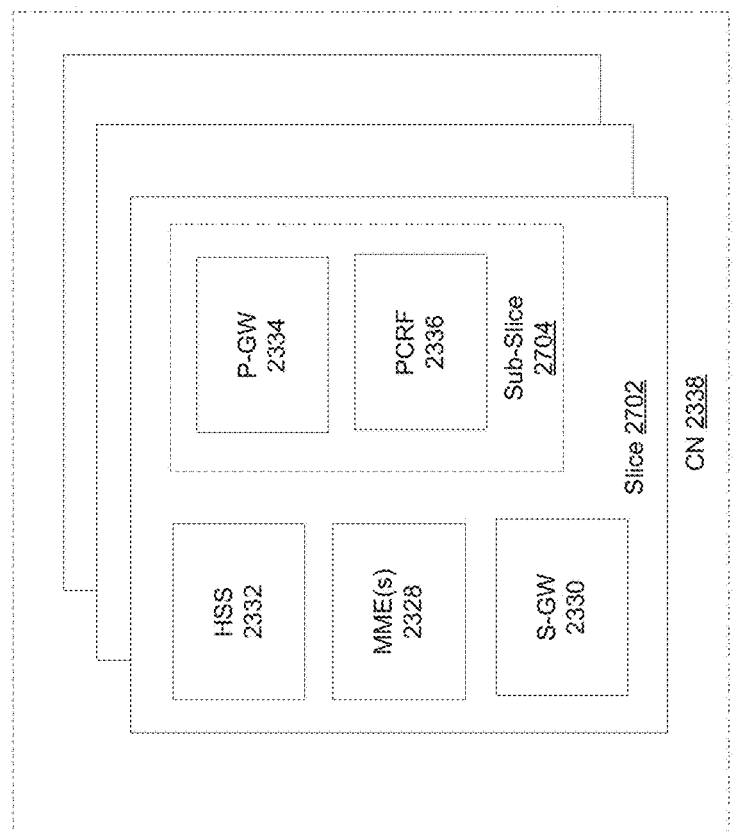
FIG. 27 illustrates components of a core network, in accordance with at least one embodiment.

FIG. 27 illustrates components 2700 of a core network in accordance with at least one embodiment. In at least one embodiment, components of CN 2338 may be implemented in one physical node or separate physical nodes including components to read and execute instructions from a machine-readable or computer-readable medium (e.g., a non-transitory machine-readable storage medium). In at least one embodiment, Network Functions Virtualization (NFV) is utilized to virtualize any or all of above described network node functions via executable instructions stored in one or more computer readable storage mediums (described in further detail below). In at least one embodiment, a logical instantiation of CN 2338 may be referred to as a network slice 2702 (e.g., network slice 2702 is shown to include HSS 2332, MME(s) 2328, and S-GW 2330). In at least one embodiment, a logical instantiation of a portion of CN 2338 may be referred to as a network sub-slice 2704 (e.g., network sub-slice 2704 is shown to include P-GW 2334 and PCRF 2336).

In at least one embodiment, NFV architectures and infrastructures may be used to virtualize one or more network functions, alternatively performed by proprietary hardware, onto physical resources including a combination of industry-standard server hardware, storage hardware, or switches. In at least one embodiment, NFV systems can be used to execute virtual or reconfigurable implementations of one or more EPC components/functions.

Figure 28:
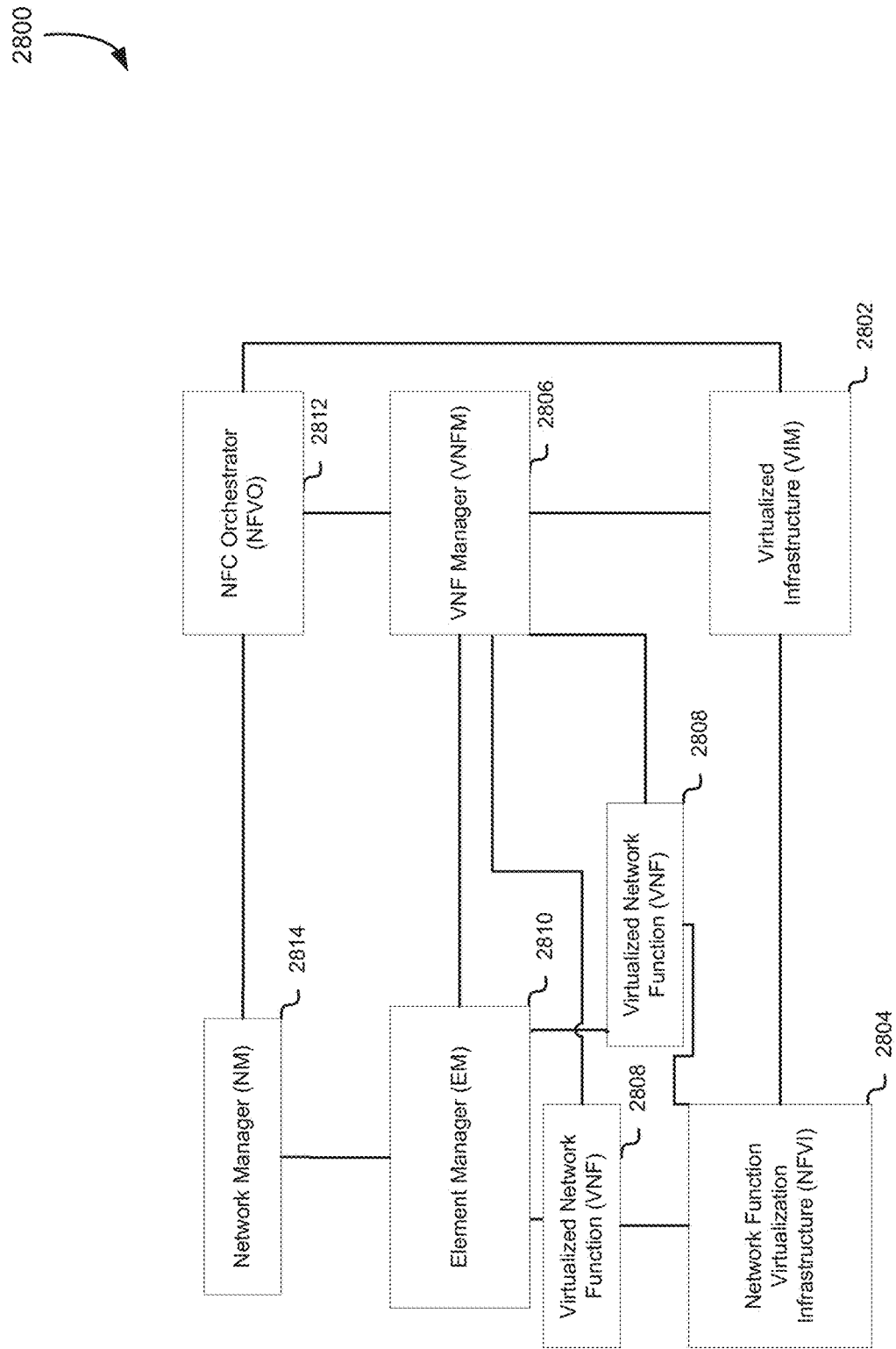
FIG. 28 illustrates components of a system to support network function virtualization (NFV), in accordance with at least one embodiment.

FIG. 28 is a block diagram illustrating components, according to at least one embodiment, of a system 2800 to support network function virtualization (NFV). In at least one embodiment, system 2800 is illustrated as including a virtualized infrastructure manager (shown as VIM 2802), a network function virtualization infrastructure (shown as NFVI 2804), a VNF manager (shown as VNFM 2806), virtualized network functions (shown as VNF 2808), an element manager (shown as EM 2810), an NFV Orchestrator (shown as NFVO 2812), and a network manager (shown as NM 2814).

In at least one embodiment, VIM 2802 manages resources of NFVI 2804. In at least one embodiment, NFVI 2804 can include physical or virtual resources and applications (including hypervisors) used to execute system 2800. In at least one embodiment, VIM 2802 may manage a life cycle of virtual resources with NFVI 2804 (e.g., creation, maintenance, and tear down of virtual machines (VMs) associated with one or more physical resources), track VM instances, track performance, fault and security of VM instances and associated physical resources, and expose VM instances and associated physical resources to other management systems.

In at least one embodiment, VNFM 2806 may manage VNF 2808. In at least one embodiment, VNF 2808 may be used to execute EPC components/functions. In at least one embodiment, VNFM 2806 may manage a life cycle of VNF 2808 and track performance, fault and security of virtual aspects of VNF 2808. In at least one embodiment, EM 2810 may track performance, fault and security of functional aspects of VNF 2808. In at least one embodiment, tracking data from VNFM 2806 and EM 2810 may include, for example, performance measurement (PM) data used by VIM 2802 or NFVI 2804. In at least one embodiment, both VNFM 2806 and EM 2810 can scale up/down a quantity of VNFs of system 2800.

In at least one embodiment, NFVO 2812 may coordinate, authorize, release and engage resources of NFVI 2804 in order to provide a requested service (e.g., to execute an EPC function, component, or slice). In at least one embodiment, NM 2814 may provide a package of end-user functions with responsibility for a management of a network, which may include network elements with VNFs, non-virtualized network functions, or both (management of VNFs may occur via an EM 2810).

Computer-Based Systems

The following figures set forth, without limitation, exemplary computer-based systems that can be used to implement at least one embodiment.

Figure 29:
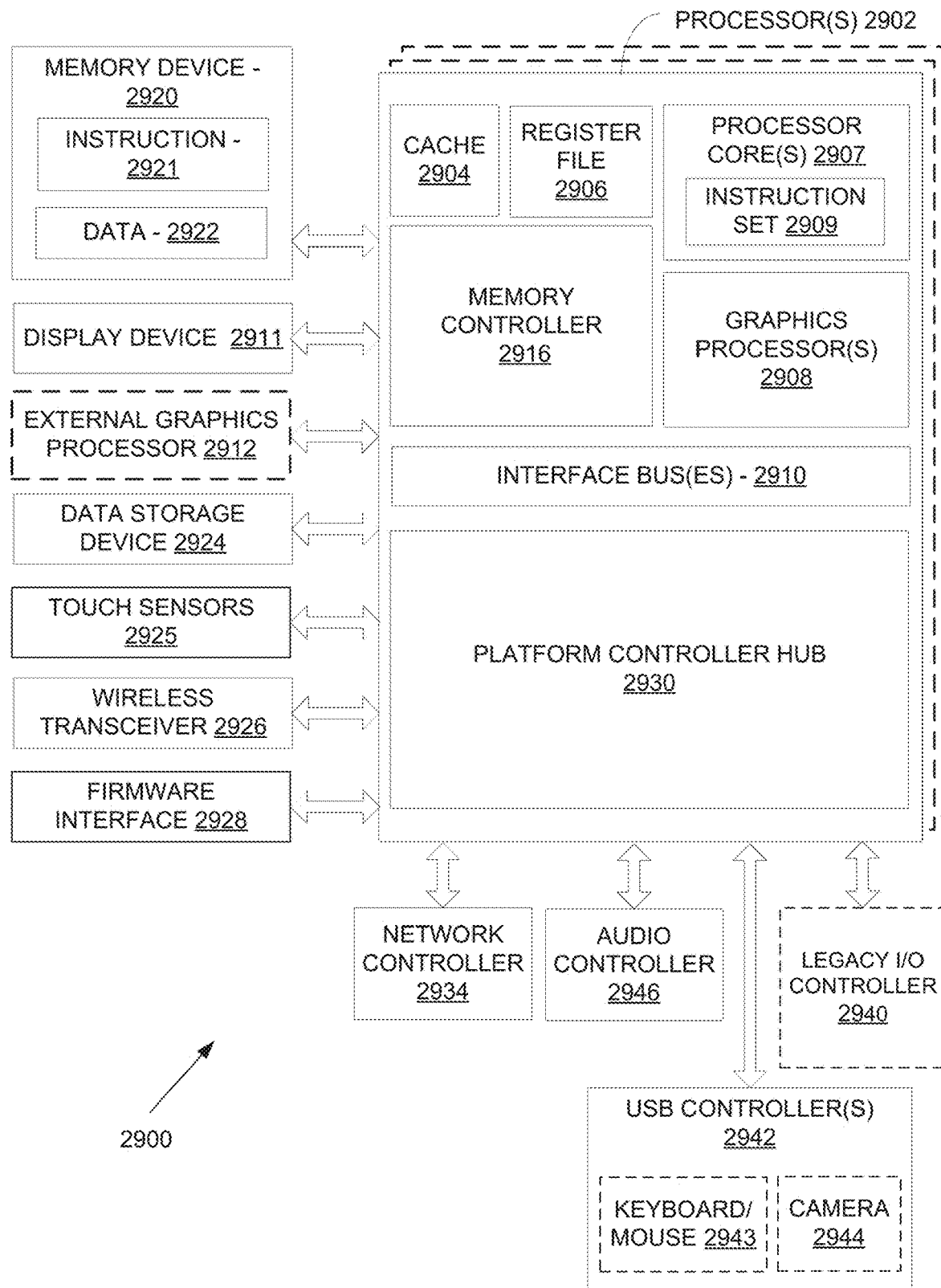
FIG. 29 illustrates a processing system, in accordance with at least one embodiment.

FIG. 29 illustrates a processing system 2900, in accordance with at least one embodiment. In at least one embodiment, processing system 2900 includes one or more processors 2902 and one or more graphics processors 2908, and may be a single processor desktop system, a multiprocessor workstation system, or a server system having a large number of processors 2902 or processor cores 2907. In at least one embodiment, processing system 2900 is a processing platform incorporated within a system-on-a-chip ("SoC") integrated circuit for use in mobile, handheld, or embedded devices.

In at least one embodiment, processing system 2900 can include, or be incorporated within a server-based gaming platform, a game console, a media console, a mobile gaming console, a handheld game console, or an online game console. In at least one embodiment, processing system 2900 is a mobile phone, smart phone, tablet computing device or mobile Internet device. In at least one embodiment, processing system 2900 can also include, couple with, or be integrated within a wearable device, such as a smart watch wearable device, smart eyewear device, augmented reality device, or virtual reality device. In at least one embodiment, processing system 2900 is a television or set top box device having one or more processors 2902 and a graphical interface generated by one or more graphics processors 2908.

In at least one embodiment, one or more processors 2902 each include one or more processor cores 2907 to process instructions which, when executed, perform operations for system and user software. In at least one embodiment, each of one or more processor cores 2907 is configured to process a specific instruction set 2909. In at least one embodiment, instruction set 2909 may facilitate Complex Instruction Set Computing ("CISC"), Reduced Instruction Set Computing ("RISC"), or computing via a Very Long Instruction Word ("VLIW"). In at least one embodiment, processor cores 2907 may each process a different instruction set 2909, which may include instructions to facilitate emulation of other instruction sets. In at least one embodiment, processor core 2907 may also include other processing devices, such as a digital signal processor ("DSP").

In at least one embodiment, processor 2902 includes cache memory ('cache") 2904. In at least one embodiment, processor 2902 can have a single internal cache or multiple levels of internal cache. In at least one embodiment, cache memory is shared among various components of processor 2902. In at least one embodiment, processor 2902 also uses an external cache (e.g., a Level 3 ("L3") cache or Last Level Cache ("LLC")) (not shown), which may be shared among processor cores 2907 using known cache coherency techniques. In at least one embodiment, register file 2906 is additionally included in processor 2902 which may include different types of registers for storing different types of data (e.g., integer registers, floating point registers, status registers, and an instruction pointer register). In at least one embodiment, register file 2906 may include general-purpose registers or other registers.

In at least one embodiment, one or more processor(s) 2902 are coupled with one or more interface bus(es) 2910 to transmit communication signals such as address, data, or control signals between processor 2902 and other components in processing system 2900. In at least one embodiment interface bus 2910, in one embodiment, can be a processor bus, such as a version of a Direct Media Interface ("DMI") bus. In at least one embodiment, interface bus 2910 is not limited to a DMI bus, and may include one or more Peripheral Component Interconnect buses (e.g., "PCI," PCI Express ("PCIe")), memory buses, or other types of interface buses. In at least one embodiment processor(s) 2902 include an integrated memory controller 2916 and a platform controller hub 2930. In at least one embodiment, memory controller 2916 facilitates communication between a memory device and other components of processing system 2900, while platform controller hub ("PCH") 2930 provides connections to Input/Output ("I/O") devices via a local I/O bus.

In at least one embodiment, memory device 2920 can be a dynamic random access memory ("DRAM") device, a static random access memory ("SRAM") device, flash memory device, phase-change memory device, or some other memory device having suitable performance to serve as processor memory. In at least one embodiment memory device 2920 can operate as system memory for processing system 2900, to store data 2922 and instructions 2921 for use when one or more processors 2902 executes an application or process. In at least one embodiment, memory controller 2916 also couples with an optional external graphics processor 2912, which may communicate with one or more graphics processors 2908 in processors 2902 to perform graphics and media operations. In at least one embodiment, a display device 2911 can connect to processor(s) 2902. In at least one embodiment display device 2911 can include one or more of an internal display device, as in a mobile electronic device or a laptop device or an external display device attached via a display interface (e.g., DisplayPort, etc.). In at least one embodiment, display device 2911 can include a head mounted display ("HMD") such as a stereoscopic display device for use in virtual reality ("VR") applications or augmented reality ("AR") applications.

In at least one embodiment, platform controller hub 2930 enables peripherals to connect to memory device 2920 and processor 2902 via a high-speed I/O bus. In at least one embodiment, I/O peripherals include, but are not limited to, an audio controller 2946, a network controller 2934, a firmware interface 2928, a wireless transceiver 2926, touch sensors 2925, a data storage device 2924 (e.g., hard disk drive, flash memory, etc.). In at least one embodiment, data storage device 2924 can connect via a storage interface (e.g., SATA) or via a peripheral bus, such as PCI, or PCIe. In at least one embodiment, touch sensors 2925 can include touch screen sensors, pressure sensors, or fingerprint sensors. In at least one embodiment, wireless transceiver 2926 can be a Wi-Fi transceiver, a Bluetooth transceiver, or a mobile network transceiver such as a 3G, 4G, or Long Term Evolution ("LTE") transceiver. In at least one embodiment, firmware interface 2928 enables communication with system firmware, and can be, for example, a unified extensible firmware interface ("UEFI"). In at least one embodiment, network controller 2934 can enable a network connection to a wired network. In at least one embodiment, a high-performance network controller (not shown) couples with interface bus 2910. In at least one embodiment, audio controller 2946 is a multi-channel high definition audio controller. In at least one embodiment, processing system 2900 includes an optional legacy I/O controller 2940 for coupling legacy (e.g., Personal System 2 ("PS/2")) devices to processing system 2900. In at least one embodiment, platform controller hub 2930 can also connect to one or more Universal Serial Bus ("USB") controllers 2942 connect input devices, such as keyboard and mouse 2943 combinations, a camera 2944, or other USB input devices.

In at least one embodiment, an instance of memory controller 2916 and platform controller hub 2930 may be integrated into a discreet external graphics processor, such as external graphics processor 2912. In at least one embodiment, platform controller hub 2930 and/or memory controller 2916 may be external to one or more processor(s) 2902. For example, in at least one embodiment, processing system 2900 can include an external memory controller 2916 and platform controller hub 2930, which may be configured as a memory controller hub and peripheral controller hub within a system chipset that is in communication with processor(s) 2902.

Figure 30:
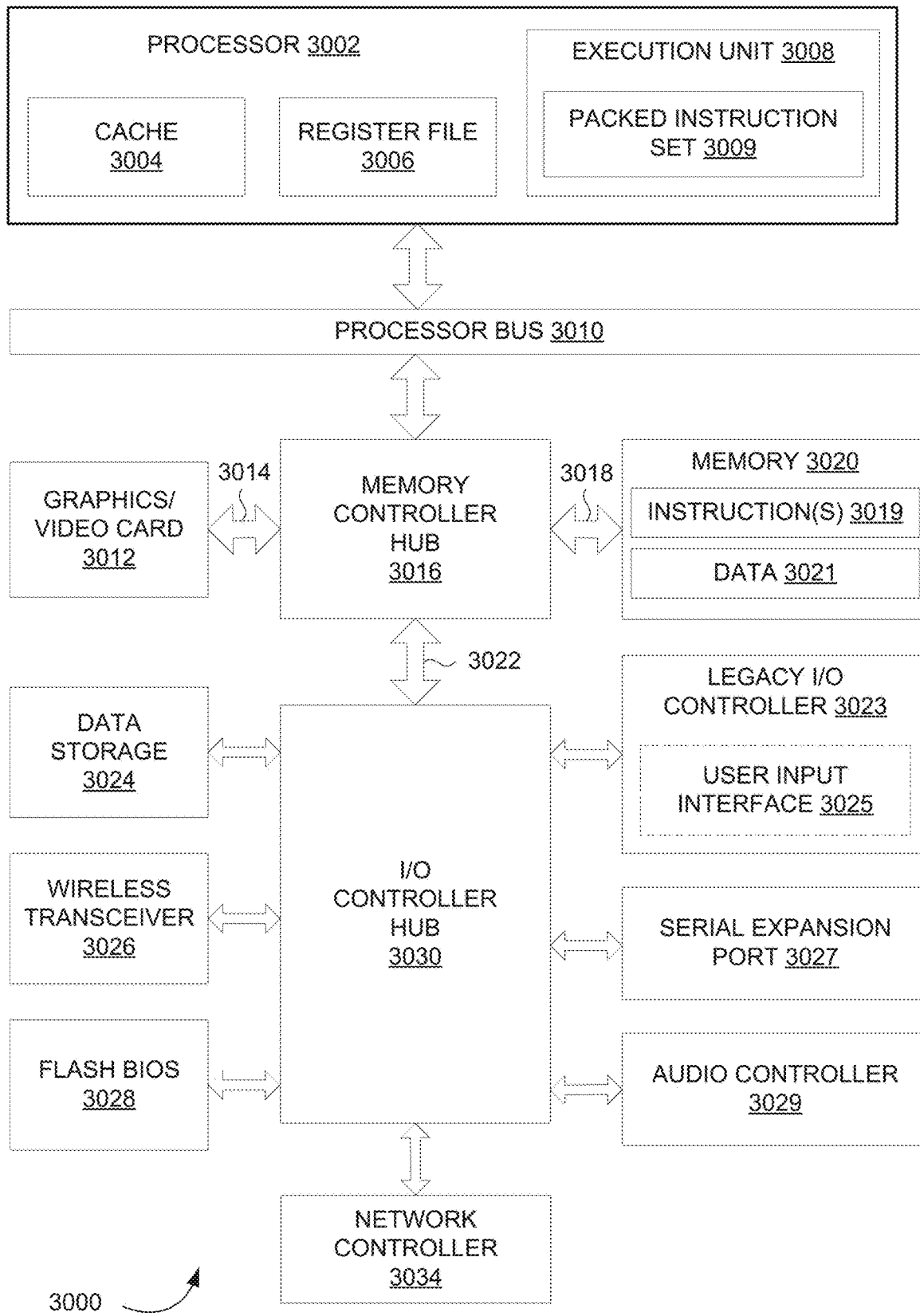
FIG. 30 illustrates a computer system, in accordance with at least one embodiment.

FIG. 30 illustrates a computer system 3000, in accordance with at least one embodiment. In at least one embodiment, computer system 3000 may be a system with interconnected devices and components, an SOC, or some combination. In at least on embodiment, computer system 3000 is formed with a processor 3002 that may include execution units to execute an instruction. In at least one embodiment, computer system 3000 may include, without limitation, a component, such as processor 3002 to employ execution units including logic to perform algorithms for processing data. In at least one embodiment, computer system 3000 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 3000 may execute a version of WINDOWS' operating system available from Microsoft Corporation of Redmond, Wash., although other operating systems (UNIX and Linux for example), embedded software, and/or graphical user interfaces, may also be used.

In at least one embodiment, computer system 3000 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions.

In at least one embodiment, computer system 3000 may include, without limitation, processor 3002 that may include, without limitation, one or more execution units 3008 that may be configured to execute a Compute Unified Device Architecture ("CUDA") (CUDA® is developed by NVIDIA Corporation of Santa Clara, CA) program. In at least one embodiment, a CUDA program is at least a portion of a software application written in a CUDA programming language. In at least one embodiment, computer system 3000 is a single processor desktop or server system. In at least one embodiment, computer system 3000 may be a multiprocessor system. In at least one embodiment, processor 3002 may include, without limitation, a CISC microprocessor, a RISC microprocessor, a VLIW microprocessor, a processor implementing a combination of instruction sets, or any other processor device, such as a digital signal processor, for example. In at least one embodiment, processor 3002 may be coupled to a processor bus 3010 that may transmit data signals between processor 3002 and other components in computer system 3000.

In at least one embodiment, processor 3002 may include, without limitation, a Level 1 ("L1") internal cache memory ("cache") 3004. In at least one embodiment, processor 3002 may have a single internal cache or multiple levels of internal cache. In at least one embodiment, cache memory may reside external to processor 3002. In at least one embodiment, processor 3002 may also include a combination of both internal and external caches. In at least one embodiment, a register file 3006 may store different types of data in various registers including, without limitation, integer registers, floating point registers, status registers, and instruction pointer register.

In at least one embodiment, execution unit 3008, including, without limitation, logic to perform integer and floating point operations, also resides in processor 3002. Processor 3002 may also include a microcode ("ucode") read only memory ("ROM") that stores microcode for certain macro instructions. In at least one embodiment, execution unit 3008 may include logic to handle a packed instruction set 3009. In at least one embodiment, by including packed instruction set 3009 in an instruction set of a general-purpose processor 3002, along with associated circuitry to execute instructions, operations used by many multimedia applications may be performed using packed data in a general-purpose processor 3002. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, execution unit 3008 may also be used in microcontrollers, embedded processors, graphics devices, DSPs, and other types of logic circuits. In at least one embodiment, computer system 3000 may include, without limitation, a memory 3020. In at least one embodiment, memory 3020 may be implemented as a DRAM device, an SRAM device, flash memory device, or other memory device. Memory 3020 may store instruction(s) 3019 and/or data 3021 represented by data signals that may be executed by processor 3002.

In at least one embodiment, a system logic chip may be coupled to processor bus 3010 and memory 3020. In at least one embodiment, a system logic chip may include, without limitation, a memory controller hub ("MCH") 3016, and processor 3002 may communicate with MCH 3016 via processor bus 3010. In at least one embodiment, MCH 3016 may provide a high bandwidth memory path 3018 to memory 3020 for instruction and data storage and for storage of graphics commands, data and textures. In at least one embodiment, MCH 3016 may direct data signals between processor 3002, memory 3020, and other components in computer system 3000 and to bridge data signals between processor bus 3010, memory 3020, and a system I/O 3022. In at least one embodiment, system logic chip may provide a graphics port for coupling to a graphics controller. In at least one embodiment, MCH 3016 may be coupled to memory 3020 through high bandwidth memory path 3018 and graphics/video card 3012 may be coupled to MCH 3016 through an Accelerated Graphics Port ("AGP") interconnect 3014.

In at least one embodiment, computer system 3000 may use system I/O 3022 that is a proprietary hub interface bus to couple MCH 3016 to I/O controller hub ("ICH") 3030. In at least one embodiment, ICH 3030 may provide direct connections to some I/O devices via a local I/O bus. In at least one embodiment, local I/O bus may include, without limitation, a high-speed I/O bus for connecting peripherals to memory 3020, a chipset, and processor 3002. Examples may include, without limitation, an audio controller 3029, a firmware hub ("flash BIOS") 3028, a wireless transceiver 3026, a data storage 3024, a legacy I/O controller 3023 containing a user input interface 3025 and a keyboard interface, a serial expansion port 3027, such as a USB, and a network controller 3034. Data storage 3024 may include a hard disk drive, a floppy disk drive, a CD-ROM device, a flash memory device, or other mass storage device.

In at least one embodiment, FIG. 30 illustrates a system, which includes interconnected hardware devices or "chips." In at least one embodiment, FIG. 30 may illustrate an exemplary SoC. In at least one embodiment, devices illustrated in FIG. 30 may be interconnected with proprietary interconnects, standardized interconnects (e.g., PCIe), or some combination thereof. In at least one embodiment, one or more components of system 3000 are interconnected using compute express link ("CXL") interconnects.

Figure 31:
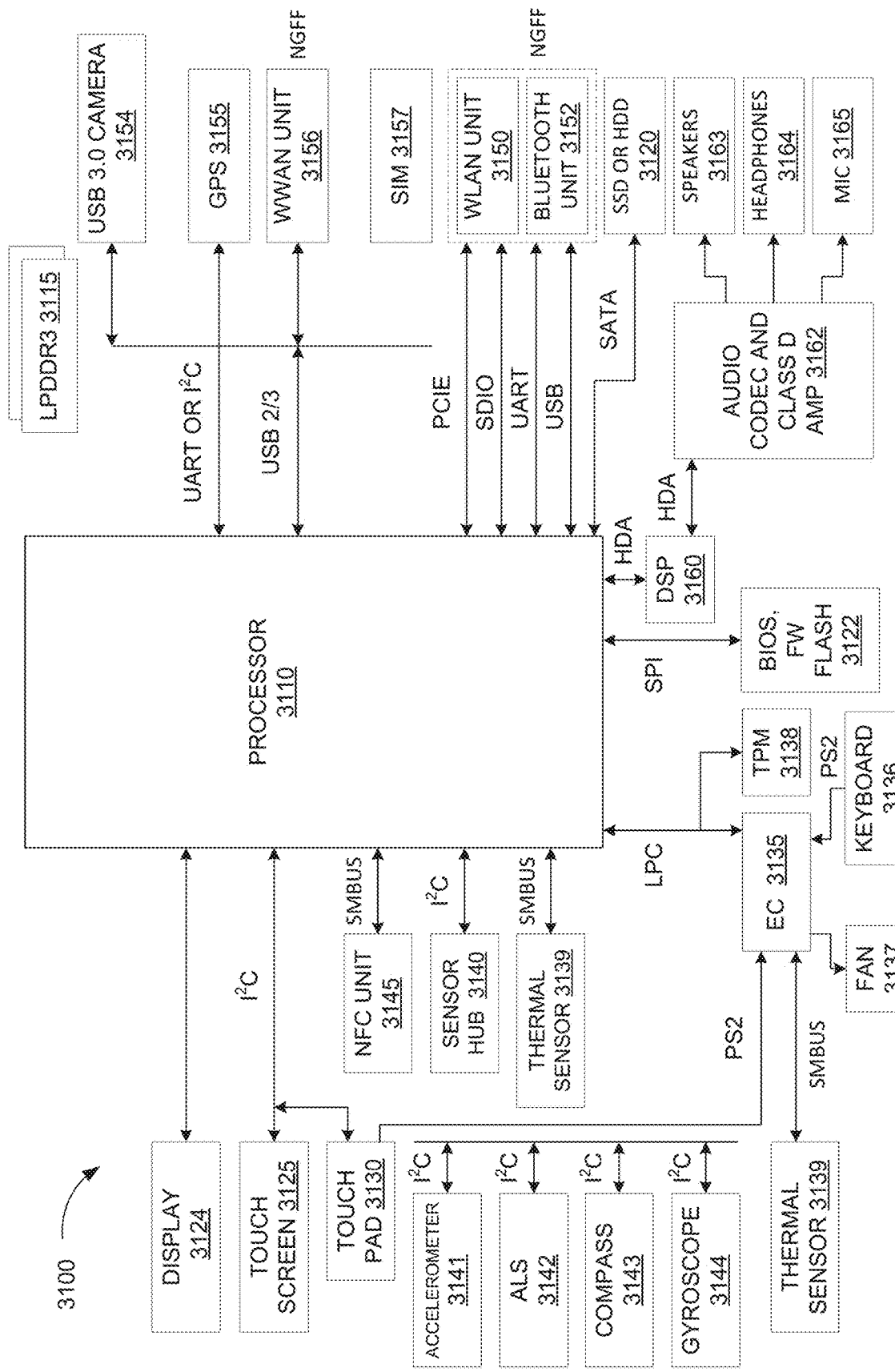
FIG. 31 illustrates a system, in accordance with at least one embodiment.

FIG. 31 illustrates a system 3100, in accordance with at least one embodiment. In at least one embodiment, system 3100 is an electronic device that utilizes a processor 3110. In at least one embodiment, system 3100 may be, for example and without limitation, a notebook, a tower server, a rack server, a blade server, a laptop, a desktop, a tablet, a mobile device, a phone, an embedded computer, or any other suitable electronic device.

In at least one embodiment, system 3100 may include, without limitation, processor 3110 communicatively coupled to any suitable number or kind of components, peripherals, modules, or devices. In at least one embodiment, processor 3110 is coupled using a bus or interface, such as an I$^2$C bus, a System Management Bus ("SMBus"), a Low Pin Count ("LPC") bus, a Serial Peripheral Interface ("SPI"), a High Definition Audio ("HDA") bus, a Serial Advance Technology Attachment ("SATA") bus, a USB (versions 1, 2, 3), or a Universal Asynchronous Receiver/Transmitter ("UART") bus. In at least one embodiment, FIG. 31 illustrates a system which includes interconnected hardware devices or "chips." In at least one embodiment, FIG. 31 may illustrate an exemplary SoC. In at least one embodiment, devices illustrated in FIG. 31 may be interconnected with proprietary interconnects, standardized interconnects (e.g., PCIe) or some combination thereof. In at least one embodiment, one or more components of FIG. 31 are interconnected using CXL interconnects.

In at least one embodiment, FIG. 31 may include a display 3124, a touch screen 3125, a touch pad 3130, a Near Field Communications unit ("NFC") 3145, a sensor hub 3140, a thermal sensor 3146, an Express Chipset ("EC") 3135, a Trusted Platform Module ("TPM") 3138, BIOS/firmware/flash memory ("BIOS, FW Flash") 3122, a DSP 3160, a Solid State Disk ("SSD") or Hard Disk Drive ("HDD") 3120, a wireless local area network unit ("WLAN") 3150, a Bluetooth unit 3152, a Wireless Wide Area Network unit ("WWAN") 3156, a Global Positioning System ("GPS") 3155, a camera ("USB 3.0 camera") 3154 such as a USB 3.0 camera, or a Low Power Double Data Rate ("LPDDR") memory unit ("LPDDR3") 3115 implemented in, for example, LPDDR3 standard. These components may each be implemented in any suitable manner.

In at least one embodiment, other components may be communicatively coupled to processor 3110 through components discussed above. In at least one embodiment, an accelerometer 3141, an Ambient Light Sensor ("ALS") 3142, a compass 3143, and a gyroscope 3144 may be communicatively coupled to sensor hub 3140. In at least one embodiment, a thermal sensor 3139, a fan 3137, a keyboard 3146, and a touch pad 3130 may be communicatively coupled to EC 3135. In at least one embodiment, a speaker 3163, a headphones 3164, and a microphone ("mic") 3165 may be communicatively coupled to an audio unit ("audio codec and class d amp") 3164, which may in turn be communicatively coupled to DSP 3160. In at least one embodiment, audio unit 3164 may include, for example and without limitation, an audio coder/decoder ("codec") and a class D amplifier. In at least one embodiment, a SIM card ("SIM") 3157 may be communicatively coupled to WWAN unit 3156. In at least one embodiment, components such as WLAN unit 3150 and Bluetooth unit 3152, as well as WWAN unit 3156 may be implemented in a Next Generation Form Factor ("NGFF").

Figure 32:
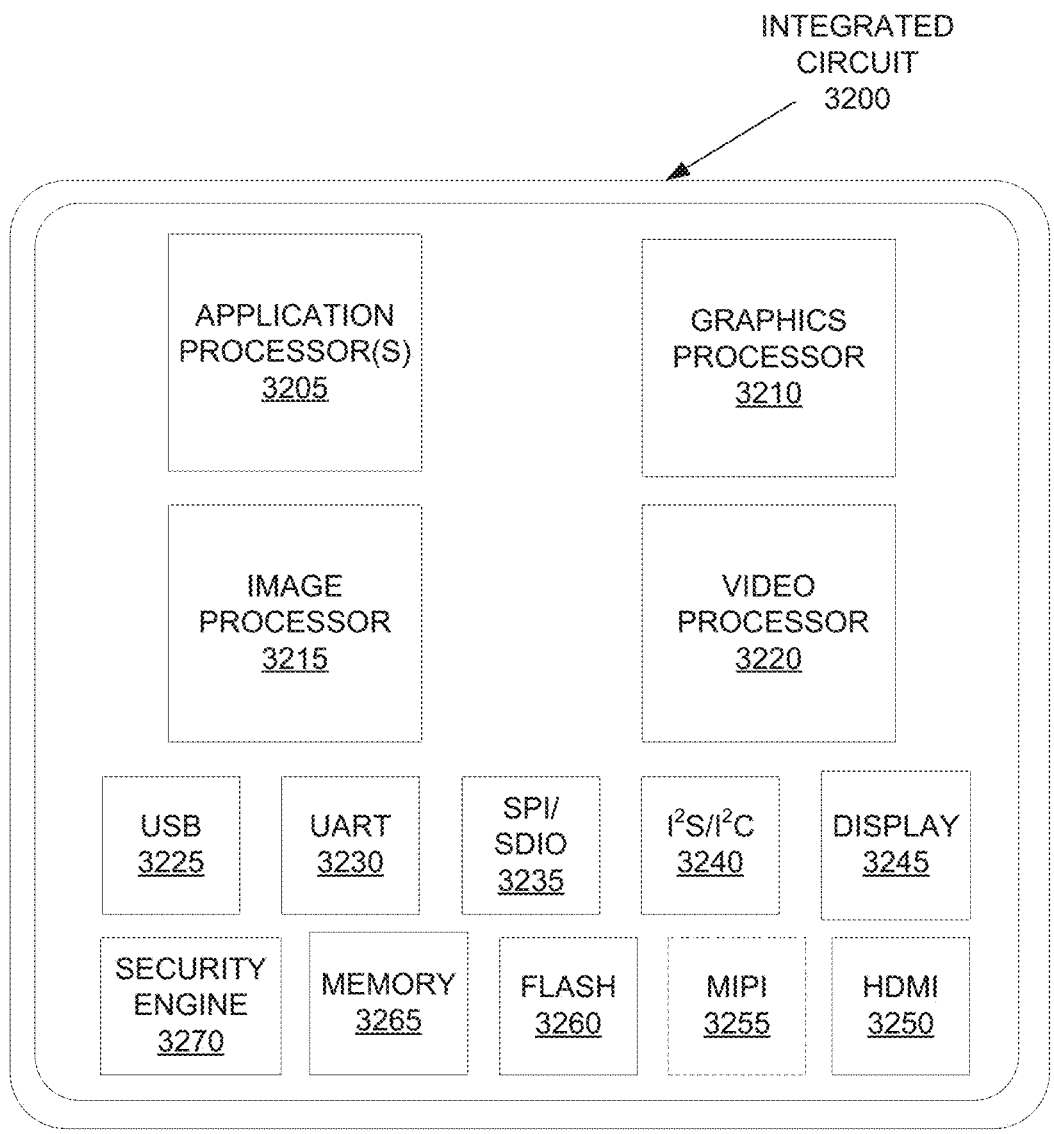
FIG. 32 illustrates an exemplary integrated circuit, in accordance with at least one embodiment.

FIG. 32 illustrates an exemplary integrated circuit 3200, in accordance with at least one embodiment. In at least one embodiment, exemplary integrated circuit 3200 is an SoC that may be fabricated using one or more IP cores. In at least one embodiment, integrated circuit 3200 includes one or more application processor(s) 3205 (e.g., CPUs), at least one graphics processor 3210, and may additionally include an image processor 3215 and/or a video processor 3220, any of which may be a modular IP core. In at least one embodiment, integrated circuit 3200 includes peripheral or bus logic including a USB controller 3225, a UART controller 3230, an SPI/SDIO controller 3235, and an I$^2$S/I$^2$C controller 3240. In at least one embodiment, integrated circuit 3200 can include a display device 3245 coupled to one or more of a high-definition multimedia interface ("HDMI") controller 3250 and a mobile industry processor interface ("MIPI") display interface 3255. In at least one embodiment, storage may be provided by a flash memory subsystem 3260 including flash memory and a flash memory controller. In at least one embodiment, a memory interface may be provided via a memory controller 3265 for access to SDRAM or SRAM memory devices. In at least one embodiment, some integrated circuits additionally include an embedded security engine 3270.

Figure 33:
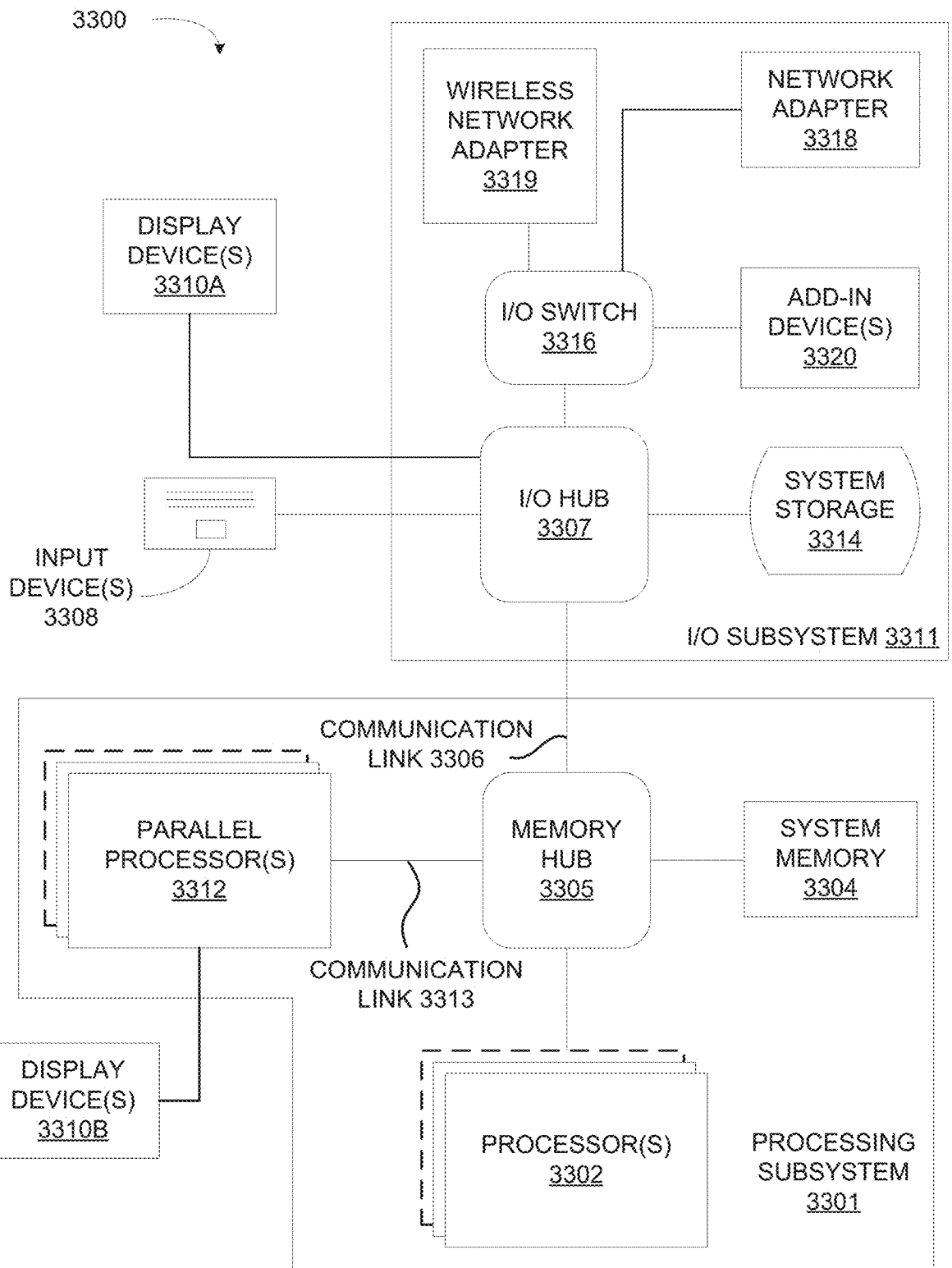
FIG. 33 illustrates a computing system, according to at least one embodiment.

FIG. 33 illustrates a computing system 3300, according to at least one embodiment; In at least one embodiment, computing system 3300 includes a processing subsystem 3301 having one or more processor(s) 3302 and a system memory 3304 communicating via an interconnection path that may include a memory hub 3305. In at least one embodiment, memory hub 3305 may be a separate component within a chipset component or may be integrated within one or more processor(s) 3302. In at least one embodiment, memory hub 3305 couples with an I/O subsystem 3311 via a communication link 3306. In at least one embodiment, I/O subsystem 3311 includes an I/O hub 3307 that can enable computing system 3300 to receive input from one or more input device(s) 3308. In at least one embodiment, I/O hub 3307 can enable a display controller, which may be included in one or more processor(s) 3302, to provide outputs to one or more display device(s) 3310A. In at least one embodiment, one or more display device(s) 3310A coupled with I/O hub 3307 can include a local, internal, or embedded display device.

In at least one embodiment, processing subsystem 3301 includes one or more parallel processor(s) 3312 coupled to memory hub 3305 via a bus or other communication link 3313. In at least one embodiment, communication link 3313 may be one of any number of standards based communication link technologies or protocols, such as, but not limited to PCIe, or may be a vendor specific communications interface or communications fabric. In at least one embodiment, one or more parallel processor(s) 3312 form a computationally focused parallel or vector processing system that can include a large number of processing cores and/or processing clusters, such as a many integrated core processor. In at least one embodiment, one or more parallel processor(s) 3312 form a graphics processing subsystem that can output pixels to one of one or more display device(s) 3310A coupled via I/O Hub 3307. In at least one embodiment, one or more parallel processor(s) 3312 can also include a display controller and display interface (not shown) to enable a direct connection to one or more display device(s) 3310B.

In at least one embodiment, a system storage unit 3314 can connect to I/O hub 3307 to provide a storage mechanism for computing system 3300. In at least one embodiment, an I/O switch 3316 can be used to provide an interface mechanism to enable connections between I/O hub 3307 and other components, such as a network adapter 3318 and/or wireless network adapter 3319 that may be integrated into a platform, and various other devices that can be added via one or more add-in device(s) 3320. In at least one embodiment, network adapter 3318 can be an Ethernet adapter or another wired network adapter. In at least one embodiment, wireless network adapter 3319 can include one or more of a Wi-Fi, Bluetooth, NFC, or other network device that includes one or more wireless radios.

In at least one embodiment, computing system 3300 can include other components not explicitly shown, including USB or other port connections, optical storage drives, video capture devices, and/or variations thereof, that may also be connected to I/O hub 3307. In at least one embodiment, communication paths interconnecting various components in FIG. 33 may be implemented using any suitable protocols, such as PCI based protocols (e.g., PCIe), or other bus or point-to-point communication interfaces and/or protocol (s), such as NVLink high-speed interconnect, or interconnect protocols.

In at least one embodiment, one or more parallel processor(s) 3312 incorporate circuitry optimized for graphics and video processing, including, for example, video output circuitry, and constitutes a graphics processing unit ("GPU"). In at least one embodiment, one or more parallel processor (s) 3312 incorporate circuitry optimized for general purpose processing. In at least embodiment, components of computing system 3300 may be integrated with one or more other system elements on a single integrated circuit. For example, in at least one embodiment, one or more parallel processor (s) 3312, memory hub 3305, processor(s) 3302, and I/O hub 3307 can be integrated into a SoC integrated circuit. In at least one embodiment, components of computing system 3300 can be integrated into a single package to form a system in package ("SIP") configuration. In at least one embodiment, at least a portion of components of computing system 3300 can be integrated into a multi-chip module ("MCM"), which can be interconnected with other multi-chip modules into a modular computing system. In at least one embodiment, I/O subsystem 3311 and display devices 3310B are omitted from computing system 3300.

Processing Systems

The following figures set forth, without limitation, exemplary processing systems that can be used to implement at least one embodiment.

FIG. 34 illustrates an accelerated processing unit ("APU") 3400, in accordance with at least one embodiment. In at least one embodiment, APU 3400 is developed by AMD Corporation of Santa Clara, CA. In at least one embodiment, APU 3400 can be configured to execute an application program, such as a CUDA program. In at least one embodiment, APU 3400 includes, without limitation, a core complex 3410, a graphics complex 3440, fabric 3460, I/O interfaces 3470, memory controllers 3480, a display controller 3492, and a multimedia engine 3494. In at least one embodiment, APU 3400 may include, without limitation, any number of core complexes 3410, any number of graphics complexes 3440, any number of display controllers 3492, and any number of multimedia engines 3494 in any combination. For explanatory purposes, multiple instances of like objects are denoted herein with reference numbers identifying an object and parenthetical numbers identifying an instance where needed.

In at least one embodiment, core complex 3410 is a CPU, graphics complex 3440 is a GPU, and APU 3400 is a processing unit that integrates, without limitation, 3410 and 3440 onto a single chip. In at least one embodiment, some tasks may be assigned to core complex 3410 and other tasks may be assigned to graphics complex 3440. In at least one embodiment, core complex 3410 is configured to execute main control software associated with APU 3400, such as an operating system. In at least one embodiment, core complex 3410 is a master processor of APU 3400, controlling and coordinating operations of other processors. In at least one embodiment, core complex 3410 issues commands that control an operation of graphics complex 3440. In at least one embodiment, core complex 3410 can be configured to execute host executable code derived from CUDA source code, and graphics complex 3440 can be configured to execute device executable code derived from CUDA source code.

In at least one embodiment, core complex 3410 includes, without limitation, cores 3420(1)-3420(4) and an L3 cache 3430. In at least one embodiment, core complex 3410 may include, without limitation, any number of cores 3420 and any number and type of caches in any combination. In at least one embodiment, cores 3420 are configured to execute instructions of a particular instruction set architecture ("ISA"). In at least one embodiment, each core 3420 is a CPU core.

In at least one embodiment, each core 3420 includes, without limitation, a fetch/decode unit 3422, an integer execution engine 3424, a floating point execution engine 3426, and an L2 cache 3428. In at least one embodiment, fetch/decode unit 3422 fetches instructions, decodes such instructions, generates micro-operations, and dispatches separate micro-instructions to integer execution engine 3424 and floating point execution engine 3426. In at least one embodiment, fetch/decode unit 3422 can concurrently dispatch one micro-instruction to integer execution engine 3424 and another micro-instruction to floating point execution engine 3426. In at least one embodiment, integer execution engine 3424 executes, without limitation, integer and memory operations. In at least one embodiment, floating point engine 3426 executes, without limitation, floating point and vector operations. In at least one embodiment, fetch-decode unit 3422 dispatches micro-instructions to a single execution engine that replaces both integer execution engine 3424 and floating point execution engine 3426.

In at least one embodiment, each core 3420(i), where i is an integer representing a particular instance of core 3420, may access L2 cache 3428(i) included in core 3420(i). In at least one embodiment, each core 3420 included in core complex 3410(j), where j is an integer representing a particular instance of core complex 3410, is connected to other cores 3420 included in core complex 3410(j) via L3 cache 3430(j) included in core complex 3410(j). In at least one embodiment, cores 3420 included in core complex 3410(j), where j is an integer representing a particular instance of core complex 3410, can access all of L3 cache 3430(j) included in core complex 3410(j). In at least one embodiment, L3 cache 3430 may include, without limitation, any number of slices.

In at least one embodiment, graphics complex 3440 can be configured to perform compute operations in a highly-parallel fashion. In at least one embodiment, graphics complex 3440 is configured to execute graphics pipeline operations such as draw commands, pixel operations, geometric computations, and other operations associated with rendering an image to a display. In at least one embodiment, graphics complex 3440 is configured to execute operations unrelated to graphics. In at least one embodiment, graphics complex 3440 is configured to execute both operations related to graphics and operations unrelated to graphics.

In at least one embodiment, graphics complex 3440 includes, without limitation, any number of compute units 3450 and an L2 cache 3442. In at least one embodiment, compute units 3450 share L2 cache 3442. In at least one embodiment, L2 cache 3442 is partitioned. In at least one embodiment, graphics complex 3440 includes, without limitation, any number of compute units 3450 and any number (including zero) and type of caches. In at least one embodiment, graphics complex 3440 includes, without limitation, any amount of dedicated graphics hardware.

In at least one embodiment, each compute unit 3450 includes, without limitation, any number of SIMD units 3452 and a shared memory 3454. In at least one embodiment, each SIMD unit 3452 implements a SIMD architecture and is configured to perform operations in parallel. In at least one embodiment, each compute unit 3450 may execute any number of thread blocks, but each thread block executes on a single compute unit 3450. In at least one embodiment, a thread block includes, without limitation, any number of threads of execution. In at least one embodiment, a workgroup is a thread block. In at least one embodiment, each SIMD unit 3452 executes a different warp. In at least one embodiment, a warp is a group of threads (e.g., 16 threads), where each thread in a warp belongs to a single thread block and is configured to process a different set of data based on a single set of instructions. In at least one embodiment, predication can be used to disable one or more threads in a warp. In at least one embodiment, a lane is a thread. In at least one embodiment, a work item is a thread. In at least one embodiment, a wavefront is a warp. In at least one embodiment, different wavefronts in a thread block may synchronize together and communicate via shared memory 3454.

In at least one embodiment, fabric 3460 is a system interconnect that facilitates data and control transmissions across core complex 3410, graphics complex 3440, I/O interfaces 3470, memory controllers 3480, display controller 3492, and multimedia engine 3494. In at least one embodiment, APU 3400 may include, without limitation, any amount and type of system interconnect in addition to or instead of fabric 3460 that facilitates data and control transmissions across any number and type of directly or indirectly linked components that may be internal or external to APU 3400. In at least one embodiment, I/O interfaces 3470 are representative of any number and type of I/O interfaces (e.g., PCI, PCI-Extended ("PCI-X"), PCIe, gigabit Ethernet ("GBE"), USB, etc.). In at least one embodiment, various types of peripheral devices are coupled to I/O interfaces 3470. In at least one embodiment, peripheral devices that are coupled to I/O interfaces 3470 may include, without limitation, keyboards, mice, printers, scanners, joysticks or other types of game controllers, media recording devices, external storage devices, network interface cards, and so forth.

In at least one embodiment, display controller AMD92 displays images on one or more display device(s), such as a liquid crystal display ("LCD") device. In at least one embodiment, multimedia engine 3494 includes, without limitation, any amount and type of circuitry that is related to multimedia, such as a video decoder, a video encoder, an image signal processor, etc. In at least one embodiment, memory controllers 3480 facilitate data transfers between APU 3400 and a unified system memory 3490. In at least one embodiment, core complex 3410 and graphics complex 3440 share unified system memory 3490.

In at least one embodiment, APU 3400 implements a memory subsystem that includes, without limitation, any amount and type of memory controllers 3480 and memory devices (e.g., shared memory 3454) that may be dedicated to one component or shared among multiple components. In at least one embodiment, APU 3400 implements a cache subsystem that includes, without limitation, one or more cache memories (e.g., L2 caches 3528, L3 cache 3430, and L2 cache 3442) that may each be private to or shared between any number of components (e.g., cores 3420, core complex 3410, SIMD units 3452, compute units 3450, and graphics complex 3440).

FIG. 35 illustrates a CPU 3500, in accordance with at least one embodiment. In at least one embodiment, CPU 3500 is developed by AMD Corporation of Santa Clara, CA. In at least one embodiment, CPU 3500 can be configured to execute an application program. In at least one embodiment, CPU 3500 is configured to execute main control software, such as an operating system. In at least one embodiment, CPU 3500 issues commands that control an operation of an external GPU (not shown). In at least one embodiment, CPU 3500 can be configured to execute host executable code derived from CUDA source code, and an external GPU can be configured to execute device executable code derived from such CUDA source code. In at least one embodiment, CPU 3500 includes, without limitation, any number of core complexes 3510, fabric 3560, I/O interfaces 3570, and memory controllers 3580.

In at least one embodiment, core complex 3510 includes, without limitation, cores 3520(1)-3520(4) and an L3 cache 3530. In at least one embodiment, core complex 3510 may include, without limitation, any number of cores 3520 and any number and type of caches in any combination. In at least one embodiment, cores 3520 are configured to execute instructions of a particular ISA. In at least one embodiment, each core 3520 is a CPU core.

In at least one embodiment, each core 3520 includes, without limitation, a fetch/decode unit 3522, an integer execution engine 3524, a floating point execution engine 3526, and an L2 cache 3528. In at least one embodiment, fetch/decode unit 3522 fetches instructions, decodes such instructions, generates micro-operations, and dispatches separate micro-instructions to integer execution engine 3524 and floating point execution engine 3526. In at least one embodiment, fetch/decode unit 3522 can concurrently dispatch one micro-instruction to integer execution engine 3524 and another micro-instruction to floating point execution engine 3526. In at least one embodiment, integer execution engine 3524 executes, without limitation, integer and memory operations. In at least one embodiment, floating point engine 3526 executes, without limitation, floating point and vector operations. In at least one embodiment, fetch-decode unit 3522 dispatches micro-instructions to a single execution engine that replaces both integer execution engine 3524 and floating point execution engine 3526.

In at least one embodiment, each core 3520(*i*), where i is an integer representing a particular instance of core 3520, may access L2 cache 3528(*i*) included in core 3520(*i*). In at least one embodiment, each core 3520 included in core complex 3510(*j*), where j is an integer representing a particular instance of core complex 3510, is connected to other cores 3520 in core complex 3510(*j*) via L3 cache 3530(*j*) included in core complex 3510(*j*). In at least one embodiment, cores 3520 included in core complex 3510(*j*), where j is an integer representing a particular instance of core complex 3510, can access all of L3 cache 3530(*j*) included in core complex 3510(*j*). In at least one embodiment, L3 cache 3530 may include, without limitation, any number of slices.

In at least one embodiment, fabric 3560 is a system interconnect that facilitates data and control transmissions across core complexes 3510(1)-3510(N) (where N is an integer greater than zero), I/O interfaces 3570, and memory controllers 3580. In at least one embodiment, CPU 3500 may include, without limitation, any amount and type of system interconnect in addition to or instead of fabric 3560 that facilitates data and control transmissions across any number and type of directly or indirectly linked components that may be internal or external to CPU 3500. In at least one embodiment, I/O interfaces 3570 are representative of any number and type of I/O interfaces (e.g., PCI, PCI-X, PCIe, GBE, USB, etc.). In at least one embodiment, various types of peripheral devices are coupled to I/O interfaces 3570 In at least one embodiment, peripheral devices that are coupled to I/O interfaces 3570 may include, without limitation, displays, keyboards, mice, printers, scanners, joysticks or other types of game controllers, media recording devices, external storage devices, network interface cards, and so forth.

In at least one embodiment, memory controllers 3580 facilitate data transfers between CPU 3500 and a system memory 3590. In at least one embodiment, core complex 3510 and graphics complex 3540 share system memory 3590. In at least one embodiment, CPU 3500 implements a memory subsystem that includes, without limitation, any amount and type of memory controllers 3580 and memory devices that may be dedicated to one component or shared among multiple components. In at least one embodiment, CPU 3500 implements a cache subsystem that includes, without limitation, one or more cache memories (e.g., L2 caches 3528 and L3 caches 3530) that may each be private to or shared between any number of components (e.g., cores 3520 and core complexes 3510).

Figure 36:
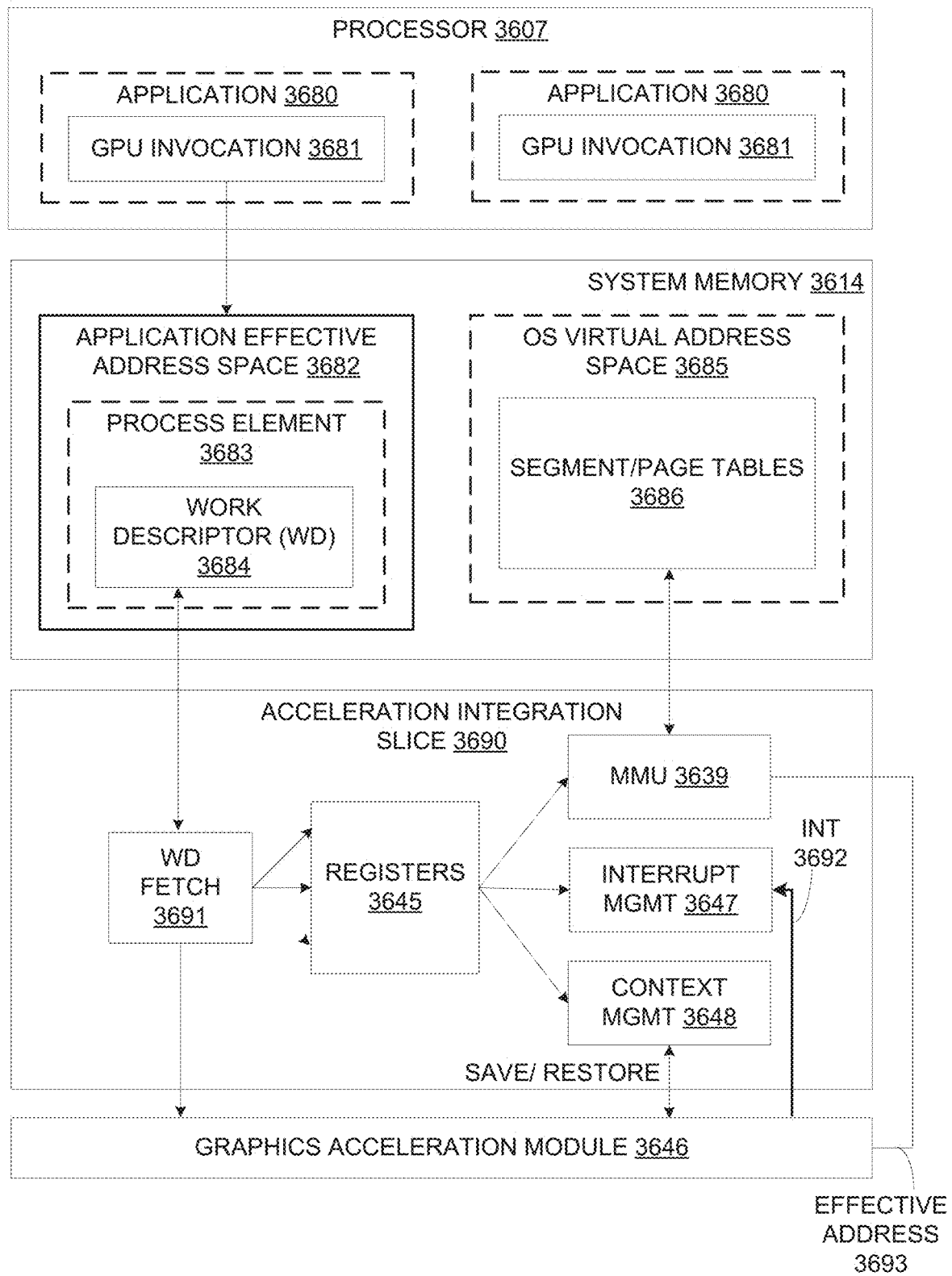
FIG. 36 illustrates an exemplary accelerator integration slice, in accordance with at least one embodiment.

FIG. 36 illustrates an exemplary accelerator integration slice 3690, in accordance with at least one embodiment. As used herein, a "slice" includes a specified portion of processing resources of an accelerator integration circuit. In at least one embodiment, an accelerator integration circuit provides cache management, memory access, context management, and interrupt management services on behalf of multiple graphics processing engines included in a graphics acceleration module. Graphics processing engines may each include a separate GPU. Alternatively, graphics processing engines may include different types of graphics processing engines within a GPU such as graphics execution units, media processing engines (e.g., video encoders/decoders), samplers, and blit engines. In at least one embodiment, a graphics acceleration module may be a GPU with multiple graphics processing engines. In at least one embodiment, graphics processing engines may be individual GPUs integrated on a common package, line card, or chip.

An application effective address space 3682 within system memory 3614 stores process elements 3683. In one embodiment, process elements 3683 are stored in response to GPU invocations 3681 from applications 3680 executed on processor 3607. A process element 3683 contains process state for corresponding application 3680. A work descriptor ("WD") 3684 contained in process element 3683 can be a single job requested by an application or may contain a pointer to a queue of jobs. In at least one embodiment, WD 3684 is a pointer to a job request queue in application effective address space 3682.

Graphics acceleration module 3646 and/or individual graphics processing engines can be shared by all or a subset of processes in a system. In at least one embodiment, an infrastructure for setting up process state and sending WD 3684 to graphics acceleration module 3646 to start a job in a virtualized environment may be included.

In at least one embodiment, a dedicated-process programming model is implementation-specific. In this model, a single process owns graphics acceleration module 3646 or an individual graphics processing engine. Because graphics acceleration module 3646 is owned by a single process, a hypervisor initializes an accelerator integration circuit for an owning partition and an operating system initializes accelerator integration circuit for an owning process when graphics acceleration module 3646 is assigned.

In operation, a WD fetch unit 3691 in accelerator integration slice 3690 fetches next WD 3684 which includes an indication of work to be done by one or more graphics processing engines of graphics acceleration module 3646. Data from WD 3684 may be stored in registers 3645 and used by a memory management unit ("MMU") 3639, interrupt management circuit 3647 and/or context management circuit 3648 as illustrated. For example, one embodiment of MMU 3639 includes segment/page walk circuitry for accessing segment/page tables 3686 within OS virtual address space 3685. Interrupt management circuit 3647 may process interrupt events ("INT") 3692 received from graphics acceleration module 3646. When performing graphics operations, an effective address 3693 generated by a graphics processing engine is translated to a real address by MMU 3639.

In one embodiment, a same set of registers 3645 are duplicated for each graphics processing engine and/or graphics acceleration module 3646 and may be initialized by a hypervisor or operating system. Each of these duplicated registers may be included in accelerator integration slice 3690. Exemplary registers that may be initialized by a hypervisor are shown in Table 1.

TABLE 1

Hypervisor Initialized Registers

1. Slice Control Register
2. Real Address (RA) Scheduled Processes Area Pointer
3. Authority Mask Override Register
4. Interrupt Vector Table Entry Offset
5. Interrupt Vector Table Entry Limit
6. State Register
7. Logical Partition ID
8. Real address (RA) Hypervisor Accelerator Utilization Record Pointer
9. Storage Description Register Exemplary registers that may be initialized by an operating system are shown in Table 2.

TABLE 2

Operating System Initialized Registers

1. Process and Thread Identification
2. Effective Address (EA) Context Save/Restore Pointer
3. Virtual Address (VA) Accelerator Utilization Record Pointer
4. Virtual Address (VA) Storage Segment Table Pointer
5. Authority Mask
6. Work descriptor In one embodiment, each WD 3684 is specific to a particular graphics acceleration module 3646 and/or a particular graphics processing engine. It contains all information required by a graphics processing engine to do work or it can be a pointer to a memory location where an application has set up a command queue of work to be completed.

FIGS. 37A-37B illustrate exemplary graphics processors, in accordance with at least one embodiment. In at least one embodiment, any of the exemplary graphics processors may be fabricated using one or more IP cores. In addition to what is illustrated, other logic and circuits may be included in at least one embodiment, including additional graphics processors/cores, peripheral interface controllers, or general-purpose processor cores. In at least one embodiment, the exemplary graphics processors are for use within an SoC.

FIG. 37A illustrates an exemplary graphics processor 3710 of an SoC integrated circuit that may be fabricated using one or more IP cores, in accordance with at least one embodiment. FIG. 37B illustrates an additional exemplary graphics processor 3740 of an SoC integrated circuit that may be fabricated using one or more IP cores, in accordance with at least one embodiment. In at least one embodiment, graphics processor 3710 of FIG. 37A is a low power graphics processor core. In at least one embodiment, graphics processor 3740 of FIG. 37B is a higher performance graphics processor core. In at least one embodiment, each of graphics processors 3710, 3740 can be variants of graphics processor 1310 of FIG. 13.

In at least one embodiment, graphics processor 3710 includes a vertex processor 3705 and one or more fragment processor(s) 3715A-3715N (e.g., 3715A, 3715B, 3715C, 3715D, through 3715N-1, and 3715N). In at least one embodiment, graphics processor 3710 can execute different shader programs via separate logic, such that vertex processor 3705 is optimized to execute operations for vertex shader programs, while one or more fragment processor(s) 3715A-3715N execute fragment (e.g., pixel) shading operations for fragment or pixel shader programs. In at least one embodiment, vertex processor 3705 performs a vertex processing stage of a 3D graphics pipeline and generates primitives and vertex data. In at least one embodiment, fragment processor(s) 3715A-3715N use primitive and vertex data generated by vertex processor 3705 to produce a framebuffer that is displayed on a display device. In at least one embodiment, fragment processor(s) 3715A-3715N are optimized to execute fragment shader programs as provided for in an OpenGL API, which may be used to perform similar operations as a pixel shader program as provided for in a Direct 3D API.

In at least one embodiment, graphics processor 3710 additionally includes one or more MMU(s) 3720A-3720B, cache(s) 3725A-3725B, and circuit interconnect(s) 3730A-3730B. In at least one embodiment, one or more MMU(s) 3720A-3720B provide for virtual to physical address mapping for graphics processor 3710, including for vertex processor 3705 and/or fragment processor(s) 3715A-3715N, which may reference vertex or image/texture data stored in memory, in addition to vertex or image/texture data stored in one or more cache(s) 3725A-3725B. In at least one embodiment, one or more MMU(s) 3720A-3720B may be synchronized with other MMUs within a system, including one or more MMUs associated with one or more application processor(s) 1305, image processors 1315, and/or video processors 1320 of FIG. 13, such that each processor 1305-1320 can participate in a shared or unified virtual memory system. In at least one embodiment, one or more circuit interconnect(s) 3730A-3730B enable graphics processor 3710 to interface with other IP cores within an SoC, either via an internal bus of an SoC or via a direct connection.

In at least one embodiment, graphics processor 3740 includes one or more MMU(s) 3720A-3720B, caches 3725A-3725B, and circuit interconnects 3730A-3730B of graphics processor 3710 of FIG. 37A. In at least one embodiment, graphics processor 3740 includes one or more shader core(s) 3755A-3755N (e.g., 3755A, 3755B, 3755C, 3755D, 3755E, 3755F, through 3755N-1, and 3755N), which provides for a unified shader core architecture in which a single core or type or core can execute all types of programmable shader code, including shader program code to implement vertex shaders, fragment shaders, and/or compute shaders. In at least one embodiment, a number of shader cores can vary. In at least one embodiment, graphics processor 3740 includes an inter-core task manager 3745, which acts as a thread dispatcher to dispatch execution threads to one or more shader cores 3755A-3755N and a tiling unit 3758 to accelerate tiling operations for tile-based rendering, in which rendering operations for a scene are subdivided in image space, for example to exploit local spatial coherence within a scene or to optimize use of internal caches.

FIG. 38A illustrates a graphics core 3800, in accordance with at least one embodiment. In at least one embodiment, graphics core 3800 may be included within graphics processor 3210 of FIG. 32. In at least one embodiment, graphics core 3800 may be a unified shader core 3755A-3755N as in FIG. 37B. In at least one embodiment, graphics core 3800 includes a shared instruction cache 3802, a texture unit 3818, and a cache/shared memory 3820 that are common to execution resources within graphics core 3800. In at least one embodiment, graphics core 3800 can include multiple slices 3801A-3801N or partition for each core, and a graphics processor can include multiple instances of graphics core 3800. Slices 3801A-3801N can include support logic including a local instruction cache 3804A-3804N, a thread scheduler 3806A-3806N, a thread dispatcher 3808A-3808N, and a set of registers 3810A-3810N. In at least one embodiment, slices 3801A-3801N can include a set of additional function units ("AFUs") 3812A-3812N, floating-point units ("FPUs") 3814A-3814N, integer arithmetic logic units ("ALUs") 3816-3816N, address computational units ("ACUs") 3813A-3813N, double-precision floating-point units ("DPFPUs") 3815A-3815N, and matrix processing units ("MPUs") 3817A-3817N.

In at least one embodiment, FPUs 3814A-3814N can perform single-precision (32-bit) and half-precision (16-bit) floating point operations, while DPFPUs 3815A-3815N perform double precision (64-bit) floating point operations. In at least one embodiment, ALUs 3816A-3816N can perform variable precision integer operations at 8-bit, 16-bit, and 32-bit precision, and can be configured for mixed precision operations. In at least one embodiment, MPUs 3817A-3817N can also be configured for mixed precision matrix operations, including half-precision floating point and 8-bit integer operations. In at least one embodiment, MPUs 3817-3817N can perform a variety of matrix operations to accelerate CUDA programs, including enabling support for accelerated general matrix to matrix multiplication ("GEMM"). In at least one embodiment, AFUs 3812A-3812N can perform additional logic operations not supported by floating-point or integer units, including trigonometric operations (e.g., Sine, Cosine, etc.).

FIG. 38B illustrates a general-purpose graphics processing unit ("GPGPU") 3830, in accordance with at least one embodiment. In at least one embodiment, GPGPU 3830 is highly-parallel and suitable for deployment on a multi-chip module. In at least one embodiment, GPGPU 3830 can be configured to enable highly-parallel compute operations to be performed by an array of GPUs. In at least one embodiment, GPGPU 3830 can be linked directly to other instances of GPGPU 3830 to create a multi-GPU cluster to improve execution time for CUDA programs. In at least one embodiment, GPGPU 3830 includes a host interface 3832 to enable a connection with a host processor. In at least one embodiment, host interface 3832 is a PCIe interface. In at least one embodiment, host interface 3832 can be a vendor specific communications interface or communications fabric. In at least one embodiment, GPGPU 3830 receives commands from a host processor and uses a global scheduler 3834 to distribute execution threads associated with those commands to a set of compute clusters 3836A-3836H. In at least one embodiment, compute clusters 3836A-3836H share a cache memory 3838. In at least one embodiment, cache memory 3838 can serve as a higher-level cache for cache memories within compute clusters 3836A-3836H.

In at least one embodiment, GPGPU 3830 includes memory 3844A-3844B coupled with compute clusters 3836A-3836H via a set of memory controllers 3842A-3842B. In at least one embodiment, memory 3844A-3844B can include various types of memory devices including DRAM or graphics random access memory, such as synchronous graphics random access memory ("SGRAM"), including graphics double data rate ("GDDR") memory.

In at least one embodiment, compute clusters 3836A-3836H each include a set of graphics cores, such as graphics core 3800 of FIG. 38A, which can include multiple types of integer and floating point logic units that can perform computational operations at a range of precisions including suited for computations associated with CUDA programs. For example, in at least one embodiment, at least a subset of floating point units in each of compute clusters 3836A-3836H can be configured to perform 16-bit or 32-bit floating point operations, while a different subset of floating point units can be configured to perform 64-bit floating point operations.

In at least one embodiment, multiple instances of GPGPU 3830 can be configured to operate as a compute cluster. In at least one embodiment, compute clusters 3836A-3836H may implement any technically feasible communication techniques for synchronization and data exchange. In at least one embodiment, multiple instances of GPGPU 3830 communicate over host interface 3832. In at least one embodiment, GPGPU 3830 includes an I/O hub 3839 that couples GPGPU 3830 with a GPU link 3840 that enables a direct connection to other instances of GPGPU 3830. In at least one embodiment, GPU link 3840 is coupled to a dedicated GPU-to-GPU bridge that enables communication and synchronization between multiple instances of GPGPU 3830. In at least one embodiment GPU link 3840 couples with a high speed interconnect to transmit and receive data to other GPGPUs 3830 or parallel processors. In at least one embodiment, multiple instances of GPGPU 3830 are located in separate data processing systems and communicate via a network device that is accessible via host interface 3832. In at least one embodiment GPU link 3840 can be configured to enable a connection to a host processor in addition to or as an alternative to host interface 3832. In at least one embodiment, GPGPU 3830 can be configured to execute a CUDA program.

FIG. 39A illustrates a parallel processor 3900, in accordance with at least one embodiment. In at least one embodiment, various components of parallel processor 3900 may be implemented using one or more integrated circuit devices, such as programmable processors, application specific integrated circuits ("ASICs"), or FPGAs.

In at least one embodiment, parallel processor 3900 includes a parallel processing unit 3902. In at least one embodiment, parallel processing unit 3902 includes an I/O unit 3904 that enables communication with other devices, including other instances of parallel processing unit 3902. In at least one embodiment, I/O unit 3904 may be directly connected to other devices. In at least one embodiment, I/O unit 3904 connects with other devices via use of a hub or switch interface, such as memory hub 1405. In at least one embodiment, connections between memory hub 1405 and I/O unit 3904 form a communication link. In at least one embodiment, I/O unit 3904 connects with a host interface 3906 and a memory crossbar 3916, where host interface 3906 receives commands directed to performing processing operations and memory crossbar 3916 receives commands directed to performing memory operations.

In at least one embodiment, when host interface 3906 receives a command buffer via I/O unit 3904, host interface 3906 can direct work operations to perform those commands to a front end 3908. In at least one embodiment, front end 3908 couples with a scheduler 3910, which is configured to distribute commands or other work items to a processing array 3912. In at least one embodiment, scheduler 3910 ensures that processing array 3912 is properly configured and in a valid state before tasks are distributed to processing array 3912. In at least one embodiment, scheduler 3910 is implemented via firmware logic executing on a microcontroller. In at least one embodiment, microcontroller implemented scheduler 3910 is configurable to perform complex scheduling and work distribution operations at coarse and fine granularity, enabling rapid preemption and context switching of threads executing on processing array 3912. In at least one embodiment, host software can prove workloads for scheduling on processing array 3912 via one of multiple graphics processing doorbells. In at least one embodiment, workloads can then be automatically distributed across processing array 3912 by scheduler 3910 logic within a microcontroller including scheduler 3910.

In at least one embodiment, processing array 3912 can include up to "N" clusters (e.g., cluster 3914A, cluster 3914B, through cluster 3914N). In at least one embodiment, each cluster 3914A-3914N of processing array 3912 can execute a large number of concurrent threads. In at least one embodiment, scheduler 3910 can allocate work to clusters 3914A-3914N of processing array 3912 using various scheduling and/or work distribution algorithms, which may vary depending on a workload arising for each type of program or computation. In at least one embodiment, scheduling can be handled dynamically by scheduler 3910, or can be assisted in part by compiler logic during compilation of program logic configured for execution by processing array 3912. In at least one embodiment, different clusters 3914A-3914N of processing array 3912 can be allocated for processing different types of programs or for performing different types of computations.

In at least one embodiment, processing array 3912 can be configured to perform various types of parallel processing operations. In at least one embodiment, processing array 3912 is configured to perform general-purpose parallel compute operations. For example, in at least one embodiment, processing array 3912 can include logic to execute processing tasks including filtering of video and/or audio data, performing modeling operations, including physics operations, and performing data transformations.

In at least one embodiment, processing array 3912 is configured to perform parallel graphics processing operations. In at least one embodiment, processing array 3912 can include additional logic to support execution of such graphics processing operations, including, but not limited to texture sampling logic to perform texture operations, as well as tessellation logic and other vertex processing logic. In at least one embodiment, processing array 3912 can be configured to execute graphics processing related shader programs such as, but not limited to vertex shaders, tessellation shaders, geometry shaders, and pixel shaders. In at least one embodiment, parallel processing unit 3902 can transfer data from system memory via I/O unit 3904 for processing. In at least one embodiment, during processing, transferred data can be stored to on-chip memory (e.g., a parallel processor memory 3922) during processing, then written back to system memory.

In at least one embodiment, when parallel processing unit 3902 is used to perform graphics processing, scheduler 3910 can be configured to divide a processing workload into approximately equal sized tasks, to better enable distribution of graphics processing operations to multiple clusters 3914A-3914N of processing array 3912. In at least one embodiment, portions of processing array 3912 can be configured to perform different types of processing. For example, in at least one embodiment, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 3914A-3914N may be stored in buffers to allow intermediate data to be transmitted between clusters 3914A-3914N for further processing.

In at least one embodiment, processing array 3912 can receive processing tasks to be executed via scheduler 3910, which receives commands defining processing tasks from front end 3908. In at least one embodiment, processing tasks can include indices of data to be processed, e.g., surface (patch) data, primitive data, vertex data, and/or pixel data, as well as state parameters and commands defining how data is to be processed (e.g., what program is to be executed). In at least one embodiment, scheduler 3910 may be configured to fetch indices corresponding to tasks or may receive indices from front end 3908. In at least one embodiment, front end 3908 can be configured to ensure processing array 3912 is configured to a valid state before a workload specified by incoming command buffers (e.g., batch-buffers, push buffers, etc.) is initiated.

In at least one embodiment, each of one or more instances of parallel processing unit 3902 can couple with parallel processor memory 3922. In at least one embodiment, parallel processor memory 3922 can be accessed via memory crossbar 3916, which can receive memory requests from processing array 3912 as well as I/O unit 3904. In at least one embodiment, memory crossbar 3916 can access parallel processor memory 3922 via a memory interface 3918. In at least one embodiment, memory interface 3918 can include multiple partition units (e.g., a partition unit 3920A, partition unit 3920B, through partition unit 3920N) that can each couple to a portion (e.g., memory unit) of parallel processor memory 3922. In at least one embodiment, a number of partition units 3920A-3920N is configured to be equal to a number of memory units, such that a first partition unit 3920A has a corresponding first memory unit 3924A, a second partition unit 3920B has a corresponding memory unit 3924B, and an Nth partition unit 3920N has a corresponding Nth memory unit 3924N. In at least one embodiment, a number of partition units 3920A-3920N may not be equal to a number of memory devices.

In at least one embodiment, memory units 3924A-3924N can include various types of memory devices, including DRAM or graphics random access memory, such as SGRAM, including GDDR memory. In at least one embodiment, memory units 3924A-3924N may also include 3D stacked memory, including but not limited to high bandwidth memory ("HBM"). In at least one embodiment, render targets, such as frame buffers or texture maps may be stored across memory units 3924A-3924N, allowing partition units 3920A-3920N to write portions of each render target in parallel to efficiently use available bandwidth of parallel processor memory 3922. In at least one embodiment, a local instance of parallel processor memory 3922 may be excluded in favor of a unified memory design that utilizes system memory in conjunction with local cache memory.

In at least one embodiment, any one of clusters 3914A-3914N of processing array 3912 can process data that will be written to any of memory units 3924A-3924N within parallel processor memory 3922. In at least one embodiment, memory crossbar 3916 can be configured to transfer an output of each cluster 3914A-3914N to any partition unit 3920A-3920N or to another cluster 3914A-3914N, which can perform additional processing operations on an output. In at least one embodiment, each cluster 3914A-3914N can communicate with memory interface 3918 through memory crossbar 3916 to read from or write to various external memory devices. In at least one embodiment, memory crossbar 3916 has a connection to memory interface 3918 to communicate with I/O unit 3904, as well as a connection to a local instance of parallel processor memory 3922, enabling processing units within different clusters 3914A-3914N to communicate with system memory or other memory that is not local to parallel processing unit 3902. In at least one embodiment, memory crossbar 3916 can use virtual channels to separate traffic streams between clusters 3914A-3914N and partition units 3920A-3920N.

In at least one embodiment, multiple instances of parallel processing unit 3902 can be provided on a single add-in card, or multiple add-in cards can be interconnected. In at least one embodiment, different instances of parallel processing unit 3902 can be configured to inter-operate even if different instances have different numbers of processing cores, different amounts of local parallel processor memory, and/or other configuration differences. For example, in at least one embodiment, some instances of parallel processing unit 3902 can include higher precision floating point units relative to other instances. In at least one embodiment, systems incorporating one or more instances of parallel processing unit 3902 or parallel processor 3900 can be implemented in a variety of configurations and form factors, including but not limited to desktop, laptop, or handheld personal computers, servers, workstations, game consoles, and/or embedded systems.

FIG. 39B illustrates a processing cluster 3994, in accordance with at least one embodiment. In at least one embodiment, processing cluster 3994 is included within a parallel processing unit. In at least one embodiment, processing cluster 3994 is one of processing clusters 3914A-3914N of FIG. 39. In at least one embodiment, processing cluster 3994 can be configured to execute many threads in parallel, where the term "thread" refers to an instance of a particular program executing on a particular set of input data. In at least one embodiment, single instruction, multiple data ("SIMD") instruction issue techniques are used to support parallel execution of a large number of threads without providing multiple independent instruction units. In at least one embodiment, single instruction, multiple thread ("SIMT") techniques are used to support parallel execution of a large number of generally synchronized threads, using a common instruction unit configured to issue instructions to a set of processing engines within each processing cluster 3994.

In at least one embodiment, operation of processing cluster 3994 can be controlled via a pipeline manager 3932 that distributes processing tasks to SIMT parallel processors. In at least one embodiment, pipeline manager 3932 receives instructions from scheduler 3910 of FIG. 39 and manages execution of those instructions via a graphics multiprocessor 3934 and/or a texture unit 3936. In at least one embodiment, graphics multiprocessor 3934 is an exemplary instance of a SIMT parallel processor. However, in at least one embodiment, various types of SIMT parallel processors of differing architectures may be included within processing cluster 3994. In at least one embodiment, one or more instances of graphics multiprocessor 3934 can be included within processing cluster 3994. In at least one embodiment, graphics multiprocessor 3934 can process data and a data crossbar 3940 can be used to distribute processed data to one of multiple possible destinations, including other shader units. In at least one embodiment, pipeline manager 3932 can facilitate distribution of processed data by specifying destinations for processed data to be distributed via data crossbar 3940.

In at least one embodiment, each graphics multiprocessor 3934 within processing cluster 3994 can include an identical set of functional execution logic (e.g., arithmetic logic units, load/store units ("LSUs"), etc.). In at least one embodiment, functional execution logic can be configured in a pipelined manner in which new instructions can be issued before previous instructions are complete. In at least one embodiment, functional execution logic supports a variety of operations including integer and floating point arithmetic, comparison operations, Boolean operations, bit-shifting, and computation of various algebraic functions. In at least one embodiment, same functional-unit hardware can be leveraged to perform different operations and any combination of functional units may be present.

In at least one embodiment, instructions transmitted to processing cluster 3994 constitute a thread. In at least one embodiment, a set of threads executing across a set of parallel processing engines is a thread group. In at least one embodiment, a thread group executes a program on different input data. In at least one embodiment, each thread within a thread group can be assigned to a different processing engine within graphics multiprocessor 3934. In at least one embodiment, a thread group may include fewer threads than a number of processing engines within graphics multiprocessor 3934. In at least one embodiment, when a thread group includes fewer threads than a number of processing engines, one or more of processing engines may be idle during cycles in which that thread group is being processed. In at least one embodiment, a thread group may also include more threads than a number of processing engines within graphics multiprocessor 3934. In at least one embodiment, when a thread group includes more threads than a number of processing engines within graphics multiprocessor 3934, processing can be performed over consecutive clock cycles. In at least one embodiment, multiple thread groups can be executed concurrently on graphics multiprocessor 3934.

In at least one embodiment, graphics multiprocessor 3934 includes an internal cache memory to perform load and store operations. In at least one embodiment, graphics multiprocessor 3934 can forego an internal cache and use a cache memory (e.g., L1 cache 3948) within processing cluster 3994. In at least one embodiment, each graphics multiprocessor 3934 also has access to Level 2 ("L2") caches within partition units (e.g., partition units 3920A-3920N of FIG. 39A) that are shared among all processing clusters 3994 and may be used to transfer data between threads. In at least one embodiment, graphics multiprocessor 3934 may also access off-chip global memory, which can include one or more of local parallel processor memory and/or system memory. In at least one embodiment, any memory external to parallel processing unit 3902 may be used as global memory. In at least one embodiment, processing cluster 3994 includes multiple instances of graphics multiprocessor 3934 that can share common instructions and data, which may be stored in L1 cache 3948.

In at least one embodiment, each processing cluster 3994 may include an MMU 3945 that is configured to map virtual addresses into physical addresses. In at least one embodiment, one or more instances of MMU 3945 may reside within memory interface 3918 of FIG. 39. In at least one embodiment, MMU 3945 includes a set of page table entries ("PTEs") used to map a virtual address to a physical address of a tile and optionally a cache line index. In at least one embodiment, MMU 3945 may include address translation lookaside buffers ("TLBs") or caches that may reside within graphics multiprocessor 3934 or L1 cache 3948 or processing cluster 3994. In at least one embodiment, a physical address is processed to distribute surface data access locality to allow efficient request interleaving among partition units. In at least one embodiment, a cache line index may be used to determine whether a request for a cache line is a hit or miss.

In at least one embodiment, processing cluster 3994 may be configured such that each graphics multiprocessor 3934 is coupled to a texture unit 3936 for performing texture mapping operations, e.g., determining texture sample positions, reading texture data, and filtering texture data. In at least one embodiment, texture data is read from an internal texture L1 cache (not shown) or from an L1 cache within graphics multiprocessor 3934 and is fetched from an L2 cache, local parallel processor memory, or system memory, as needed. In at least one embodiment, each graphics multiprocessor 3934 outputs a processed task to data crossbar 3940 to provide a processed task to another processing cluster 3994 for further processing or to store a processed task in an L2 cache, a local parallel processor memory, or a system memory via memory crossbar 3916. In at least one embodiment, a pre-raster operations unit ("preROP") 3942 is configured to receive data from graphics multiprocessor 3934, direct data to ROP units, which may be located with partition units as described herein (e.g., partition units 3920A-3920N of FIG. 39). In at least one embodiment, PreROP 3942 can perform optimizations for color blending, organize pixel color data, and perform address translations.

FIG. 39C illustrates a graphics multiprocessor 3996, in accordance with at least one embodiment. In at least one embodiment, graphics multiprocessor 3996 is graphics multiprocessor 3934 of FIG. 39B. In at least one embodiment, graphics multiprocessor 3996 couples with pipeline manager 3932 of processing cluster 3994. In at least one embodiment, graphics multiprocessor 3996 has an execution pipeline including but not limited to an instruction cache 3952, an instruction unit 3954, an address mapping unit 3956, a register file 3958, one or more GPGPU cores 3962, and one or more LSUs 3966. GPGPU cores 3962 and LSUs 3966 are coupled with cache memory 3972 and shared memory 3970 via a memory and cache interconnect 3968.

In at least one embodiment, instruction cache 3952 receives a stream of instructions to execute from pipeline manager 3932. In at least one embodiment, instructions are cached in instruction cache 3952 and dispatched for execution by instruction unit 3954. In at least one embodiment, instruction unit 3954 can dispatch instructions as thread groups (e.g., warps), with each thread of a thread group assigned to a different execution unit within GPGPU core 3962. In at least one embodiment, an instruction can access any of a local, shared, or global address space by specifying an address within a unified address space. In at least one embodiment, address mapping unit 3956 can be used to translate addresses in a unified address space into a distinct memory address that can be accessed by LSUs 3966.

In at least one embodiment, register file 3958 provides a set of registers for functional units of graphics multiprocessor 3996. In at least one embodiment, register file 3958 provides temporary storage for operands connected to data paths of functional units (e.g., GPGPU cores 3962, LSUs 3966) of graphics multiprocessor 3996. In at least one embodiment, register file 3958 is divided between each of functional units such that each functional unit is allocated a dedicated portion of register file 3958. In at least one embodiment, register file 3958 is divided between different thread groups being executed by graphics multiprocessor 3996.

In at least one embodiment, GPGPU cores 3962 can each include FPUs and/or integer ALUs that are used to execute instructions of graphics multiprocessor 3996. GPGPU cores 3962 can be similar in architecture or can differ in architecture. In at least one embodiment, a first portion of GPGPU cores 3962 include a single precision FPU and an integer ALU while a second portion of GPGPU cores 3962 include a double precision FPU. In at least one embodiment, FPUs can implement IEEE 754-2008 standard for floating point arithmetic or enable variable precision floating point arithmetic. In at least one embodiment, graphics multiprocessor 3996 can additionally include one or more fixed function or special function units to perform specific functions such as copy rectangle or pixel blending operations. In at least one embodiment one or more of GPGPU cores 3962 can also include fixed or special function logic.

In at least one embodiment, GPGPU cores 3962 include SIMD logic capable of performing a single instruction on multiple sets of data. In at least one embodiment GPGPU cores 3962 can physically execute SIMD4, SIMD8, and SIMD16 instructions and logically execute SIMD1, SIMD2, and SIMD32 instructions. In at least one embodiment, SIMD instructions for GPGPU cores 3962 can be generated at compile time by a shader compiler or automatically generated when executing programs written and compiled for single program multiple data ("SPMD") or SIMT architectures. In at least one embodiment, multiple threads of a program configured for an SIMT execution model can executed via a single SIMD instruction. For example, in at least one embodiment, eight SIMT threads that perform the same or similar operations can be executed in parallel via a single SIMD8 logic unit.

In at least one embodiment, memory and cache interconnect 3968 is an interconnect network that connects each functional unit of graphics multiprocessor 3996 to register file 3958 and to shared memory 3970. In at least one embodiment, memory and cache interconnect 3968 is a crossbar interconnect that allows LSU 3966 to implement load and store operations between shared memory 3970 and register file 3958. In at least one embodiment, register file 3958 can operate at a same frequency as GPGPU cores 3962, thus data transfer between GPGPU cores 3962 and register file 3958 is very low latency. In at least one embodiment, shared memory 3970 can be used to enable communication between threads that execute on functional units within graphics multiprocessor 3996. In at least one embodiment, cache memory 3972 can be used as a data cache for example, to cache texture data communicated between functional units and texture unit 3936. In at least one embodiment, shared memory 3970 can also be used as a program managed cached. In at least one embodiment, threads executing on GPGPU cores 3962 can programmatically store data within shared memory in addition to automatically cached data that is stored within cache memory 3972.

In at least one embodiment, a parallel processor or GPGPU as described herein is communicatively coupled to host/processor cores to accelerate graphics operations, machine-learning operations, pattern analysis operations, and various general purpose GPU (GPGPU) functions. In at least one embodiment, a GPU may be communicatively coupled to host processor/cores over a bus or other interconnect (e.g., a high speed interconnect such as PCIe or NVLink). In at least one embodiment, a GPU may be integrated on a same package or chip as cores and communicatively coupled to cores over a processor bus/interconnect that is internal to a package or a chip. In at least one embodiment, regardless of a manner in which a GPU is connected, processor cores may allocate work to a GPU in a form of sequences of commands/instructions contained in a WD. In at least one embodiment, a GPU then uses dedicated circuitry/logic for efficiently processing these commands/instructions.

General Computing

The following figures set forth, without limitation, exemplary software constructs within general computing that can be used to implement at least one embodiment.

Figure 40:
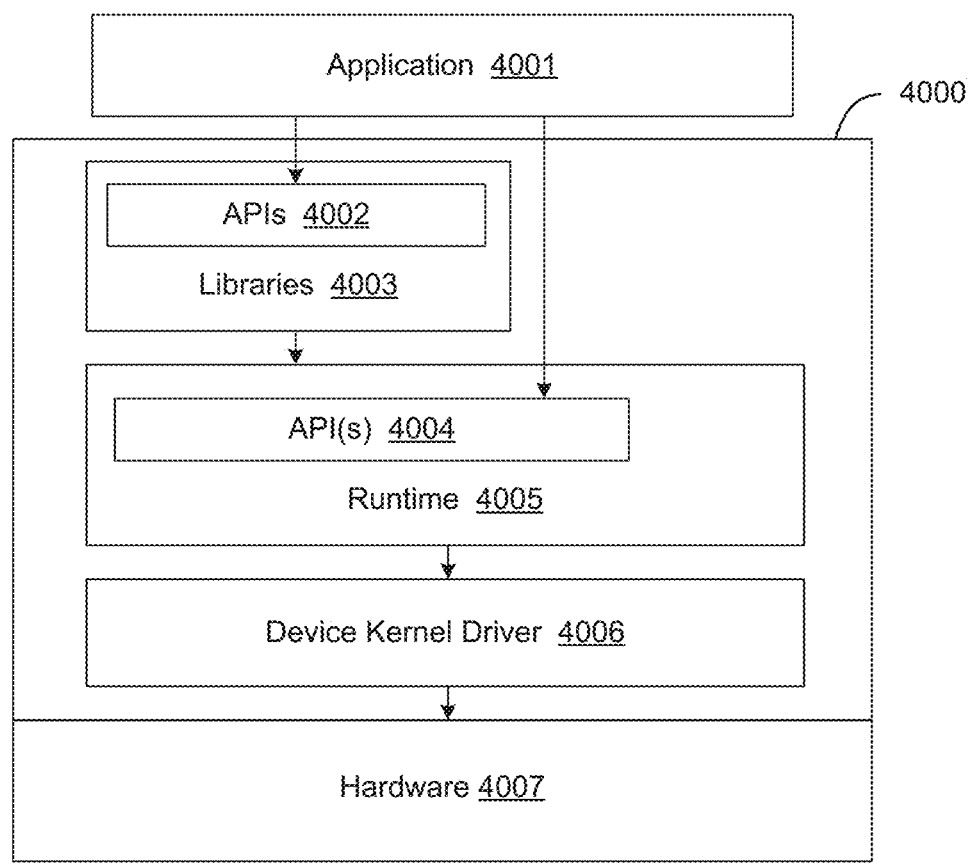
FIG. 40 illustrates a software stack of a programming platform, in accordance with at least one embodiment.

FIG. 40 illustrates a software stack of a programming platform, in accordance with at least one embodiment. In at least one embodiment, a programming platform is a platform for leveraging hardware on a computing system to accelerate computational tasks. A programming platform may be accessible to software developers through libraries, compiler directives, and/or extensions to programming languages, in at least one embodiment. In at least one embodiment, a programming platform may be, but is not limited to, CUDA, Radeon Open Compute Platform ("ROCm"), OpenCL (OpenCL™ is developed by Khronos group), SYCL, or Intel One API.

In at least one embodiment, a software stack 4000 of a programming platform provides an execution environment for an application 4001. In at least one embodiment, application 4001 may include any computer software capable of being launched on software stack 4000. In at least one embodiment, application 4001 may include, but is not limited to, an artificial intelligence ("AI")/machine learning ("ML") application, a high performance computing ("HPC") application, a virtual desktop infrastructure ("VDI"), or a data center workload.

In at least one embodiment, application 4001 and software stack 4000 run on hardware 4007. Hardware 4007 may include one or more GPUs, CPUs, FPGAs, AI engines, and/or other types of compute devices that support a programming platform, in at least one embodiment. In at least one embodiment, such as with CUDA, software stack 4000 may be vendor specific and compatible with only devices from particular vendor(s). In at least one embodiment, such as in with OpenCL, software stack 4000 may be used with devices from different vendors. In at least one embodiment, hardware 4007 includes a host connected to one more devices that can be accessed to perform computational tasks via application programming interface ("API") calls. A device within hardware 4007 may include, but is not limited to, a GPU, FPGA, AI engine, or other compute device (but may also include a CPU) and its memory, as opposed to a host within hardware 4007 that may include, but is not limited to, a CPU (but may also include a compute device) and its memory, in at least one embodiment.

In at least one embodiment, software stack 4000 of a programming platform includes, without limitation, a number of libraries 4003, a runtime 4005, and a device kernel driver 4006. Each of libraries 4003 may include data and programming code that can be used by computer programs and leveraged during software development, in at least one embodiment. In at least one embodiment, libraries 4003 may include, but are not limited to, pre-written code and subroutines, classes, values, type specifications, configuration data, documentation, help data, and/or message templates. In at least one embodiment, libraries 4003 include functions that are optimized for execution on one or more types of devices. In at least one embodiment, libraries 4003 may include, but are not limited to, functions for performing mathematical, deep learning, and/or other types of operations on devices. In at least one embodiment, libraries 4103 are associated with corresponding APIs 4102, which may include one or more APIs, that expose functions implemented in libraries 4103.

In at least one embodiment, application 4001 is written as source code that is compiled into executable code, as discussed in greater detail below in conjunction with FIG. 45. Executable code of application 4001 may run, at least in part, on an execution environment provided by software stack 4000, in at least one embodiment. In at least one embodiment, during execution of application 4001, code may be reached that needs to run on a device, as opposed to a host. In such a case, runtime 4005 may be called to load and launch requisite code on a device, in at least one embodiment. In at least one embodiment, runtime 4005 may include any technically feasible runtime system that is able to support execution of application S01.

In at least one embodiment, runtime 4005 is implemented as one or more runtime libraries associated with corresponding APIs, which are shown as API(s) 4004. One or more of such runtime libraries may include, without limitation, functions for memory management, execution control, device management, error handling, and/or synchronization, among other things, in at least one embodiment. In at least one embodiment, memory management functions may include, but are not limited to, functions to allocate, deallocate, and copy device memory, as well as transfer data between host memory and device memory. In at least one embodiment, execution control functions may include, but are not limited to, functions to launch a function (sometimes referred to as a "kernel" when a function is a global function callable from a host) on a device and set attribute values in a buffer maintained by a runtime library for a given function to be executed on a device.

Runtime libraries and corresponding API(s) 4004 may be implemented in any technically feasible manner, in at least one embodiment. In at least one embodiment, one (or any number of) API may expose a low-level set of functions for fine-grained control of a device, while another (or any number of) API may expose a higher-level set of such functions. In at least one embodiment, a high-level runtime API may be built on top of a low-level API. In at least one embodiment, one or more of runtime APIs may be language-specific APIs that are layered on top of a language-independent runtime API.

In at least one embodiment, device kernel driver 4006 is configured to facilitate communication with an underlying device. In at least one embodiment, device kernel driver 4006 may provide low-level functionalities upon which APIs, such as API(s) 4004, and/or other software relies. In at least one embodiment, device kernel driver 4006 may be configured to compile intermediate representation ("IR") code into binary code at runtime. For CUDA, device kernel driver 4006 may compile Parallel Thread Execution ("PTX") IR code that is not hardware specific into binary code for a specific target device at runtime (with caching of compiled binary code), which is also sometimes referred to as "finalizing" code, in at least one embodiment. Doing so may permit finalized code to run on a target device, which may not have existed when source code was originally compiled into PTX code, in at least one embodiment. Alternatively, in at least one embodiment, device source code may be compiled into binary code offline, without requiring device kernel driver 4006 to compile IR code at runtime.

Figure 41:
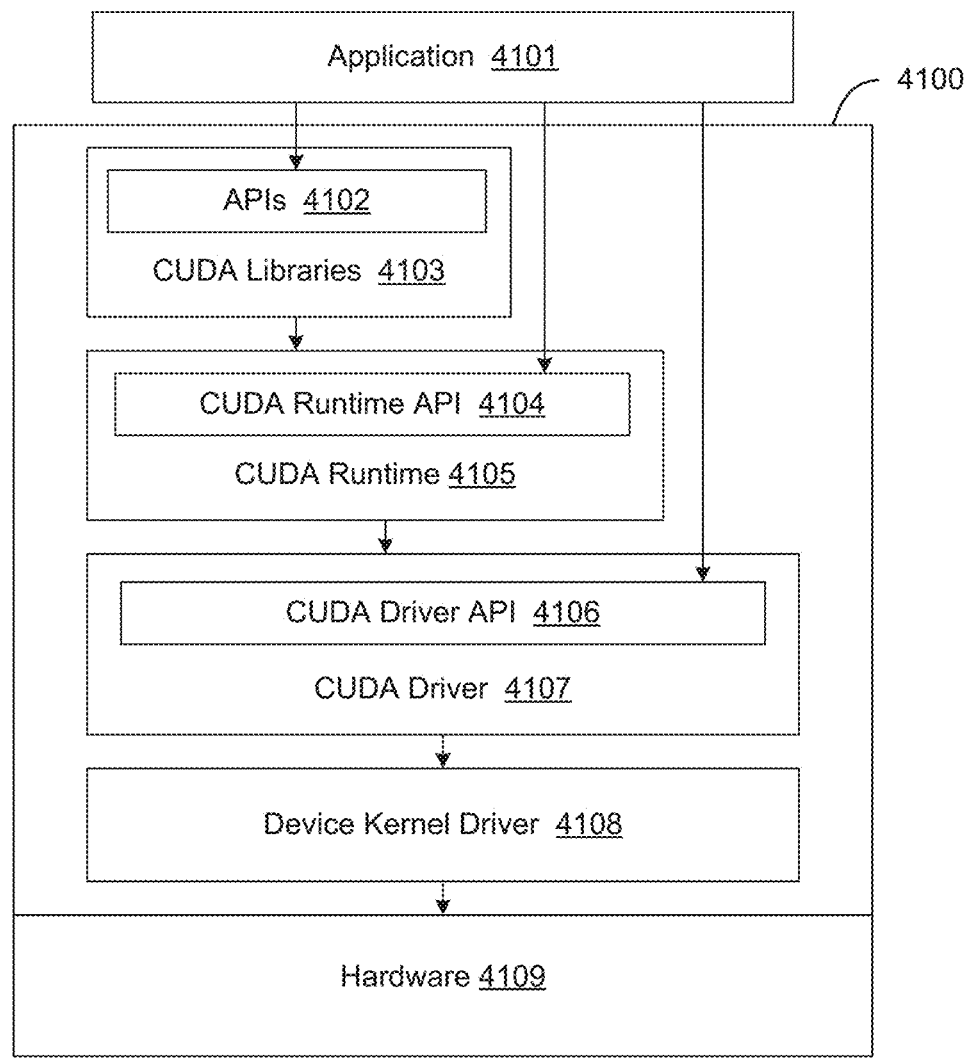
FIG. 41 illustrates a CUDA implementation of a software stack of FIG. 40, in accordance with at least one embodiment.

FIG. 41 illustrates a CUDA implementation of software stack 4000 of FIG. 40, in accordance with at least one embodiment. In at least one embodiment, a CUDA software stack 4100, on which an application 4101 may be launched, includes CUDA libraries 4103, a CUDA runtime 4105, a CUDA driver 4107, and a device kernel driver 4108. In at least one embodiment, CUDA software stack 4100 executes on hardware 4109, which may include a GPU that supports CUDA and is developed by NVIDIA Corporation of Santa Clara, CA.

In at least one embodiment, application 4101, CUDA runtime 4105, and device kernel driver 4108 may perform similar functionalities as application 4001, runtime 4005, and device kernel driver 4006, respectively, which are described above in conjunction with FIG. 40. In at least one embodiment, CUDA driver 4107 includes a library (libcuda.so) that implements a CUDA driver API 4106. Similar to a CUDA runtime API 4104 implemented by a CUDA runtime library (cudart), CUDA driver API 4106 may, without limitation, expose functions for memory management, execution control, device management, error handling, synchronization, and/or graphics interoperability, among other things, in at least one embodiment. In at least one embodiment, CUDA driver API 4106 differs from CUDA runtime API 4104 in that CUDA runtime API 4104 simplifies device code management by providing implicit initialization, context (analogous to a process) management, and module (analogous to dynamically loaded libraries) management. In contrast to high-level CUDA runtime API 4104, CUDA driver API 4106 is a low-level API providing more fine-grained control of a device, particularly with respect to contexts and module loading, in at least one embodiment. In at least one embodiment, CUDA driver API 4106 may expose functions for context management that are not exposed by CUDA runtime API 4104. In at least one embodiment, CUDA driver API 4106 is also language-independent and supports, e.g., OpenCL in addition to CUDA runtime API 4104. Further, in at least one embodiment, development libraries, including CUDA runtime 4105, may be considered as separate from driver components, including user-mode CUDA driver 4107 and kernel-mode device driver 4108 (also sometimes referred to as a "display" driver).

In at least one embodiment, CUDA libraries 4103 may include, but are not limited to, mathematical libraries, deep learning libraries, parallel algorithm libraries, and/or signal/image/video processing libraries, which parallel computing applications such as application 4101 may utilize. In at least one embodiment, CUDA libraries 4103 may include mathematical libraries such as a cuBLAS library that is an implementation of Basic Linear Algebra Subprograms ("BLAS") for performing linear algebra operations, a cuFFT library for computing fast Fourier transforms ("FFTs"), and a cuRAND library for generating random numbers, among others. In at least one embodiment, CUDA libraries 4103 may include deep learning libraries such as a cuDNN library of primitives for deep neural networks and a TensorRT platform for high-performance deep learning inference, among others.

Figure 42:
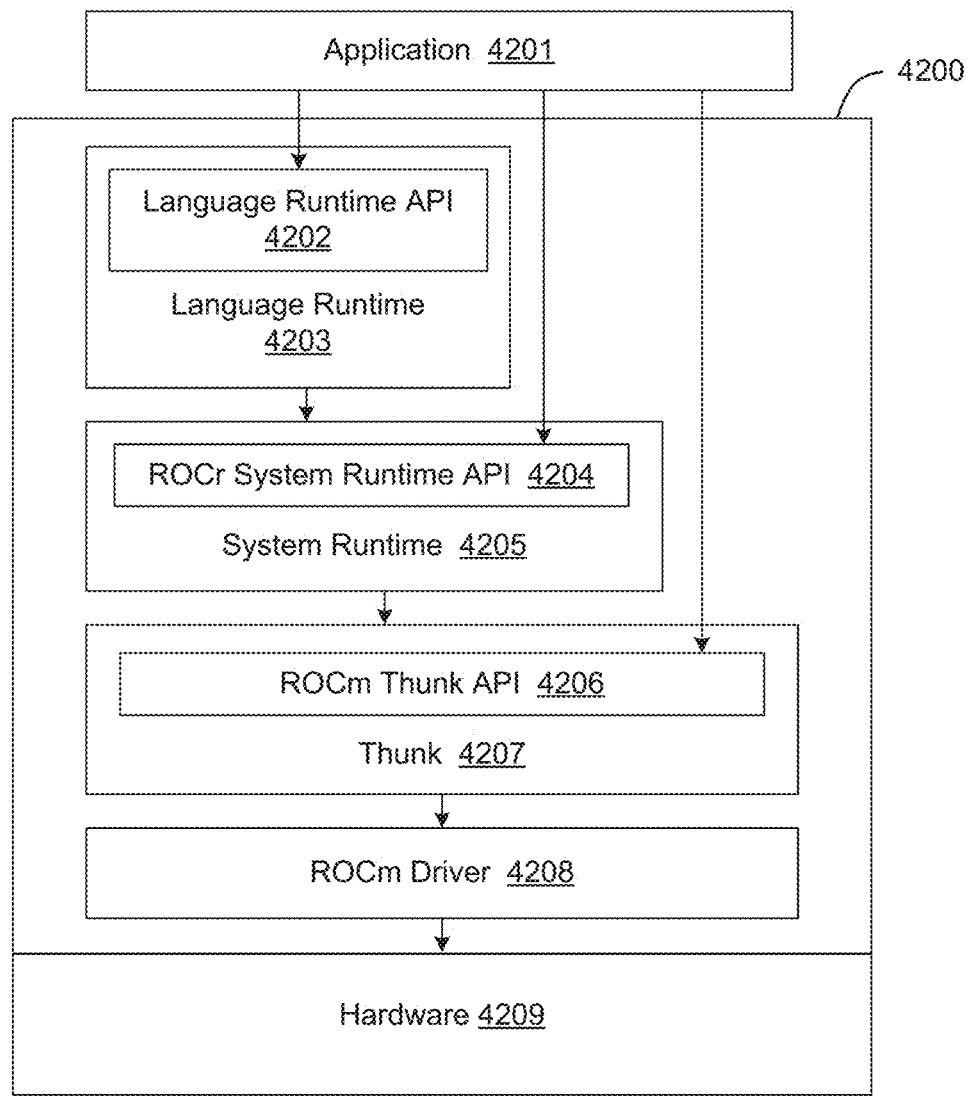
FIG. 42 illustrates a ROCm implementation of a software stack of FIG. 40, in accordance with at least one embodiment.

FIG. 42 illustrates a ROCm implementation of software stack 4000 of FIG. 40, in accordance with at least one embodiment. In at least one embodiment, a ROCm software stack 4200, on which an application 4201 may be launched, includes a language runtime 4203, a system runtime 4205, a thunk 4207, a ROCm kernel driver 4208, and a device kernel driver 4209. In at least one embodiment, ROCm software stack 4200 executes on hardware 4210, which may include a GPU that supports ROCm and is developed by AMD Corporation of Santa Clara, CA.

In at least one embodiment, application 4201 may perform similar functionalities as application 4001 discussed above in conjunction with FIG. 40. In addition, language runtime 4203 and system runtime 4205 may perform similar functionalities as runtime 4005 discussed above in conjunction with FIG. 40, in at least one embodiment. In at least one embodiment, language runtime 4203 and system runtime 4205 differ in that system runtime 4205 is a language-independent runtime that implements a ROCr system runtime API 4204 and makes use of a Heterogeneous System Architecture ("HAS") Runtime API. HAS runtime API is a thin, user-mode API that exposes interfaces to access and interact with an AMD GPU, including functions for memory management, execution control via architected dispatch of kernels, error handling, system and agent information, and runtime initialization and shutdown, among other things, in at least one embodiment. In contrast to system runtime 4205, language runtime 4203 is an implementation of a language-specific runtime API 4202 layered on top of ROCr system runtime API 4204, in at least one embodiment. In at least one embodiment, language runtime API may include, but is not limited to, a Heterogeneous compute Interface for Portability ("HIP") language runtime API, a Heterogeneous Compute Compiler ("HCC") language runtime API, or an OpenCL API, among others. HIP language in particular is an extension of C++ programming language with functionally similar versions of CUDA mechanisms, and, in at least one embodiment, a HIP language runtime API includes functions that are similar to those of CUDA runtime API 4104 discussed above in conjunction with FIG. 41, such as functions for memory management, execution control, device management, error handling, and synchronization, among other things.

In at least one embodiment, thunk (ROCt) 4207 is an interface that can be used to interact with underlying ROCm driver 4208. In at least one embodiment, ROCm driver 4208 is a ROCk driver, which is a combination of an AMDGPU driver and a HAS kernel driver (amdkfd). In at least one embodiment, AMDGPU driver is a device kernel driver for GPUs developed by AMD that performs similar functionalities as device kernel driver 4006 discussed above in conjunction with FIG. 40. In at least one embodiment, HAS kernel driver is a driver permitting different types of processors to share system resources more effectively via hardware features.

In at least one embodiment, various libraries (not shown) may be included in ROCm software stack 4200 above language runtime 4203 and provide functionality similarity to CUDA libraries 4103, discussed above in conjunction with FIG. 41. In at least one embodiment, various libraries may include, but are not limited to, mathematical, deep learning, and/or other libraries such as a hipBLAS library that implements functions similar to those of CUDA cuBLAS, a rocFFT library for computing FFTs that is similar to CUDA cuFFT, among others.

Figure 43:
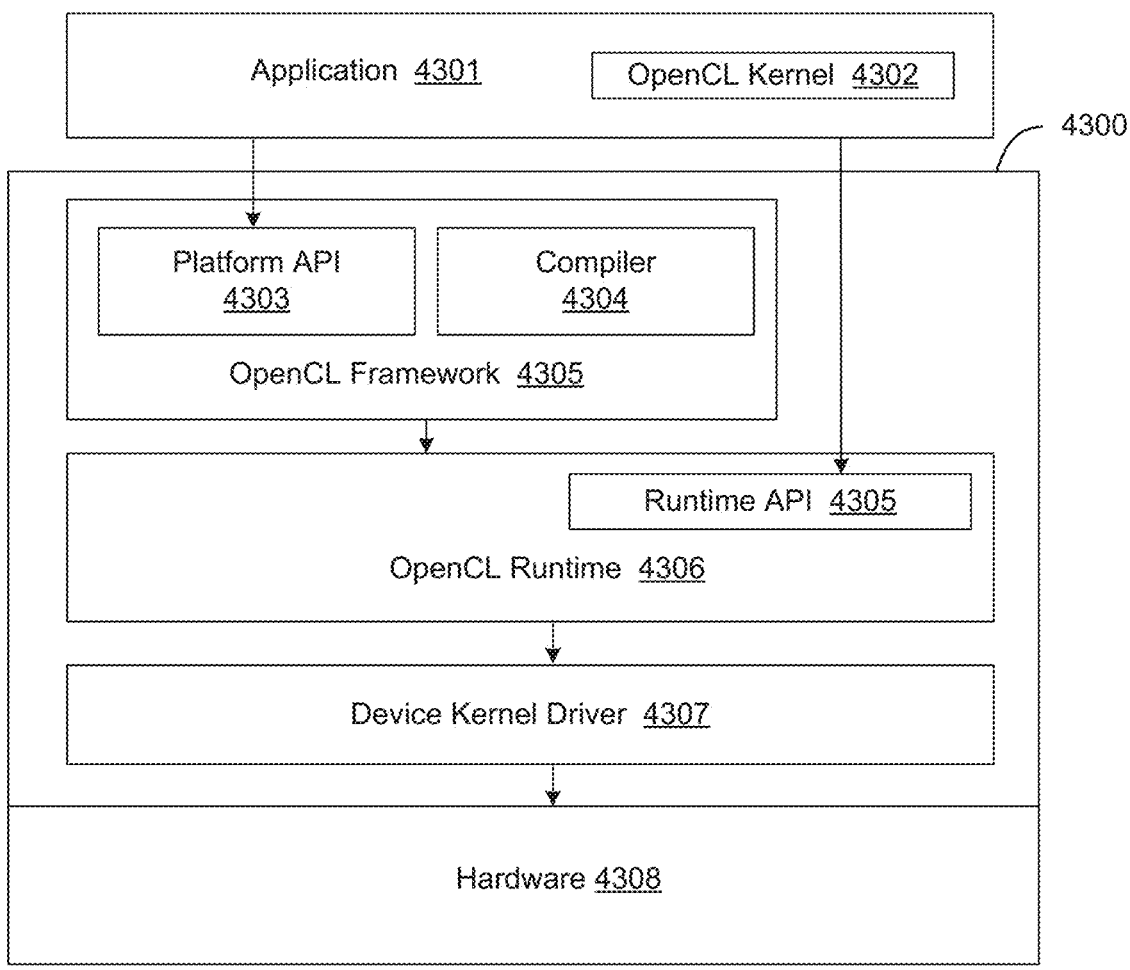
FIG. 43 illustrates an OpenCL implementation of a software stack of FIG. 40, in accordance with at least one embodiment.

FIG. 43 illustrates an OpenCL implementation of software stack 4000 of FIG. 40, in accordance with at least one embodiment. In at least one embodiment, an OpenCL software stack 4300, on which an application 4301 may be launched, includes an OpenCL framework 4305, an OpenCL runtime 4306, and a driver 4307. In at least one embodiment, OpenCL software stack 4300 executes on hardware 4109 that is not vendor-specific. As OpenCL is supported by devices developed by different vendors, specific OpenCL drivers may be required to interoperate with hardware from such vendors, in at least one embodiment.

In at least one embodiment, application 4301, OpenCL runtime 4306, device kernel driver 4307, and hardware 4308 may perform similar functionalities as application 4001, runtime 4005, device kernel driver 4006, and hardware 4007, respectively, that are discussed above in conjunction with FIG. 40. In at least one embodiment, application 4301 further includes an OpenCL kernel 4302 with code that is to be executed on a device.

In at least one embodiment, OpenCL defines a "platform" that allows a host to control devices connected to a host. In at least one embodiment, an OpenCL framework provides a platform layer API and a runtime API, shown as platform API 4303 and runtime API 4305. In at least one embodiment, runtime API 4305 uses contexts to manage execution of kernels on devices. In at least one embodiment, each identified device may be associated with a respective context, which runtime API 4305 may use to manage command queues, program objects, and kernel objects, share memory objects, among other things, for that device. In at least one embodiment, platform API 4303 exposes functions that permit device contexts to be used to select and initialize devices, submit work to devices via command queues, and enable data transfer to and from devices, among other things. In addition, OpenCL framework provides various built-in functions (not shown), including math functions, relational functions, and image processing functions, among others, in at least one embodiment.

In at least one embodiment, a compiler 4304 is also included in OpenCL frame-work 4305. Source code may be compiled offline prior to executing an application or online during execution of an application, in at least one embodiment. In contrast to CUDA and ROCm, OpenCL applications in at least one embodiment may be compiled online by compiler 4304, which is included to be representative of any number of compilers that may be used to compile source code and/or IR code, such as Standard Portable Intermediate Representation ("SPIR-V") code, into binary code. Alternatively, in at least one embodiment, OpenCL applications may be compiled offline, prior to execution of such applications.

Figure 44:
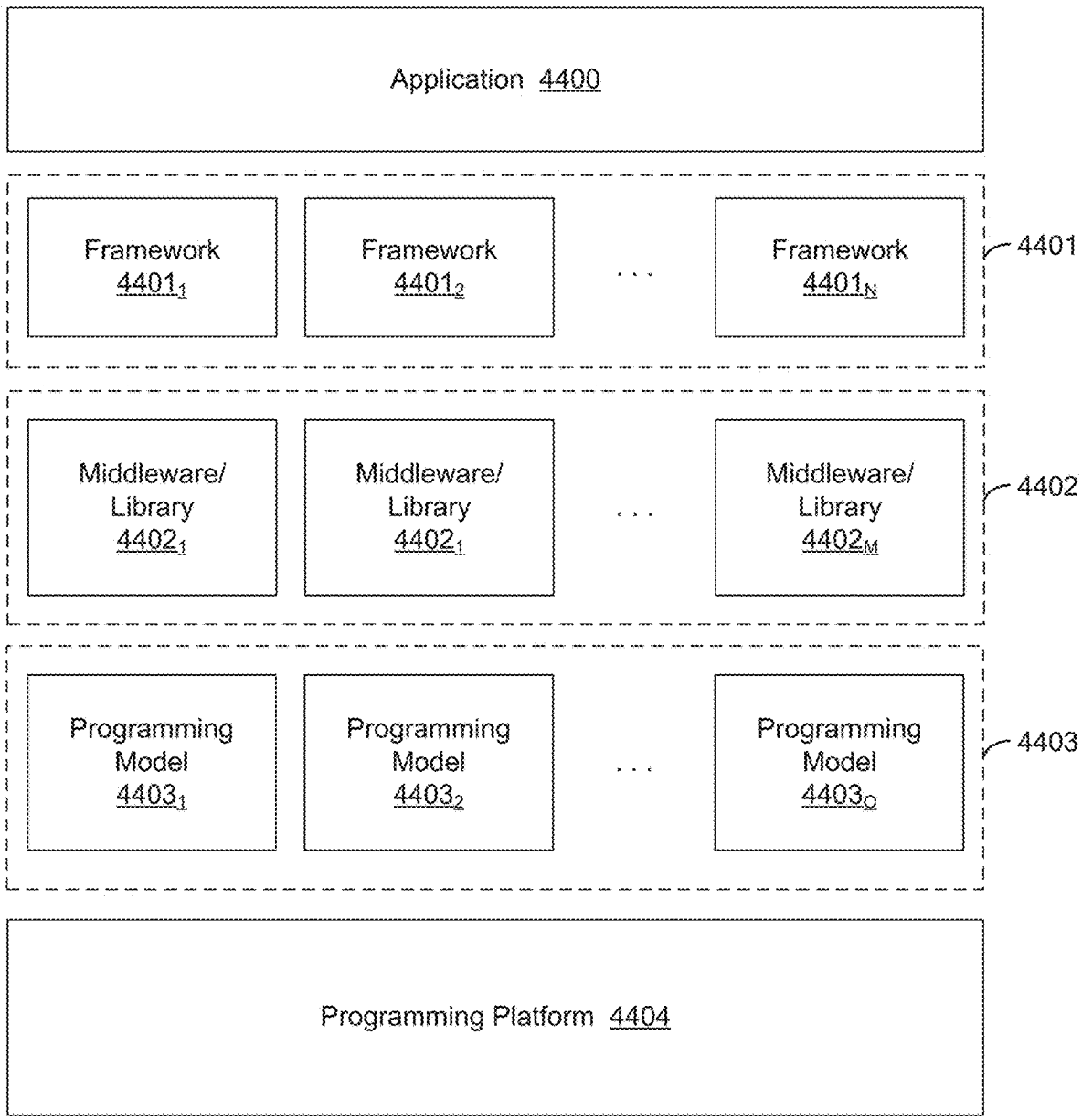
FIG. 44 illustrates software that is supported by a programming platform, in accordance with at least one embodiment.

FIG. 44 illustrates software that is supported by a programming platform, in accordance with at least one embodiment. In at least one embodiment, a programming platform 4404 is configured to support various programming models 4403, middlewares and/or libraries 4402, and frameworks 4401 that an application 4400 may rely upon. In at least one embodiment, application 4400 may be an AI/ML application implemented using, for example, a deep learning framework such as MXNet, PyTorch, or TensorFlow, which may rely on libraries such as cuDNN, NVIDIA Collective Communications Library ("NCCL"), and/or NVIDA Developer Data Loading Library ("DALI") CUDA libraries to provide accelerated computing on underlying hardware.

In at least one embodiment, programming platform 4404 may be one of a CUDA, ROCm, or OpenCL platform described above in conjunction with FIG. 41, FIG. 42, and FIG. 43, respectively. In at least one embodiment, programming platform 4404 supports multiple programming models 4403, which are abstractions of an underlying computing system permitting expressions of algorithms and data structures. Programming models 4403 may expose features of underlying hardware in order to improve performance, in at least one embodiment. In at least one embodiment, programming models 4403 may include, but are not limited to, CUDA, HIP, OpenCL, C++ Accelerated Massive Parallelism ("C++ AMP"), Open Multi-Processing ("OpenMP"), Open Accelerators ("OpenACC"), and/or Vulcan Compute.

In at least one embodiment, libraries and/or middlewares 4402 provide implementations of abstractions of programming models 4404. In at least one embodiment, such libraries include data and programming code that may be used by computer programs and leveraged during software development. In at least one embodiment, such middlewares include software that provides services to applications beyond those available from programming platform 4404. In at least one embodiment, libraries and/or middlewares 4402 may include, but are not limited to, cuBLAS, cuFFT, cuRAND, and other CUDA libraries, or rocBLAS, rocFFT, rocRAND, and other ROCm libraries. In addition, in at least one embodiment, libraries and/or middlewares 4402 may include NCCL and ROCm Communication Collectives Library ("RCCL") libraries providing communication routines for GPUs, a MIOpen library for deep learning acceleration, and/or an Eigen library for linear algebra, matrix and vector operations, geometrical transformations, numerical solvers, and related algorithms.

In at least one embodiment, application frameworks 4401 depend on libraries and/or middlewares 4402. In at least one embodiment, each of application frameworks 4401 is a software framework used to implement a standard structure of application software. An AI/ML application may be implemented using a framework such as Caffe, Caffe2, TensorFlow, Keras, PyTorch, or MxNet deep learning frameworks, in at least one embodiment.

Figure 45:
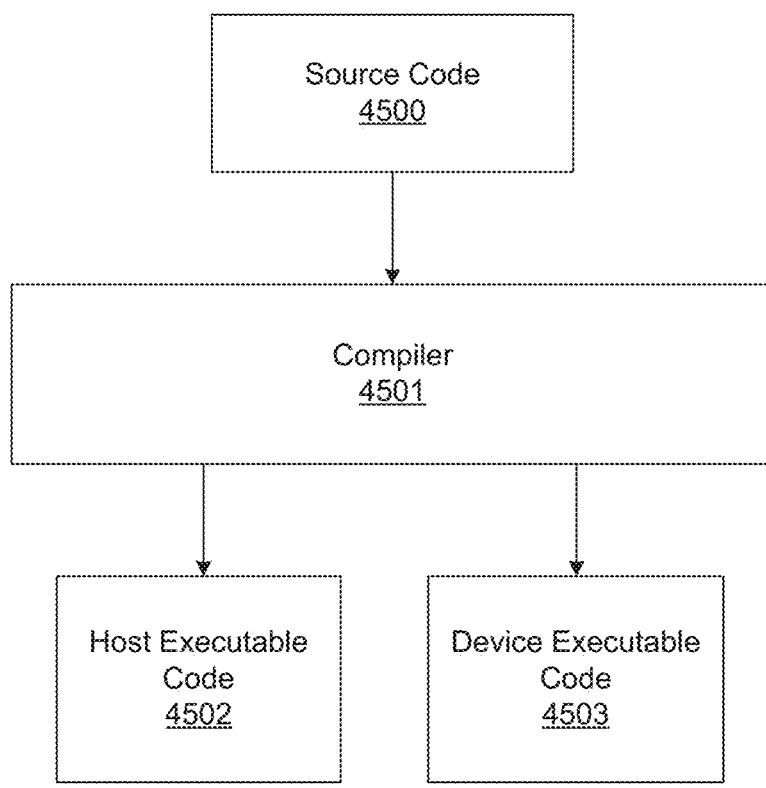
FIG. 45 illustrates compiling code to execute on programming platforms of FIGS. 40-43, in accordance with at least one embodiment.

FIG. 45 illustrates compiling code to execute on one of programming platforms of FIGS. 40-43, in accordance with at least one embodiment. In at least one embodiment, a compiler 4501 receives source code 4500 that includes both host code as well as device code. In at least one embodiment, complier 4501 is configured to convert source code 4500 into host executable code 4502 for execution on a host and device executable code 4503 for execution on a device. In at least one embodiment, source code 4500 may either be compiled offline prior to execution of an application, or online during execution of an application.

In at least one embodiment, source code 4500 may include code in any programming language supported by compiler 4501, such as C++, C, Fortran, etc. In at least one embodiment, source code 4500 may be included in a single-source file having a mixture of host code and device code, with locations of device code being indicated therein. In at least one embodiment, a single-source file may be a .cu file that includes CUDA code or a .hip.cpp file that includes HIP code. Alternatively, in at least one embodiment, source code 4500 may include multiple source code files, rather than a single-source file, into which host code and device code are separated.

In at least one embodiment, compiler 4501 is configured to compile source code 4500 into host executable code 4502 for execution on a host and device executable code 4503 for execution on a device. In at least one embodiment, compiler 4501 performs operations including parsing source code 4500 into an abstract system tree (AST), performing optimizations, and generating executable code. In at least one embodiment in which source code 4500 includes a single-source file, compiler 4501 may separate device code from host code in such a single-source file, compile device code and host code into device executable code 4503 and host executable code 4502, respectively, and link device executable code 4503 and host executable code 4502 together in a single file, as discussed in greater detail below with respect to FIG. 34.

In at least one embodiment, host executable code 4502 and device executable code 4503 may be in any suitable format, such as binary code and/or IR code. In a case of CUDA, host executable code 4502 may include native object code and device executable code 4503 may include code in PTX intermediate representation, in at least one embodiment. In a case of ROCm, both host executable code 4502 and device executable code 4503 may include target binary code, in at least one embodiment.

At least one embodiment of the disclosure can be described in view of the following clauses:

1. A computer system comprising one or more circuits to: receive a data storage request from a requester comprising at least one of a workload or an application; determine a determined personality based at least in part on one or more characteristics of the requester, the determined personality being associated with a quantity of memory; and assign the determined personality to at least one memory device when the at least one memory device lacks an existing personality that matches the determined personality and comprises at least the quantity of memory.

2. The computer system of clause 1, wherein the one or more circuits comprise a data processing unit ("DPU") to assign the determined personality to the at least one memory device when the at least one memory device lacks the existing personality that matches the determined personality and comprises at least the quantity of memory.

3. The computer system of clause 2, wherein the at least one memory device comprises at least one of a local memory device or a remote memory device.

4. The computer system of clause 2, wherein the DPU is a local DPU, the at least one memory device comprises a remote memory device, and the computer system further comprises: a remote DPU to receive a first request from the local DPU to access data associated with the determined personality, associate the determined personality with the remote memory device, and provide a second request based at least in part on the first request to the remote memory device.

5. The computer system of any of clauses 1-4, wherein the at least one memory device is at least one solid state memory device.

6. The computer system of clause 5, wherein the determined personality is to be assigned based at least in part on a memory type of the at least one solid state memory device.

7. The computer system of any of clauses 1-6, wherein the one or more circuits are to perform a workload analysis to determine the one or more characteristics of the workload.

8. The computer system of any of clauses 1-7, wherein when the at least one memory device comprises the existing personality that matches the determined personality and comprises at least the quantity of memory, the one or more circuits are to assign the determined personality to the existing personality.

9. A processor comprising: one or more circuit portions to: determine a first personality type for use with a workload or an application; select at least a portion of one or more memory devices having at least one second personality type for use by the workload or the application, the first personality type being different from the at least one second personality type; and translate communications from the at least one second personality type to the first personality type and vice versa to enable communication between the portion of the one or more memory devices and the workload or the application.

10. The processor of clause 9, wherein the first personality type is deployed on the portion of the one or more memory devices, and the one or more circuit portions are to: track information about deployed personalities.

11. The processor of clause 9 or 10, wherein the one or more circuit portions are to: select the portion of the one or more memory devices responsive to at least one of a device failure, a recovery event, or a dynamic performance management event.

12. The processor of any of clauses 9-11, wherein the one or more circuit portions are to: select the portion of the one or more memory devices to improve load balancing.

13. The processor of any of clauses 9-12, wherein translating the communications comprises at least one of mapping between two logical block addresses, or mapping between a logical block address and a physical block address.

14. The processor of any of clauses 9-13, wherein the one or more memory devices comprises at least one of a local memory device or a remote memory device.

15. The processor of clause 14, wherein the one or more circuit portions are to: generate information related to translation of the communications, and track the information to manage a deployed personality.

16. The processor of any of clauses 9-15, wherein the one or more circuit portions are to: manage one or more policies for the portion of the one or more memory devices, the one or more policies comprising at least one of a defragmentation policy, an erasure coding policy, or a reliability scan policy.

17. A method comprising: determining a personality responsive to a data storage request; fulfilling the data storage request with a memory device when the personality is presently assigned to at least a portion of the memory device; and assigning the personality to at least one memory device when the personality is not presently assigned to the memory device.

18. The method of clause 17, wherein the at least one memory device has at least one other personality.

19. The method of clause 17 or 18, wherein the at least one memory device comprises a plurality of memory devices, and the personality spans the plurality of memory devices.

20. The method of clause 19, wherein at least one other personality spans the plurality of memory devices.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, a number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium. In at least one embodiment, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors— in at least one embodiment, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, in at least one embodiment, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In at least one embodiment, an arithmetic logic unit is a set of combinational logic circuitry that takes one or more inputs to produce a result. In at least one embodiment, an arithmetic logic unit is used by a processor to implement mathematical operation such as addition, subtraction, or multiplication. In at least one embodiment, an arithmetic logic unit is used to implement logical operations such as logical AND/OR or XOR. In at least one embodiment, an arithmetic logic unit is stateless, and made from physical switching components such as semiconductor transistors arranged to form logical gates. In at least one embodiment, an arithmetic logic unit may operate internally as a stateful logic circuit with an associated clock. In at least one embodiment, an arithmetic logic unit may be constructed as an asynchronous logic circuit with an internal state not maintained in an associated register set. In at least one embodiment, an arithmetic logic unit is used by a processor to combine operands stored in one or more registers of the processor and produce an output that can be stored by the processor in another register or a memory location.

In at least one embodiment, as a result of processing an instruction retrieved by the processor, the processor presents one or more inputs or operands to an arithmetic logic unit, causing the arithmetic logic unit to produce a result based at least in part on an instruction code provided to inputs of the arithmetic logic unit. In at least one embodiment, the instruction codes provided by the processor to the ALU are based at least in part on the instruction executed by the processor. In at least one embodiment combinational logic in the ALU processes the inputs and produces an output which is placed on a bus within the processor. In at least one embodiment, the processor selects a destination register, memory location, output device, or output storage location on the output bus so that clocking the processor causes the results produced by the ALU to be sent to the desired location.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or inter-process communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A computer system comprising one or more circuits to:
receive a data storage request from a requester comprising at least one of a workload or an application;
determine a determined personality type based at least in part on one or more characteristics of the requester, the determined personality type being associated with a quantity of memory;
assign the determined personality type to a memory portion comprising a portion of each of a plurality of memory devices to cause the memory portion to operate according to the determined personality type with respect to the workload or the application when the plurality of memory devices lack an existing personality type that matches the determined personality type, the memory portion comprising at least the quantity of memory; and
translate at least one data access command or data storage command obtained from the workload or application from being for use with the determined personality type to at least one second personality type associated with the memory portion of the plurality of memory devices.

2. The computer system of claim 1, wherein the one or more circuits comprise a data processing unit ("DPU") to assign the determined personality type to the plurality of memory devices when the plurality of memory devices lack the existing personality type that matches the determined personality type and comprises at least the quantity of memory.

3. The computer system of claim 2, wherein the plurality of memory devices comprise at least one of a local memory device or a remote memory device.

4. The computer system of claim 1, wherein the one or more circuits comprise a data processing unit ("DPU") comprising a local DPU, the plurality of memory devices comprise a remote memory device, and the computer system further comprises:
a remote DPU to receive a first request from the local DPU to access data associated with the determined personality type, associate the determined personality type with the remote memory device, and provide a second request based at least in part on the first request to the remote memory device.

5. The computer system of claim 1, wherein the plurality of memory devices comprise at least one solid state memory device.

6. The computer system of claim 5, wherein the determined personality type is to be assigned based at least in part on a memory type of the at least one solid state memory device.

7. The computer system of claim 1, wherein the one or more circuits are to perform a workload analysis to determine one or more characteristics of the workload.

8. The computer system of claim 1, wherein when the plurality of memory devices comprise the existing personality type that matches the determined personality type and comprises at least the quantity of memory, the one or more circuits are to assign the determined personality type to the existing personality type.

9. A method comprising:
determining a personality type responsive to a data storage request;
fulfilling the data storage request with a memory device when the personality type is presently assigned to at least a portion of the memory device;
assigning the personality type to a memory portion comprising a portion of each of a plurality of memory devices to cause the memory portion to operate according to the determined personality type when the personality type is not presently assigned to the plurality of memory devices; and translating at least one data access command or data storage command obtained from a workload or application from being for use with the determined personality type to being for use with at least one second personality type associated with the memory portion of the plurality of memory devices.

10. The method of claim 9, wherein the plurality of memory devices have at least one other personality type.

11. The method of claim 9, wherein the personality type spans the plurality of memory devices.

12. The method of claim 11, wherein at least one other personality type spans the plurality of memory devices.

13. A processor, comprising one or more circuits to:
receive a data storage request from a requester comprising at least one of a workload or an application;
determine a determined personality type based at least in part on one or more characteristics of the requester, the determined personality type being associated with a quantity of memory;
assign the determined personality type to a memory portion comprising a portion of each of a plurality of memory devices to cause the memory portion to operate according to the determined personality type when the plurality of memory devices lack at an existing personality type that matches the determined personality type, the memory portion comprising at least the quantity of memory; and
translate at least one data access command or data storage command obtained from the workload or application from being for use with the determined personality type to being for use with at least one second personality type associated with the memory portion of the plurality of memory devices.

14. The processor of claim 13, wherein the one or more circuits comprise a data processing unit ("DPU") to assign the determined personality type to the plurality of memory devices when the plurality of memory devices lack the existing personality type that matches the determined personality type and comprises at least the quantity of memory.

15. The processor claim 14, wherein the plurality of memory devices comprise at least one of a local memory device or a remote memory device.

16. The processor of claim 14, wherein the one or more circuits comprise a data processing unit ("DPU") comprising a local DPU, the plurality of memory devices comprise a remote memory device, and the processor is further to:
cause a remote DPU to receive a first request from the local DPU to access data associated with the determined personality type, associate the determined personality type with the remote memory device, and provide a second request based at least in part on the first request to the remote memory device.

17. The processor of claim 13, wherein the plurality of memory devices comprise at least one solid state memory device.

18. The processor of claim 17, wherein the determined personality type is to be assigned based at least in part on a memory type of the at least one solid state memory device.

19. The processor claim 13, wherein the one or more circuits are to perform a workload analysis to determine one or more characteristics of the workload.

20. The processor of claim 13, wherein when the plurality of memory devices comprise the existing personality type that matches the determined personality type and comprises at least the quantity of memory, the one or more circuits are to assign the determined personality type to the existing personality type.

* * * * *